US011490063B2

(12) United States Patent
Phillips et al.

(10) Patent No.: US 11,490,063 B2
(45) **Date of Patent: *Nov. 1, 2022**

(54) VIDEO CLIENT OPTIMIZATION DURING PAUSE

(71) Applicant: TELEFONAKTIEBOLAGET LM ERICSSON (PUBL), Stockholm (SE)

(72) Inventors: Chris Phillips, Hartwell, GA (US); Robert Hammond Forsman, Sugar Hill, GA (US); Sarel Cohen, Tel Aviv (IL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,822

(22) Filed: Jul. 10, 2020

(65) Prior Publication Data

US 2020/0344457 A1 Oct. 29, 2020

Related U.S. Application Data

(63) Continuation of application No. 16/148,035, filed on Oct. 1, 2018, now Pat. No. 10,757,389.

(51) Int. Cl.
*H04N 7/173* (2011.01)
*H04N 13/117* (2018.01)
(Continued)

(52) U.S. Cl.
CPC ......... *H04N 13/117* (2018.05); *H04N 19/152* (2014.11); *H04N 19/162* (2014.11); (Continued)

(58) Field of Classification Search
CPC ......... H04N 21/2387; H04N 21/47217; H04N 21/816; H04N 19/152; H04N 19/162; H04N 19/174; H04N 19/33; H04N 13/117
See application file for complete search history.

(56) References Cited

U.S. PATENT DOCUMENTS 7,975,283 B2 7/2011 Bedingfield
8,767,014 B2 7/2014 Vaught et al.
(Continued)

FOREIGN PATENT DOCUMENTS

EP 2109077 A2 10/2009
EP 2109077 A3 7/2011
(Continued)

OTHER PUBLICATIONS

EPO, Supplementary European Search Report, Application No. 19841873.3, dated Jul. 7, 2021, 4 pgs.
(Continued)

*Primary Examiner* — Mulugeta Mengesha
(74) *Attorney, Agent, or Firm* — The Danamraj Law Group, P.C.

(57) ABSTRACT

A system and method for providing quality control in immersive video during pausing of a video streaming session. In one embodiment, a paused video frame may comprise a plurality of mixed quality video tiles depending on user gaze vector information. Under pause control, the video quality of all tiles of the paused video frame is equalized such that it is of same value for all the video tiles, which may be the video quality of the tiles presented in a viewport of the client device. The paused video frame having the same quality tiles throughout is used as a replacement video frame, which is presented to the client device player for decoding and displaying instead of the mixed quality video frame while the streaming session is paused.

15 Claims, 55 Drawing Sheets

(51) Int. Cl.

| | |
|---|---|
| ***H04N 21/472*** | (2011.01) |
| ***H04N 21/81*** | (2011.01) |
| ***H04N 21/2387*** | (2011.01) |
| ***H04N 19/174*** | (2014.01) |
| ***H04N 19/152*** | (2014.01) |
| ***H04N 19/162*** | (2014.01) |
| ***H04N 19/33*** | (2014.01) |

(52) U.S. Cl.
CPC .......... *H04N 19/174* (2014.11); *H04N 19/33* (2014.11); *H04N 21/2387* (2013.01); *H04N 21/47217* (2013.01); *H04N 21/816* (2013.01)

(56) References Cited

U.S. PATENT DOCUMENTS

| | | | | |
|---|---|---|---|---|
| 9,392,212 | B1 | 7/2016 | Ross | |
| 9,918,136 | B2 | 3/2018 | Cole et al. | |
| 2005/0018911 | A1 | 1/2005 | Deever | |
| 2009/0175333 | A1 | 7/2009 | Hsiang | |
| 2010/0046845 | A1 | 2/2010 | Wedi et al. | |
| 2010/0050221 | A1* | 2/2010 | McCutchen | H04N 7/165 375/E7.076 |
| 2010/0061461 | A1 | 3/2010 | Bankoski et al. | |
| 2010/0149073 | A1 | 6/2010 | Chaum et al. | |
| 2012/0201294 | A1 | 8/2012 | Segall et al. | |
| 2012/0257677 | A1 | 10/2012 | Bankoski et al. | |
| 2012/0281928 | A1 | 11/2012 | Cohen et al. | |
| 2013/0182073 | A1 | 7/2013 | Yin et al. | |
| 2013/0235152 | A1 | 9/2013 | Hannuksela et al. | |
| 2013/0294513 | A1 | 11/2013 | Seregin et al. | |
| 2014/0176813 | A1 | 6/2014 | Conness et al. | |
| 2014/0359656 | A1 | 12/2014 | Banica et al. | |
| 2015/0212576 | A1 | 7/2015 | Ambrus et al. | |
| 2015/0229948 | A1 | 8/2015 | Puri et al. | |
| 2015/0288732 | A1 | 10/2015 | Phillips et al. | |
| 2015/0346812 | A1 | 12/2015 | Cole et al. | |
| 2015/0382057 | A1 | 12/2015 | Huang et al. | |
| 2016/0165309 | A1 | 6/2016 | Van Brandenburg et al. | |
| 2016/0277772 | A1 | 9/2016 | Campbell et al. | |
| 2016/0353146 | A1 | 12/2016 | Weaver et al. | |
| 2016/0379606 | A1 | 12/2016 | Kollin et al. | |
| 2017/0139578 | A1 | 5/2017 | Dickerson et al. | |
| 2017/0155912 | A1* | 6/2017 | Thomas | H04N 21/8456 |
| 2017/0200308 | A1 | 7/2017 | Nguyen et al. | |
| 2017/0263046 | A1 | 9/2017 | Patney et al. | |
| 2017/0316601 | A1 | 11/2017 | Kakarlapudi et al. | |
| 2017/0339416 | A1 | 11/2017 | Hendry et al. | |
| 2017/0359603 | A1 | 12/2017 | Levy | |
| 2017/0374375 | A1 | 12/2017 | Makar et al. | |
| 2017/0374411 | A1 | 12/2017 | Lederer et al. | |
| 2018/0063512 | A1 | 3/2018 | Hong et al. | |
| 2018/0063599 | A1 | 3/2018 | Park et al. | |
| 2018/0070113 | A1 | 3/2018 | Phillips et al. | |
| 2018/0070119 | A1 | 3/2018 | Phillips et al. | |
| 2018/0103199 | A1 | 4/2018 | Hendry et al. | |
| 2018/0146212 | A1 | 5/2018 | Hensler et al. | |
| 2018/0160160 | A1 | 6/2018 | Swaminathan et al. | |
| 2018/0164593 | A1 | 6/2018 | Van Der Auwera et al. | |
| 2018/0191952 | A1 | 7/2018 | Ardo et al. | |
| 2018/0220119 | A1 | 8/2018 | Horvitz et al. | |
| 2018/0249163 | A1 | 8/2018 | Curcio et al. | |
| 2018/0275410 | A1 | 9/2018 | Yeoh et al. | |
| 2018/0302604 | A1 | 10/2018 | Zhou | |
| 2018/0359489 | A1 | 12/2018 | Lakshman et al. | |
| 2019/0073025 | A1 | 3/2019 | Schmidt et al. | |
| 2019/0089643 | A1 | 3/2019 | Westphal et al. | |
| 2019/0094981 | A1 | 3/2019 | Bradski et al. | |
| 2019/0104324 | A1 | 4/2019 | Han et al. | |
| 2019/0110856 | A1 | 4/2019 | Barral et al. | |
| 2019/0230142 | A1* | 7/2019 | He | H04N 21/64738 |
| 2019/0268607 | A1 | 8/2019 | Taibi et al. | |
| 2019/0387039 | A1 | 12/2019 | Han et al. | |
| 2020/0204841 | A1* | 6/2020 | Van Brandenburg | H04N 21/23439 |

FOREIGN PATENT DOCUMENTS

| | | | |
|---|---|---|---|
| EP | 3306571 | A1 | 4/2018 |
| GB | 2554877 | | 4/2018 |
| GB | 2557416 | A | 6/2018 |
| JP | WO2016129549 | | 8/2016 |
| WO | 2017153775 | A1 | 9/2017 |
| WO | 2017188714 | A1 | 11/2017 |
| WO | 2017205794 | A1 | 11/2017 |
| WO | 2017205794 | A9 | 11/2017 |
| WO | 2018035133 | A1 | 2/2018 |
| WO | 2018049221 | A1 | 3/2018 |
| WO | WO2018047063 | A1 | 3/2018 |
| WO | 2018079166 | A1 | 5/2018 |

OTHER PUBLICATIONS

EPO, Extended Search Report, Application No. 19820555.1, dated Apr. 5, 2021, 10 pgs.

5G Americas, "Network Slicing for 5G Networks & Services", 5G Americas White Paper—Network Slicing for 5G and Beyond, Nov. 2016, 35 pgs.

Fallon et al., "Using the COMPA Autonomous Architecture for Mobile Network Security", 2017 IFIP/IEEE Symposium on Integrated Network and Service Management (IM), May 2017, 8 pgs.

GSMA, "An Introduction To Network Slicing", 2017, 20 pgs.

Rune et al., "Architecture evolution for automation and network programmability", Ericsson Review, Nov. 28, 2014, 11 pgs.

Xie et al., 360ProbDASH: Improving QoE of 360 Video Streaming Using Tile-Based HTTP Adaptive Streaming, MM '17: Proceedings of the 25th ACM International Conference on Multimedia, Oct. 2017, pp. 315-323, Association for Computing Machinery, United States.

USPTO, Office Action, U.S. Appl. No. 17/017,316, dated Jul. 7, 2021, 12 pgs.

USPTO, Office Action, U.S. Appl. No. 16/008,824, dated Aug. 21, 2019, 8 pgs.

USPTO, Office Action, U.S. Appl. No. 16/046,629, dated Dec. 31, 2018, 9 pgs.

USPTO, Office Action, U.S. Appl. No. 16/047,802, dated Jan. 3, 2020, 19 pgs.

USPTO, Notice of Allowance, U.S. Appl. No. 16/008,824, dated Dec. 16, 2019, 7 pgs.

USPTO, Notice of Allowance, U.S. Appl. No. 16/008,951, dated Oct. 3, 2019, 8 pgs.

USPTO, Notice of Allowance, U.S. Appl. No. 16/009,003, dated May 16, 2019, 20 pgs.

USPTO, Notice of Allowance, U.S. Appl. No. 16/009,031, dated May 29, 2019, 21 pgs.

USPTO, Notice of Allowance, U.S. Appl. No. 16/046,269, dated Apr. 16, 2019, 6 pgs.

USPTO, Notice of Allowance, U.S. Appl. No. 16/046,269, dated May 29, 2019, 11 pgs.

USPTO, Notice of Allowance, U.S. Appl. No. 16/046,576, dated Apr. 30, 2019, 17 pgs.

USPTO, Notice of Allowance, U.S. Appl. No. 16/046,629, dated Oct. 3, 2019, 6 pgs.

USPTO, Notice of Allowance, U.S. Appl. No. 16/148,001, dated Aug. 8, 2019, 10 pgs.

ISA/EPO, International Search Report, International Application No. PCT/EP2019/061840, dated Jun. 18, 2019, 16 pgs.

ISA/SE, International Search Report, PCT/SE2019/050552, dated Sep. 20, 2019, 5 pgs.

ISA/SE, Written Opinion of the International Search Authority, PCT/SE2019/050552, dated Sep. 20, 2019, 9 pgs.

ISA/SE, International Search Report, PCT/SE2019/050559, dated Sep. 18, 2019, 4 pgs.

ISA/SE, Written Opinion of the International Search Authority, PCT/SE2019/050559, dated Sep. 18, 2019, 8 pgs.

Bassbouss et al., "High Quality 360° C. Video Rendering and Streaming," Fraunhofer Institute for Open Communication Systems FOKUS, Nov. 2016, 4 pgs.

(56) References Cited

OTHER PUBLICATIONS

Corbillon et al., "Viewport-Adaptive Navigable 360-Degree Video Delivery," 2017 IEEE International Conference or Communications (ICC), May 21, 2017, 7 pgs.
Guo et al., Viewpoint Switching in Multiview Video Streaming, 2005 IEEE International Symposium on Circuits and Systems (ISCAS), May 23-26, 2005, IEEE, Japan.
Kuzyakov et al., "Next-generation video encoding techniques for 360 video and VR," Engineering Blog: Facebook Code—Facebook, Jan. 21, 2016, 7 pgs. <https://code.facebook.com/posts/1126354007399553/next-generation-video-encoding-techniques-for-360-video-and-vr/>.
Ling et al., Adaptive Multi-Path Video Streaming, Proceedings of the Eighth IEEE International Symposium on Multimedia (ISM'06), Dec. 11-13, 2006, IEEE Computer Society.
Lungaro et al., Gaze-aware streaming solutions for the next generation of mobile VR experiences, IEEE Transactions on Visualization and Computer Graphics, Jan. 25, 2018, pp. 1535-1544, vol. 24, IEEE.
Misra et al., "An Overview of Tiles in HEVC," IEEE Journal of Selected Topics in Signal Processing, Dec. 2013, pp. 969-970, vol. 7, No. 6.
Ozcinar et al., Dynamic bitrate allocation of interactive real-time streamed multi-view video with view-switch prediction, Signal, Image and Video Processing, Mar. 27, 2017, pp. 1279-1285, vol. 11, Springer-Verlag, United Kingdom.
Sanchez et al., "Compressed domain video processing for tile based panoramic streaming using HEVC," 2015 IEEE International Conference on Image Processing (ICIP), Sep. 27, 2015, 5 pgs.
Sanchez et al., "Low Complexity Cloud-video-Mixing Using HEVC," 11th Annual IEEE CCNC—Multimedia Networking, Services and Applications, Jan. 10, 2014, pp. 213-218, Las Vegas, Nevada, USA.
Skupin et al., "HEVC Tile Based Streaming to Head Mounted Displays," 2017 14th IEEE Annual Consumer Communications & Networking Conference (CCNC), Jan. 8, 2017, pp. 613-615.
Sullivan et al., "Overview of the High Efficiency Video Coding (HEVC) Standard", IEEE Transactions on Circuits and Systems for Video Technology, Dec. 2012, 20 pgs., vol. 22, No. 12.
Valero et al., "Eye-tracking Based Video Streaming System with Fast Quality Switching," Master's Thesis at KTH Information and Communication Technology, Jul. 2017, Stockholm, Sweden, 89 pgs.
Van Brandenburg, "CDN Optimization for VR Streaming," Proceedings of the IBC 2017 Conference, Amsterdam, The Netherlands, Sep. 2017, 9 pgs.
Zhu et al., Inter-view-predicted redundant pictures for viewpoint switching in multiview video streaming, 2010 IEEE International Conference on Acoustics, Speech and Signal Processing, Mar. 14-19, 2010, IEEE, USA.
Advertisement Overlay Insertion for HEVC based services, Fraunhofer Heinrich Hertz Institute, accessed Nov. 10, 2017. <https://www.hhi.fraunhofer.de/en/departments/vca/research-groups/multimedia-commuications/research-topics/advertisement-overlay-insertion-for-hevc-based-services.html>.
Intellectual Property Office of India, Examination Report, Application No. 202117004143, dated Apr. 11, 2022, 7 pgs.

* cited by examiner

128 TILES

1802

| | | | | | | | | | | | | | | | |
|---|---|---|---|---|---|---|---|---|---|---|---|---|---|---|---|
| 1.27 | 1.23 | 1.21 | 1.22 | 1.26 | 1.31 | 1.38 | 1.45 | 1.51 | 1.55 | 1.57 | 1.56 | 1.52 | 1.46 | 1.39 | 1.33 |
| 0.10 | 0.09 | 0.08 | 0.09 | 0.10 | 1.12 | 1.31 | 1.51 | 1.68 | 1.79 | 1.84 | 1.81 | 1.70 | 1.54 | 1.35 | 1.15 |
| 0.07 | 0.05 | 0.05 | 0.05 | 0.07 | 0.09 | 1.19 | 1.48 | 1.74 | 1.91 | 1.98 | 1.94 | 1.78 | 1.54 | 1.25 | 0.10 |
| 0.05 | 0.03 | 0.02 | 0.02 | 0.04 | 0.07 | 1.04 | 1.39 | 1.69 | 1.90 | 1.98 | 1.92 | 1.74 | 1.45 | 1.11 | 0.08 |
| 0.03 | 0.01 | 0.00 | 0.01 | 0.03 | 0.05 | 0.09 | 1.24 | 1.53 | 1.74 | 1.82 | 1.77 | 1.58 | 1.30 | 0.10 | 0.06 |
| 0.03 | 0.01 | 0.00 | 0.01 | 0.02 | 0.05 | 0.08 | 1.05 | 1.30 | 1.47 | 1.54 | 1.50 | 1.34 | 1.10 | 0.08 | 0.05 |
| 0.03 | 0.02 | 0.02 | 0.02 | 0.03 | 0.05 | 0.07 | 0.08 | 1.02 | 1.13 | 1.18 | 1.15 | 1.05 | 0.09 | 0.07 | 0.05 |
| 0.05 | 0.04 | 0.04 | 0.04 | 0.05 | 0.05 | 0.06 | 0.07 | 0.07 | 0.08 | 0.08 | 0.08 | 0.07 | 0.07 | 0.06 | 0.05 |

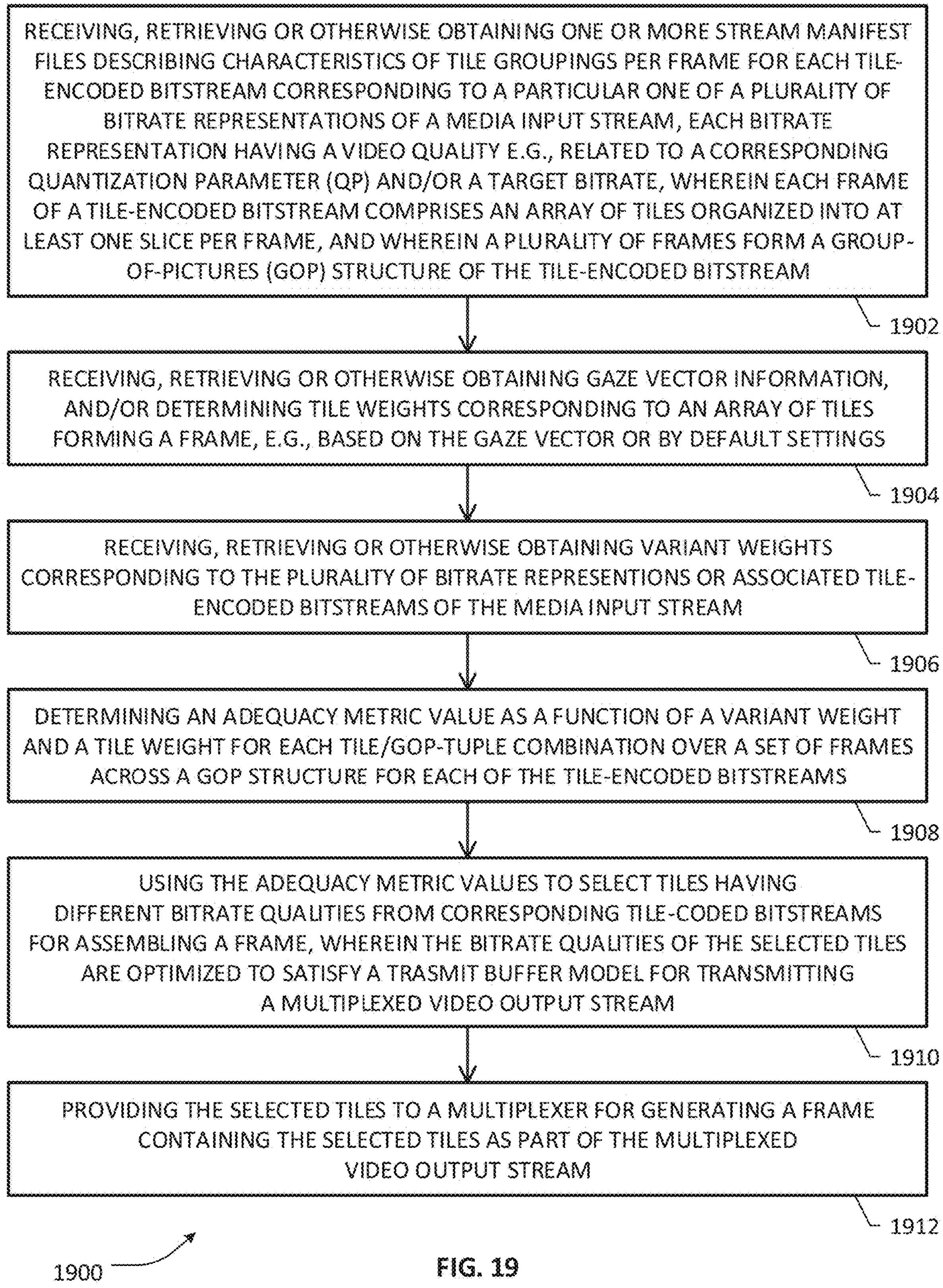

FIG. 19

```
┌─────────────────────────────────────────────────────────────────────┐
│ RECEIVING, RETRIEVING OR OTHERWISE OBTAINING ONE OR MORE STREAM     │
│ MANIFEST FILES DESCRIBING CHARACTERISTICS OF TILE GROUPINGS PER     │
│ FRAME FOR EACH TILE-ENCODED BITSTREAM CORRESPONDING TO A            │
│ PARTICULAR ONE OF A PLURALITY OF BITRATE REPRESENTATIONS OF A       │
│ MEDIA INPUT STREAM, EACH BITRATE REPRESENTATION HAVING A VIDEO      │
│ QUALITY E.G., RELATED TO A CORRESPONDING QUANTIZATION PARAMETER     │
│ (QP) AND/OR A TARGET BITRATE, WHEREIN EACH FRAME OF A TILE-ENCODED  │
│ BITSTREAM COMPRISES AN ARRAY OF TILES ORGANIZED INTO AT LEAST ONE   │
│ SLICE PER FRAME, AND WHEREIN A PLURALITY OF FRAMES FORM A GROUP-    │
│ OF-PICTURES (GOP) STRUCTURE OF THE TILE-ENCODED BITSTREAM           │
└─────────────────────────────────────────────────────────────────────┘
                                    │ 1902
                                    ▼
┌─────────────────────────────────────────────────────────────────────┐
│ RECEIVING, RETRIEVING OR OTHERWISE OBTAINING GAZE VECTOR            │
│ INFORMATION, AND/OR DETERMINING TILE WEIGHTS CORRESPONDING TO AN    │
│ ARRAY OF TILES FORMING A FRAME, E.G., BASED ON THE GAZE VECTOR OR   │
│ BY DEFAULT SETTINGS                                                 │
└─────────────────────────────────────────────────────────────────────┘
                                    │ 1904
                                    ▼
┌─────────────────────────────────────────────────────────────────────┐
│ RECEIVING, RETRIEVING OR OTHERWISE OBTAINING VARIANT WEIGHTS        │
│ CORRESPONDING TO THE PLURALITY OF BITRATE REPRESENTIONS OR          │
│ ASSOCIATED TILE-ENCODED BITSTREAMS OF THE MEDIA INPUT STREAM        │
└─────────────────────────────────────────────────────────────────────┘
                                    │ 1906
                                    ▼
┌─────────────────────────────────────────────────────────────────────┐
│ DETERMINING AN ADEQUACY METRIC VALUE AS A FUNCTION OF A VARIANT     │
│ WEIGHT AND A TILE WEIGHT FOR EACH TILE/GOP-TUPLE COMBINATION OVER   │
│ A SET OF FRAMES ACROSS A GOP STRUCTURE FOR EACH OF THE TILE-        │
│ ENCODED BITSTREAMS                                                  │
└─────────────────────────────────────────────────────────────────────┘
                                    │ 1908
                                    ▼
┌─────────────────────────────────────────────────────────────────────┐
│ USING THE ADEQUACY METRIC VALUES TO SELECT TILES HAVING DIFFERENT   │
│ BITRATE QUALITIES FROM CORRESPONDING TILE-CODED BITSTREAMS FOR      │
│ ASSEMBLING A FRAME, WHEREIN THE BITRATE QUALITIES OF THE SELECTED   │
│ TILES ARE OPTIMIZED TO SATISFY A TRASMIT BUFFER MODEL FOR           │
│ TRANSMITTING A MULTIPLEXED VIDEO OUTPUT STREAM                      │
└─────────────────────────────────────────────────────────────────────┘
                                    │ 1910
                                    ▼
┌─────────────────────────────────────────────────────────────────────┐
│ PROVIDING THE SELECTED TILES TO A MULTIPLEXER FOR GENERATING A      │
│ FRAME CONTAINING THE SELECTED TILES AS PART OF THE MULTIPLEXED      │
│ VIDEO OUTPUT STREAM                                                 │
└─────────────────────────────────────────────────────────────────────┘
                                                                  1912

                          1900 ⟶
```

2800A

2800B

VIDEO CLIENT OPTIMIZATION DURING PAUSE

PRIORITY AND REFERENCE TO RELATED APPLICATION(S)

This application is a continuation of the following co-pending commonly assigned patent application: (i) "CLIENT OPTIMIZATION FOR PROVIDING QUALITY CONTROL IN 360° IMMERSIVE VIDEO DURING PAUSE," application Ser. No. 16/148,035, filed Oct. 1, 2018, which is hereby incorporated by reference in its entirety.

TECHNICAL FIELD

The present disclosure generally relates to communication networks. More particularly, and not by way of any limitation, the present disclosure is directed to a client-based system and method for providing quality control in 360° immersive video during pausing a video session.

BACKGROUND

The introduction of virtual reality has brought new applications to the forefront in addition to improving several existing technologies. One improvement over existing technologies can be seen in the case of 360° immersive video, also variously referred to as panoramic video, 360-degree video or 360 video, and the like.

360-degree video offers the user with an immersive "being there" experience. The increased immersion of virtual reality can easily be applied to video, providing superior user experience over the traditional video that is projected on flat surfaces. The popularity of navigable 360-degree video systems has also grown with the advent of omnidirectional capturing systems and interactive displaying systems, such as head-mounted displays (HMDs) or headsets. However, content providers have been contending with bandwidth constrained network environments to deliver 360-degree video content in an efficient way in order to ensure a satisfactory viewing experience because 360-degree video assets are ultra high resolution spherical videos, which contain an omnidirectional view of the scenes requiring enormous amounts of data.

Current 360 video headsets are 2K-resolution display devices, covering 1K per eye. In order to achieve the best quality in the headset, a typical network requires sending an 8K 360 video stream to the device. It is known that video compression allows efficient utilization of bandwidth in a media streaming network by reducing the number of bits to represent a picture. Whereas advances in video compression technologies continue to grow apace, several lacunae remain in the field of 360 video delivery and display with respect to efficiently managing bandwidth in today's network architectures, requiring further innovation as will be set forth hereinbelow.

SUMMARY

The present patent disclosure is broadly directed to systems, methods, apparatuses, devices, and associated non-transitory computer-readable media and network architecture for effectuating optimized 360° immersive video viewing experiences including, inter alia, providing client-based quality control in 360° immersive video during pausing of a video streaming session. In one embodiment, a paused video frame may comprise a plurality of mixed quality video tiles (e.g., high quality (HQ) or low quality (LQ) tiles) depending on user gaze vector information. Under pause control, the video quality of all tiles of the tiled video frame may be equalized to a highest video quality corresponding to the quality of the tiles presented in a viewport of the client device. A replacement video frame is generated having tiles with the same equalized video quality throughout the full 360° immersive video frame, which is presented to the client device player for decoding and displaying instead of the mixed quality video frame while the streaming session is paused.

In one aspect, an embodiment of a method operating at a client device is provided for controlling video quality while pausing an Over-the-Top (OTT) 360-degree immersive video session. The claimed method comprises, inter alia, receiving a request from a user operating the client device to pause playing a particular video asset being streamed in the 360-degree immersive video session, wherein the particular video asset comprises a plurality of video frames and each video frame comprises an array of tiles that may be projected on a 3-dimensional (3D) display environment when viewed by the user in a display device associated with the client device. The request to pause playing the particular video asset may be generated or received with respect to a tiled video frame being currently displayed and stored in a video decode buffer of the client device, wherein the tiled video frame includes a first portion of video tiles having a first video quality, the first portion corresponding to a viewport of the display device, and a second portion of video tiles having a second video quality, the second portion corresponding to a display region outside the viewport of the display device. A replacement video frame is generated or otherwise assembled by replacing tiles in the second portion of the tiled video frame with tiles having a video quality matching the first video quality of the video tiles of the first portion corresponding to the viewport. Thereafter, the replacement video frame having video tiles with matching video qualities in the viewport as well as the display region outside the viewport is provided to a video decoder of the client device for decoding and displaying the replacement video frame instead of the tiled video frame while the particular video asset is paused.

In one variation, if the video decode buffer includes any mixed quality video frames subsequent to the tiled video frame that is paused, the subsequent frames may be flushed from the video decode buffer, followed by (re)filling of the video decode buffer with subsequent replacement video frames having HQ tiles throughout the array without regard to the viewport. In such an embodiment, each subsequent replacement video frame includes a complete array of video tiles having a video quality at least equal to the first video quality of the tiles corresponding to the viewport of the tiled video frame at which the particular video asset is paused. In another variation, a plurality of replacement video frames may be downloaded into the video decode buffer while the video streaming session is paused as long as there is no overflow. In another variation, if the video decode buffer is determined to be full, additional replacement video frames may continue to be downloaded into a secondary, or backup, buffer (referred to as a pause buffer in some embodiments) while the video streaming session is paused until the pause buffer is full. When a playback resume request is received from the user, video tile data in the pause buffer is first played out, followed by the video tile data in the video decode buffer. As the buffer drain conditions approach, streaming of viewport-optimized mixed quality tiles (e.g., based on the user gaze vector information) may be commenced at some point after resuming playback.

In another aspect, an embodiment of an apparatus, system, or component is disclosed that is configured to perform any of the client-centric processes with respect to pausing a 360° immersive video streaming session as set forth herein. In an example implementation, the immersive video streaming session may relate to a video asset provided as a tile-encoded bitstream having tiles of different video qualities based on at least one of High Efficiency Video Coding (HEVC) H.265 compression, Alliance for Open Media (AOMedia) Video 1 (AV1) compression and H.266/Versatile Video Coding (VVC) compression. In a still further variation, user gaze vector information associated with a video streaming session may be obtained by tracking an orientation of the user's headset associated with the client device for displaying the particular immersive video asset. In another variation, the gaze vector information may be obtained by tracking a movement of the user's eyeballs with respect to different portions of the 3D display environment while the particular immersive video asset is being displayed. Regardless of how the gaze vectors are obtained, they may comprise, without limitation, normalized/non-normalized Cartesian coordinate vectors, normalized/non-normalized spherical coordinate vectors, or vectors defined in a suitable 3D geometrical coordinate system, and the like.

In a still further aspect, an embodiment of a client device operative in a 360-degree immersive video environment is disclosed, which comprises one or more processors, a media player having user controls, and one or more persistent memory modules having program instructions thereon that are configured to perform when executed by the processors an embodiment of a device-based pause control and pause-based buffering methods for quality optimization as set forth herein. In still further aspects, one or more embodiments of a non-transitory tangible computer-readable medium or distributed media containing computer-executable program instructions or code portions stored thereon are disclosed for performing one or more embodiments of the methods of the present invention when executed by a processor entity of a network node, apparatus, system, network element, subscriber device, and the like, mutatis mutandis. Further features of the various embodiments are as claimed in the dependent claims.

Embodiments herein advantageously provide a pause control optimization scheme for facilitating a uniformly high quality picture across the entire 360-degree field of vision in a paused video frame, which can enable the user to enjoy a better video experience rather than having to tolerate a poor visual presentation due to the LQ tiling in out-of-view areas. As the pause time (which may comprise a short duration or a long duration) can be used for downloading higher quality tiles, an embodiment of the present invention may be configured to leverage the pause time for downloading of the subsequent frames following a paused frame, either in short segments or an entire video asset. Depending on the bandwidth conditions while pausing, even higher quality frames may be downloaded during pause time in certain example embodiments for achieving an enhanced viewing experience upon resuming playback.

In additional and/or related aspects, tiled video frames of a 360° immersive video asset may be advantageously assembled with a subset of tiles optimized for higher quality viewports based on gaze vector information and allocated bandwidth. Because the frames are selectively viewport-optimized, transport of high quality multiplexed streams is possible even in bandwidth-constrained environments without sacrificing the viewing experience. Example embodiments may be advantageously configured such that the highest quality tiles will always be delivered in the direct view, with controlled degrading qualities across multiple areas farther from the direct field of vision, wherein the lowest quality is provided in the area that is in the diametrically opposite direction of where the user is looking. Accordingly, when a stream is delivered to the device, the user always gets the highest video QoE in the area that they are directly looking at. Further, when the user moves their head, mid-GOP switching facilitated by some example embodiments allows receiving high quality tiles as quickly as possible with minimal latency. With the tiles encoded for gradual refresh, when a user changes their field of vision, example embodiments can further reduce the latency of the video as the size of the video buffer may be minimized by sending several high quality tiles in the initial upgrade of the next frame to deliver. Over the course of the next several frames, an example embodiment gradually increases the quality of the remaining tiles until the quality of tiles is reached based on the current field of vision and allowed bandwidth.

Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 18A depicts an example video frame having tile locations with different weights determined in accordance with an embodiment of the present invention;

FIG. 19 is a flowchart illustrative of various blocks, steps and/or acts of a tile selection and bandwidth annealing process that may be (re)combined in one or more arrangements of a media preparation/processing method, with or without blocks, steps and/or acts of additional flowcharts of the present disclosure, according to one or more embodiments of the present invention;

DETAILED DESCRIPTION

Figure 1:
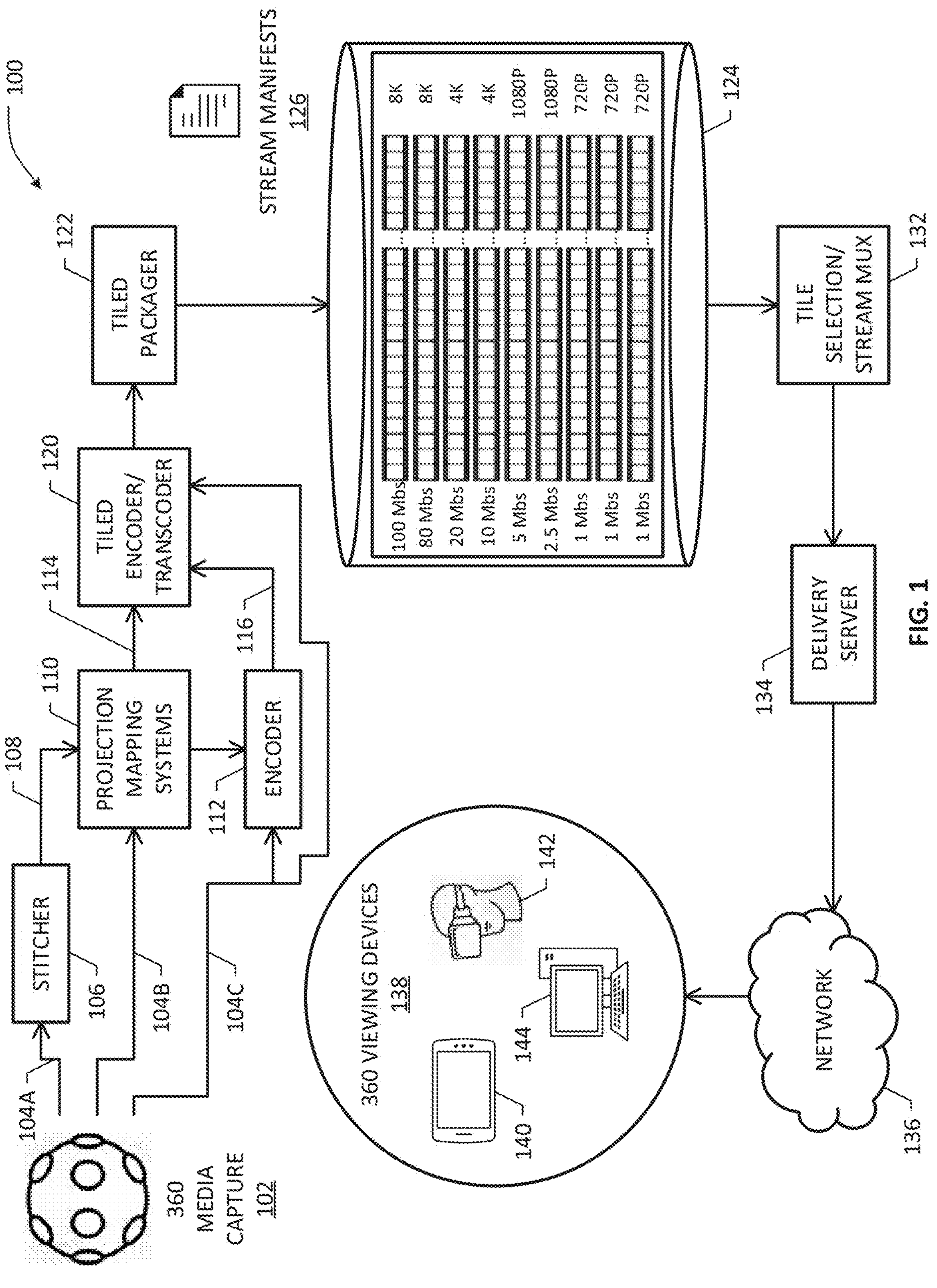
FIG. 1 depicts a generalized example network environment wherein one or more embodiments of the present invention may be practiced for providing 360° immersive video over a variety of network configurations.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element may be programmed for performing or otherwise structurally arranged to perform that function.

As used herein, a network element, node or subsystem may be comprised of one or more pieces of service network equipment, including hardware and software that communicatively interconnects other equipment on a network (e.g., other network elements, end stations, etc.), and is adapted to host one or more applications or services, either in a virtualized/non-virtualized environment, with respect to a plurality of subscribers and associated user equipment (UE) nodes that are operative to receive/consume content in a media distribution network where media content assets may be distributed and delivered using stream-based or file-based mechanisms. As such, some network elements may be disposed in a wireless radio network environment whereas other network elements may be disposed in a public packet-switched network infrastructure, including or otherwise involving suitable content delivery network (CDN) infrastructure that may comprise public, private, or mixed CDNs. Further, suitable network elements including one or more embodiments set forth herein may involve terrestrial and/or satellite broadband delivery infrastructures, e.g., a Digital Subscriber Line (DSL) network architecture, a Data Over Cable Service Interface Specification (DOCSIS)-compliant Cable Modem Termination System (CMTS) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, some network elements may comprise "multiple services network elements" that provide support for multiple network-based functions (e.g., 360° immersive A/V media preparation, delivery policy management, session control, QoS policy enforcement, bandwidth scheduling management, content provider priority policy management, streaming policy management, and the like), in addition to providing support for multiple application services (e.g., data and multimedia applications including 360° immersive video assets (also referred to as 360-degree video assets or simply 360 video assets) in varying qualities or definitions). Example subscriber end stations or client devices may comprise various devices, tethered or untethered, that may consume or deliver media content assets using streaming and/or file-based downloading technologies, which may involve some type of rate adaptation in certain embodiments. Illustrative client devices or UE devices may therefore include any device configured to execute, inter alia, one or more client applications for receiving, recording, storing, and/or decoding/rendering 360 video content, live media and/or static/on-demand media, which may comprise Virtual Reality (VR) media, Augmented Reality (AR) media, Mixed Reality (MR) media, from one or more content providers, e.g., via a broadband access network, using HTTP, HTTPS, RTP, and the like. Accordingly, such client devices may include Next Generation IP-based STBs, networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) operating in concert with 3D display devices and the like, which may access or consume 360-degree content/services provided via a suitable media distribution network wherein a bandwidth and Quality of Experience (QoE) scheme may be provided in accordance with to one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is a generalized example network environment 100 where one or more embodiments of the present invention may be practiced for providing immersive video distributed over a variety of configurations for consumption by one or more viewing devices. An example video source/capture system 102 is illustrative of any arrangement configured to record, generate, read, decode, provide, or otherwise obtain media that is renderable for 360° viewing in myriad client device environments, which may include tethered or untethered devices, standalone pieces of equipment, subscriber premises equipment, gaming equipment, and/or equipment operating in paired combination(s) with 3D display devices, etc., operating with a variety of access/connection technologies, as noted elsewhere in the present patent application. By way of illustration, computers/displays 144, which may be associated with head-mounted displays (HMDs) or headsets 142, which may in turn also be associated with portable devices such as tablets, smartphones, phablets, gaming devices, etc., collectively shown as devices 140, and the like, generally shown as client devices 138, may be configured to decode and render various types of 360° video content that may be encoded and bandwidth-optimized according to the teachings of the present invention as will be set forth in additional detail further below. In one embodiment, example 360° immersive video source/capture system 102 may comprise one or more high-definition cameras (e.g., 4K, 8K, etc.), including omnidirectional or panoramic cameras, etc. or a video storage that may be configured to provide source video streams in a number of ways. Depending on the configuration and level of integration with respect to video preprocessing, output streams from example 360° immersive video source/capture 102 may be provided as streams compatible with one or more interfaces, High Definition Multimedia Interface (HDMI), Serial Digital Interface (SDI), High Definition SDI (HD-SDI), or other formats, which may comprise unstitched or stitched streams, with or without projection-mapping, and with or without source video encoding. For example, unstitched source streams without projection mapping 104A may be provided to a video stitcher 106 that combines streams covering overlapping angles into a stitched stream 108. In another embodiment, video source steams may comprise stitched HDMI/SDI/HD-DSI streams 104B. Also, there may be other processing of captured video that may involve lens correction. Where the streams are not projection-mapped, a projection mapping system 110 is operative to generate a projection-mapped steam 114 from stitched streams 104B/108 using a suitable map projection scheme, e.g., a spherical image projection including, without limitation, equirectangular projection, Cube Map projection, Equi-Angular Cubemap (EAC) projection, Pyramid projection, Fish-Eye projection, etc. In a still further embodiment, video streams may comprise stitched and projection-mapped streams 104C that may be provided to a source video encoding module 112 operative to effectuate one or more encoding or compression schemes depending on implementation, e.g., including, without limitation, H.264 or Advanced Video Coding (MPEG-4 AVC), High Efficiency Video Coding (HEVC) or H.265 (MPEG-H Part 2), H.262 (MPEG-2), H.264 (MPEG-4, Part 2), Alliance for Open Media (AOMedia) Video 1 (AV1), H.266, Versatile Video Coding (VVC), Future Video Coding (FVC), etc., where some of the schemes may or may not include tile encoding and/or may or may not adaptive bitrate (ABR) transcoding. In one arrangement, projection-mapped streams from the projection mapping system 110 may also be provided to the encoder system 112 for effectuating appropriate video compression. Depending on the configuration and the level of integration with respect to preprocessing in media preparation, a tiled encoder/transcoder 120 is advantageously provided in accordance with the teachings of the present invention to process uncompressed video streams received from the projection mapping system 110 (video streams 114), compressed video streams received from the encoder system 112 (video streams 116), or video streams 104C from the video source/capture system 102. As will be set forth in further detail below, tiled encoder/transcoder 120, whose functionality may be integrated with the encoder system 112 and/or the projection mapping system 110 in some embodiments, is operative to generate encoded streams of multiple bitrate representations of an input video stream corresponding to a 360° immersive video asset or program, wherein each bitrate representation having a certain video quality level may be encoded to contain frames with appropriately modified tile, frame and/or slice data to facilitate bandwidth-optimized 360° video distribution. A tiled packager 122 is operative to package the encoded streams from encoder/transcoder 120 for storage 124 and provide associated manifest files 126 describing tile groupings, tile locations, media types and related characteristics of the encoded streams. As will be further set forth below, a tile selection and stream generation system 132 is operative to select appropriate tiles responsive to control inputs and generate a multiplexed video output stream that may be delivered by a delivery server 134 associated with an access network 136 serving the viewing devices 138. In an example implementation, delivery of the multiplexed video streams to end users may be effectuated based on a number of protocols, e.g., HTTP/S, chunked HTTP/S, RTP/RTCP, etc., over a variety of network infrastructures, as noted elsewhere in the present patent application.

Skilled artisans will recognize that the foregoing generalized example network environment 100 may be implemented in a hierarchical network architecture, with various aspects of media capture and preparation, including, e.g., source stream stitching, projection mapping, source media compression, tiled/ABR encoding/transcoding, packaging, etc., as well as distributing/uploading and edge node processes taking place in different network portions disposed at different hierarchical levels, involving one or more operators, content delivery networks (CDNs), edge networks, and the like. Further, in some implementations, at least some of the foregoing apparatuses and processes may be cloud-based. In some arrangements, a CDN can be a large distributed system of servers deployed in multiple data centers connected to the Internet or other public/private communications network. A CDN can be a managed or unmanaged network, and can also be a federation of managed or unmanaged networks.

An example embodiment of a media server/source system operatively associated within the foregoing example network environment may therefore be configured, e.g., as a global headend, to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc., including any secondary media insertions such as advertisement media channels.

Figure 2:
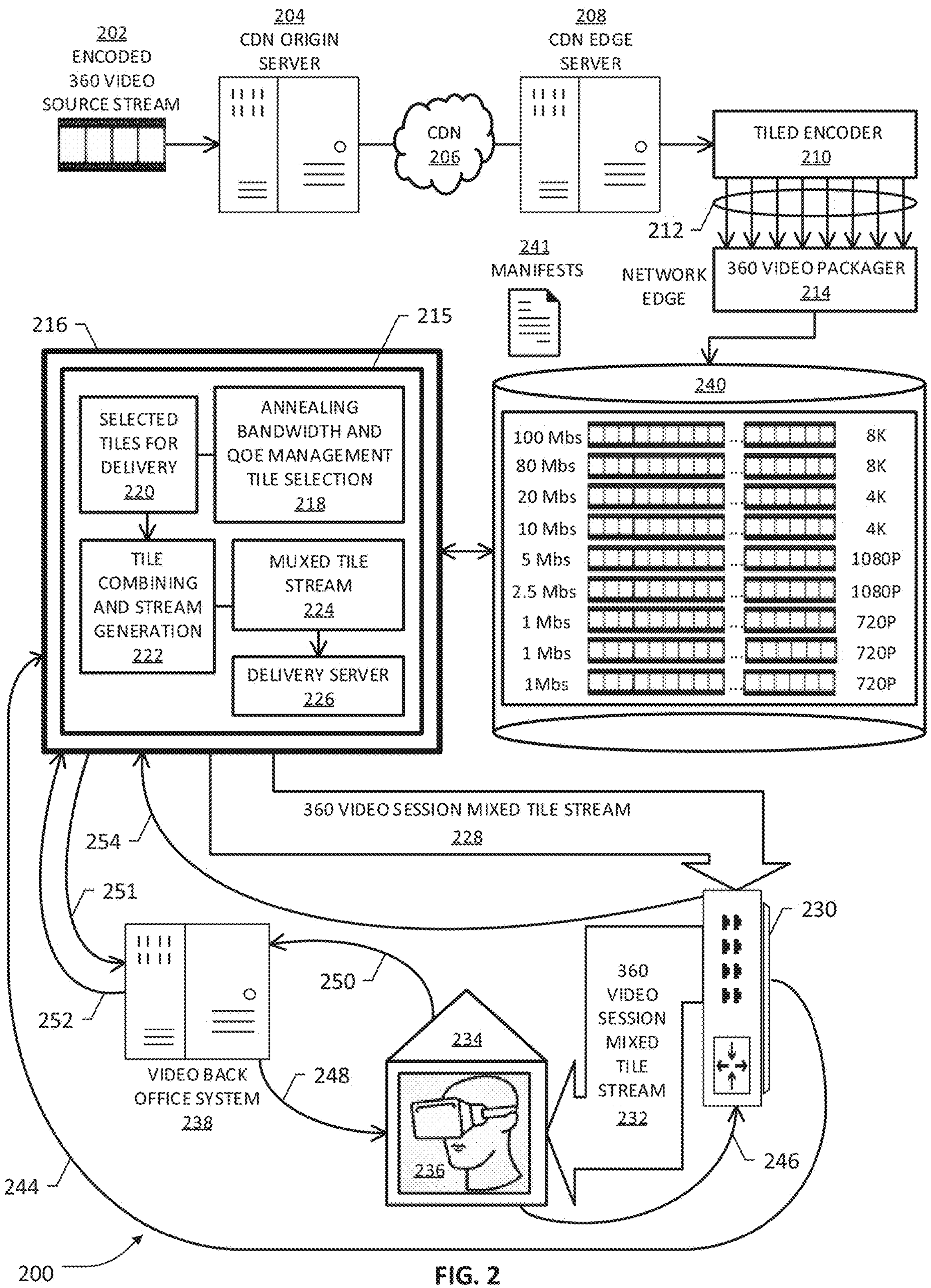
FIG. 2 depicts an example network architecture comprising a portion of the environment shown in FIG. 1 for facilitating optimized tile encoding of 360° immersive video according to an example embodiment.

Without limitation, an example network architecture 200 (which may form a portion of the environment shown in FIG. 1) is depicted in FIG. 2 for facilitating optimized tile encoding of immersive video according to an embodiment of the present invention. A media input stream 202 is illustrative of a video stream corresponding to a 360° video asset that may be suitably stitched, projection-mapped and/or encoded as set forth in FIG. 1, which may be distributed, uploaded or otherwise provided to a CDN origin server 204 associated with an operator content delivery network 206. Broadly, media input stream 202 may comprise a stream corresponding to least one of live TV content, IPTV content, time-shifted (TS) TV content, place-shifted (PS) TV content, gaming content, Video on Demand (VOD) content, VR/AR/MR content, networked digital video recorder (nDVR) content, and the like, or any content that is (pre)processed for 360-degree viewing experience. A CDN edge server 208 coupled to CDN 206 may be configured to receive the uploaded media stream(s) 202 corresponding to respective video assets, which may be stored in suitable database(s) (not specifically shown). A tiled encoder 210, which may be configured to operate in compliance with a standard codec scheme (e.g., HEVC, AV1, etc.) is operative to generate a plurality of tiled adaptive bitrate streams 212 where each stream may comprise tiles of a specific resolution, bitrate, and pixel sizes (depending on aspect ratios). By way of illustration, steams 212 may comprise one or more 32K streams (30730 horizontal pixels×17280 vertical pixels), 16K streams (15360 horizontal pixels×8640 vertical pixels), one or more 8K streams (7680 horizontal pixels×4320 vertical pixels), one or more 4K streams (3840 horizontal pixels×2160 vertical pixels), one or more HD streams (1920 horizontal pixels×1080 vertical pixels), one or more 720p streams (1280 horizontal pixels×720 vertical pixels), etc., wherein higher resolution streams may be encoded at higher bitrate ranges while lower resolution streams may be encoded at lower bitrate ranges. For instance, 32K streams may be encoded in the range of 800-1000 Mbits/s (or Mbps), 16K streams may be encoded in the range of 200-300 Mbps, 8K streams may be encoded in the range of 80 to 100 Mbps, and so on to 720p streams encoded in the range of 1.2 to 3 Mbps. Further, tiled adaptive bitrate streams 212, also referred to as tile-encoded bitstreams, may comprise frames having a suitable number of tiles per frame, e.g., 128 tiles for 4K, depending on the scheme being employed.

In one arrangement, tiled encoder 210 may be configured to generate tiled-encoded bitstreams as a plurality of phase-encoded streams for each bitrate representation of the media input stream 202, wherein each phase-encoded stream for a particular bitrate representation is provided with a specialized frame at a particular location in the Group-of-Pictures (GOP) structure of the stream depending on the phase as will be set forth in additional detail further below. This scheme of encoding may be referred to as Phased Encoding (PE) scheme with respect to certain embodiments of present invention. In another arrangement, tiled encoder 210 may be configured to generate a pair of tiled-encoded bitstreams, e.g., a first and a second tile-encoded bitstream, for each bitrate representation of the media input stream 202, wherein a first encoded bitstream may comprise a regular or standard tile-coded bitstream generated according to a known or heretofore unknown coding scheme and a second encoded bitstream may be coded such that a specialized frame is provided at each location in a GOP structure, as will be set forth in additional further below. This scheme of encoding may be referred to as Block-Intra Encoding (BIE) or All-Intra Encoding (AIE) scheme with respect to certain embodiments of the present invention.

Regardless of whether PE-coding scheme or BIE-coding scheme is used, a packager 214 is operative to package the tile-encoded bitstreams 212 and generate suitable manifest files describing characteristics of tile groupings per frame for each tile-encoded bitstream, e.g., tile location, slice header information, various types of metadata including picture timing, color space information, video parametric information, etc., which may be stored at a suitable packaged media storage facility 240, along with suitable stream manifests 241. A network edge node 216 including a video optimization system 215 comprising a plurality of modules or subsystems is operative in association with a video back office system 238 for effectuating a 360° immersive video session with a premises device 236 of subscriber premises 234 that is served by a managed bandwidth pipe 232 effectuated via a suitable access network (e.g., a DSL/DOCSIS network portion having suitable infrastructure that may include, e.g., routers, DSLAM/CMTS elements, etc., or suitable 3G/4G/5G radio access network elements, including fixed wireless infrastructure in certain implementations, and the like), generally represented by node or element 230.

In one arrangement, video optimization system 215 may comprise a tile selection subsystem 218 that is operative responsive to bandwidth annealing and QoE management policies, as well as user gaze vector information, inter alia, to provide tiles 220 selected from different video quality bitstreams to a tile combining and stream generation subsystem 222. Multiplexed video frames with tiles from different bitstreams 224 may be provided to a delivery service 226 for facilitating the transmission of muxed tile stream 228 to the downstream infrastructure 230. Broadly, when a user request 250 for a 360° immersive video session is generated, it is processed by the video back office system 238 and forwarded to the video optimization system 215 via a message 252 for obtaining a session ID and associated location information for the requested 360° media. Responsive to a response message 251 from the video optimization system 215, the video back office system 238 is operative to provide a response 248 including appropriate URL information for the media and a session ID to the requesting device 236. User gaze information (which may be a default setting initially) and associated session ID information may be provided to the infrastructure element 230 as a message 246, which may be propagated to the video optimization system 215 as message 254. Also, the infrastructure element 230 is operative to provide a dynamic bandwidth allocation message 254 that includes the session ID information to the video optimization system 215 in a related or separate process. As noted previously, tile selection subsystem 218 may be configured to operate in response to control messages relative to bandwidth allocation, user gaze vector information, or both, for selecting tiles having different video qualities, which may be combined or stitched into frames in order to generate a muxed tile-encoded video output stream. In one arrangement, the tile combining and stream generation subsystem 222 may be provided as part of the video optimization system 215 during video stream delivery. In another arrangement, the tile stitching may be effectuated during playout on the client side (e.g., at the client device 236 or some other premises equipment associated therewith) rather than on the server side. In this arrangement, a client-side stitching functionality is operative to receive the selected tiles and perform the necessary stitching in order to generate a stitched stream to be decoded and rendered. Various embodiments relative to the foregoing processes, subsystems and components will be set forth in further detail in the following sections.

Figure 3:
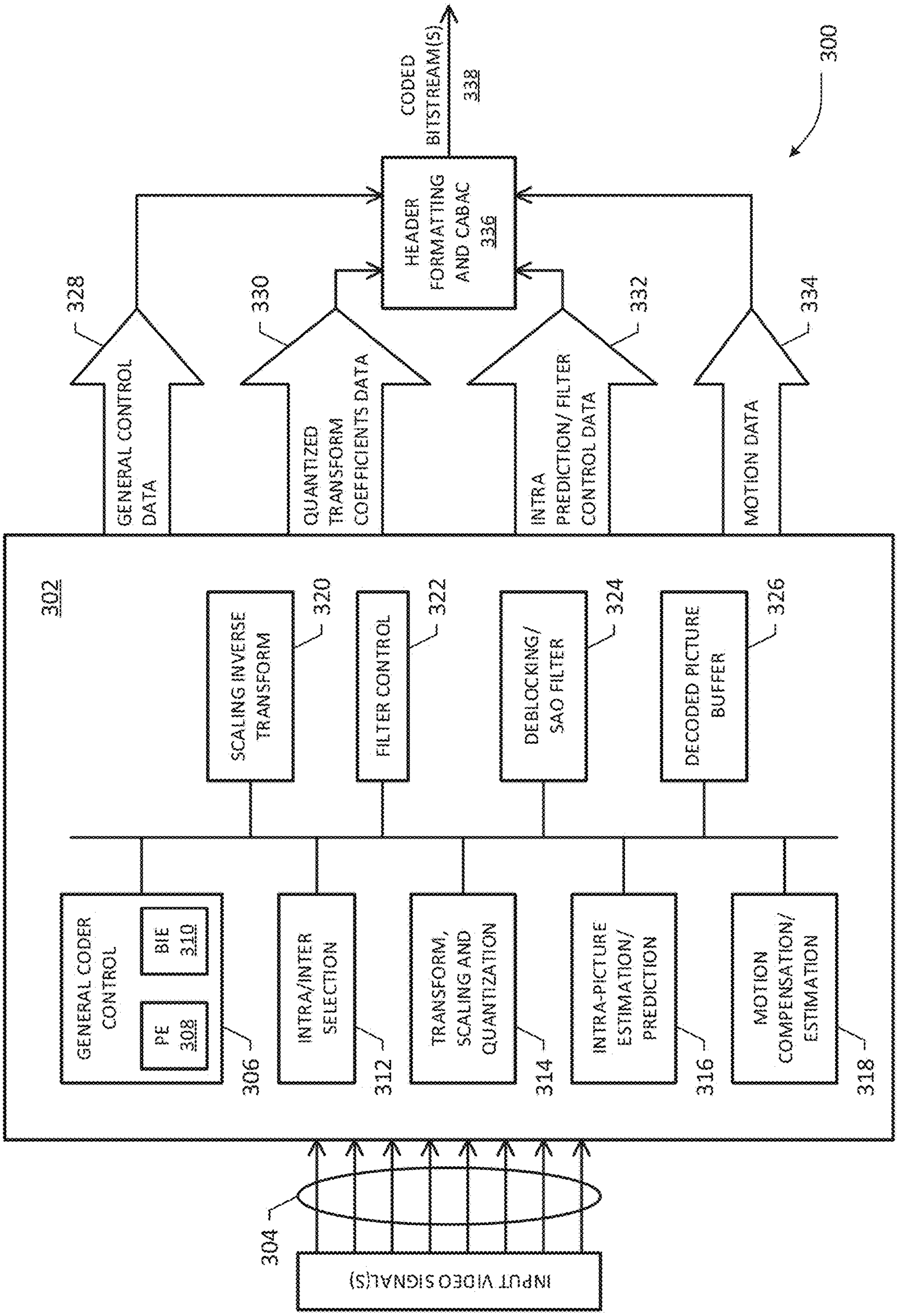
FIG. 3 depicts a block diagram of an example tile encoder that may be provided as part of a media preparation and/or processing system configured to operate in an arrangement of the network architecture of FIG. 2.

FIG. 3 depicts a block diagram of an example tile encoder 300 that may be provided as part of a media preparation and/or processing system configured to operate within an arrangement of the network architecture of FIG. 2. Without limitation, example tile encoder 300 will be set forth below that may be configured to effectuate either a PE coding scheme or a BIE coding scheme for generating multi-bitrate video streams having different qualities with respect to each media asset while being compliant with known or heretofore unknown standard codec schemes, such as, e.g., H.265, H.266, VVC, AV1, etc., that are compatible with tile encoding. Broadly, in one embodiment, a specialized frame (or, somewhat synonymously, a picture) is generated that is encoded as a predictive-coded (P) picture or frame (i.e., having a header identifying it as a P-frame) but only contains coding blocks or units that are encoded as intra-coded blocks or units (i.e., I-blocks). In another embodiment, a specialized frame may comprise a frame identified as a bi-predictive (B) frame but contains only I-blocks. For purposes of the present patent application, these specialized frames are referred to as “block-intra” frames or “X” frames, where media image data of all the blocks are forced to be coded as intra-coded (i.e., no temporal estimation or prediction).

For purposes of example embodiments herein, a GOP structure is a group of successive pictures in a coded video stream, which specifies the order in which intra- and inter-frames are arranged. Each coded video stream comprises successive GOPs, from which the visible frames may be generated. Generally, a GOP structure may contain the following picture types: (1) I-picture or I-frame (intra coded picture)—a picture that is coded independently of all other pictures. Each GOP begins (in decoding order) with this type of picture. (2) P-picture or P-frame (predictive coded picture)—contains motion-compensated difference information relative to previously decoded pictures. In older designs such as MEPG-1, H.262/MPEG-2 and H.263, each P picture can only reference one picture, and that picture must precede the P picture in display order as well as in decoding order and must be an I or P picture. These constraints do not apply in the newer standards such as, e.g., H.264/MPEG-4 AVC, H.265/HEVC, etc. (3) B-picture or B-frame (bi-predictive coded picture or bidirectionally predictive coded picture)—which contains difference information from the preceding and following I- or P-frame within a GOP, and contains motion-compensated difference information relative to previously decoded pictures. In older designs such as MPEG-1 and H.262/MPEG-2, each B-picture can only reference two pictures, the one which precedes the B picture in display order and the one which follows, and all referenced pictures must be I or P pictures. These constraints do not apply in the newer standards such as, e.g., H.264/MPEG-4 AVC, H.265/HEVC, etc. (4) D-picture or D-frame (DC direct coded picture)—serves as a fast-access representation of a picture for loss robustness or fast-forward in certain types of video (e.g., MPEG-1 video).

In general, an I-frame indicates the beginning of a GOP. Afterwards several P and B frames may follow. The I-frames contain the full image and do not require any additional information to reconstruct it. Typically, encoders use GOP structures that cause each I-frame to be a “clean random access point,” such that decoding can start cleanly on an I-frame and any errors within the GOP structure are corrected after processing a correct I-frame. The GOP structure is often referred by two numbers, for example, M=3, N=12. The first number tells the distance between two anchor frames (I or P). The second one tells the distance between two full images (I-frames), which is the GOP size. For the example M=3, N=12, the GOP structure is {IBBPBBPBBPBBI}. Instead of the M parameter the maximal count of B-frames between two consecutive anchor frames can be used. For example, in a sequence with pattern {IBBBBPBBBBPBBBBI}, the GOP size is equal to 15 (length between two I frames) and distance between two anchor frames (M value) is 5 (length between I and P frames or length between two consecutive P Frames).

While a typical GOP starts with an I-frame, some embodiments herein provide a structure where a GOP may commence with an X-frame instead, in addition to placing the X-frames at specific locations or replacing the P- and/or B-frames in the GOP structure as will be set forth in additional detail further below.

Figure 4A:
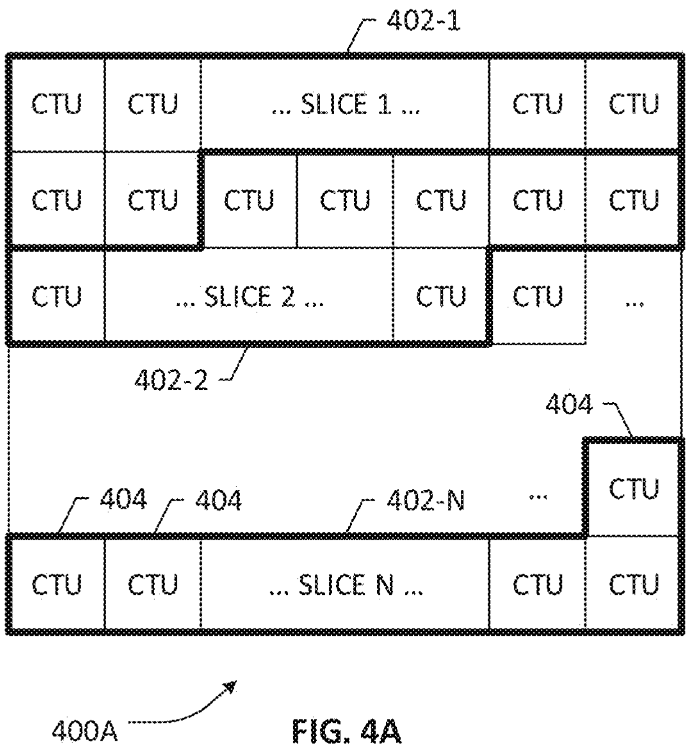
FIGS. 4A-4C illustrate example video frames containing one or more slices and/or tiles per each frame in an example encoder arrangement.

Skilled artisans will recognize that depending on codec implementation, a picture or frame may be partitioned into a number of ways at different levels of granularity, for example, to facilitate, inter alia, coding efficiency, parallel processing, etc. In one arrangement, a frame may be partitioned into a number of coding tree units (CTUs), each containing certain number of luma coding tree blocks (CTBs) and chroma CTBs, which in turn may comprise multiple coding blocks (CBs). A frame may be split into one or more slices, each being a spatially distinct region of a frame that may be encoded separately from any other region in the same frame and identified with a slice header. In general, slices are self-contained and contain a sequence of CTUs that are processed in the order of a raster scan, wherein slices can be coded as I-slices, P-slices, or B-slices similar to I-frames, P-frames, or B-frames, respectively. In one arrangement, slices may be used to effectuate resynchronization to minimize data losses, and may contain a varying number of CTUs per slice depending on the activity in a video scene. FIG. 4A illustrates an example video frame 400A containing a plurality of slices 402-1 to 402-N, where an example slice 402-N contains a number of CTUs 404.

Figure 4B:
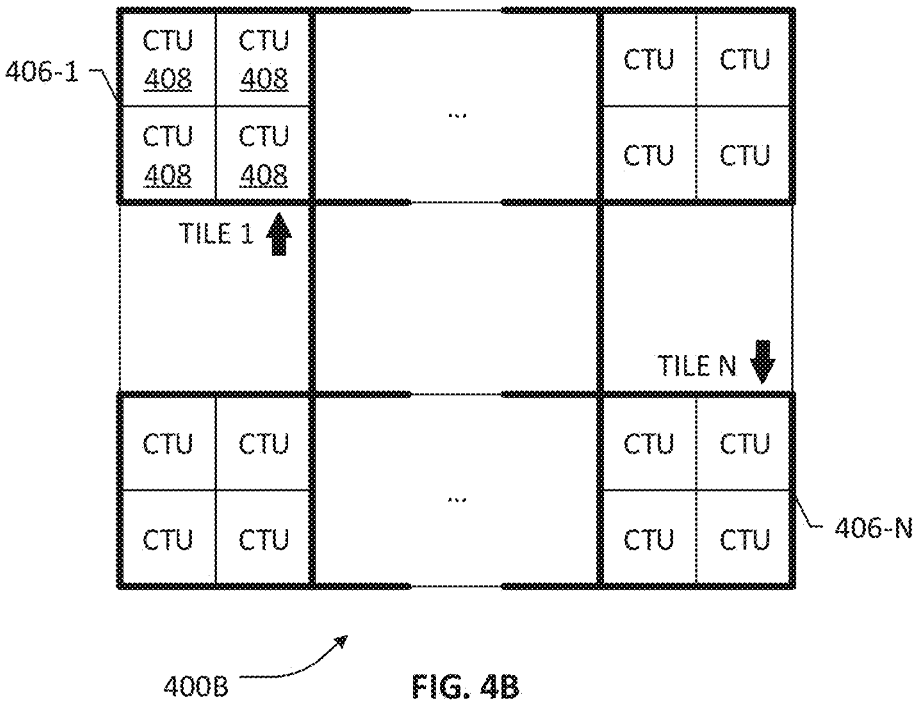
Figure 4C:
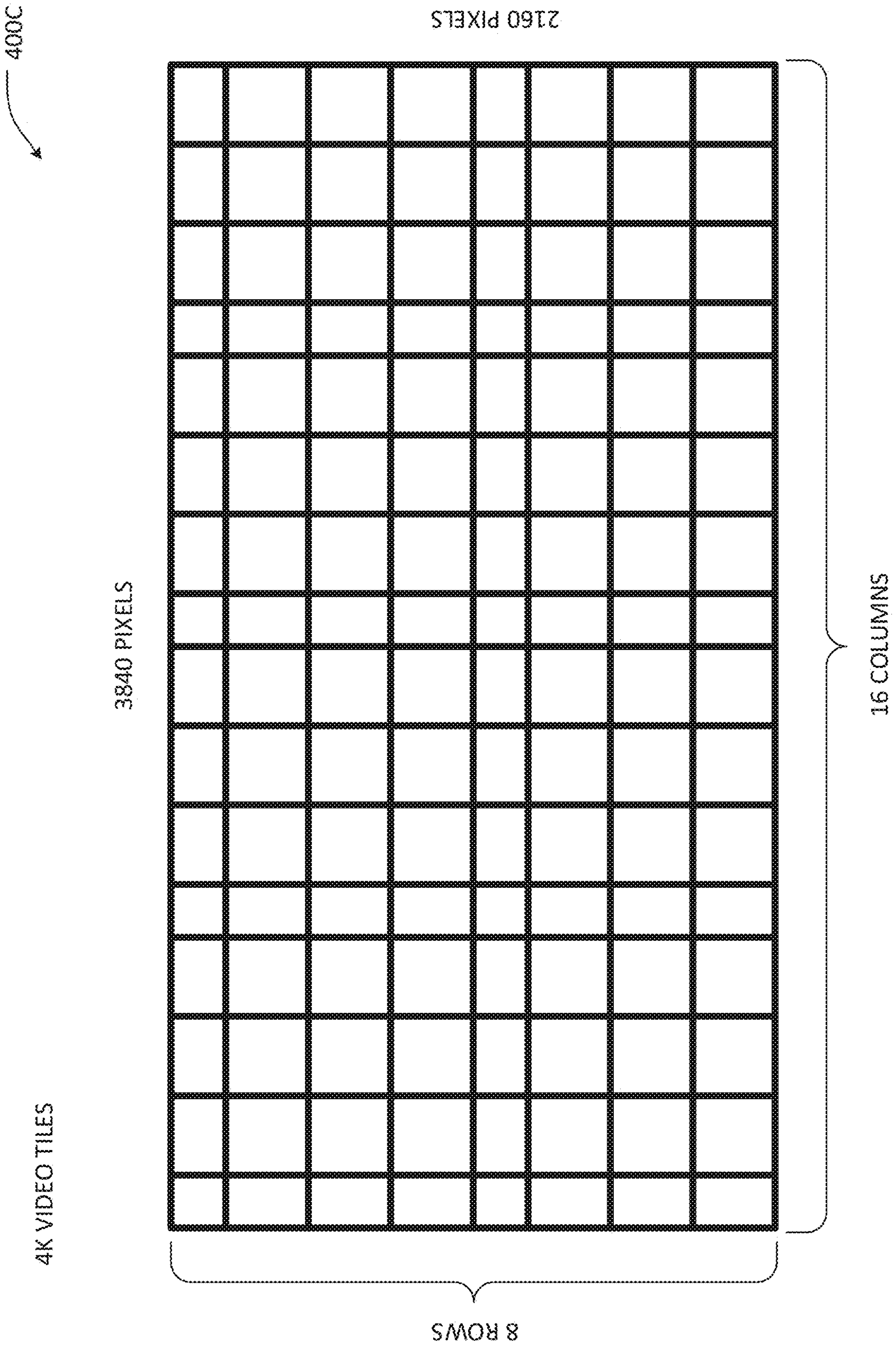

In addition to slices, an encoding scheme may also define a number of tiles per frame, which may also be configured to be self-contained and independently decodable rectangular or square regions of a picture, based on vertical and horizontal partitioning to form a grid, in order to facilitate parallel processing at the encode and decode stages. In one variant, the self-contained and independently decodable tiles may use temporal prediction from the co-located tiles of previously encoded pictures or frames. Multiple tiles may share header information by being contained in the same slice, where a tile may comprise a certain number of CTUs. It is not a requirement that each tile include the same number of CTUs. Accordingly, in one arrangement, the tiles of a frame may have different sizes. If a frame contains a single slice, the tiles of the frame will therefore have the same slice header and picture header information. In another arrangement, a frame may include one or more slices, each slice containing one or more tiles, and each tile in turn containing one or more CTUs. FIG. 4B illustrates an example video frame 400B containing a plurality of CTUs, organized into a matrix or array of tiles 406-1 to 406-N, wherein each tile is shown as a square with 4 CTUs 408 in a 2×2 configuration. By way of further illustration, an example 4K video frame 400C according to HEVC is shown in FIG. 4C, which may comprise an array of 3840 horizontal pixels by 2160 vertical pixels, that is partitioned into 16 columns and 8 rows, thereby resulting in 128 tiles. As noted earlier, these tiles may not be necessarily sized equally within the frame 400C.

For purposes of the present patent application, because video frames may be partitioned in numerous ways and at different levels, the terms “coding tree unit”, “coding tree block”, “coding unit”, “macro block”, or “block” or terms of similar import will be generally treated as an abstract unit of coding that may applied with respect to a tile, slice and/or frame without limitation to any particular video compression standard or technology.

Returning to FIG. 3, example tile encoder 300 may be configured with respect to a PE- or BIE-based scheme to generate an X-frame where it is coded as a P- or B-frame having the corresponding header but with individual slices and/or tiles that are intra-coded, i.e., as I-slices and/or I-tiles, comprising only I-blocks. In other words, the X-frames may have header information of a P- or B-frame (or P-slice or B-slice if only one slice per frame is provided), but all the media image data is intra-coded as data of an I-frame. Remaining frames of a video sequence may be encoded normally in accordance with a known or heretofore unknown scheme as noted previously. Accordingly, a general coder control 306 may be configured to select between the PE and BIE schemes 308, 310 for providing appropriate control signals and/or parameters to remaining components and structures of a frontend portion 302 of the tile encoder so as to force the encoding of the special frames as needed according to a particular implementation of the PE or BIE schemes with respect to one or more input video signals 304. In general, each picture in a PE scheme is either encoded as a regular I-frame (e.g., for the first picture in a sequence) or as an X-frame for those input pictures that match the phase/period, and as regular P- or B-frames for all other pictures of the video sequence, as will be described in further detail below. With respect to the BIE scheme, a BIE-coded sequence may be provided where X-frames are provided for all P- and B-frames of a GOP structure of the sequence. Accordingly, an intra/inter selection block 312 is configured such that intra-picture estimation/prediction 316 is always active and used for all blocks of a picture. Likewise, motion compensation and estimation 318 may be disabled since all blocks are intra-coded for an X-frame. Remaining blocks comprising transform, scaling and quantization 314, inverse transform 320, filter control 322, deblocking and sample adaptive offset (SAO) filtering 324, decoded picture buffer 326 may remain unaffected in an example embodiment depending on the tile encoder implementation. General control data 328, quantized transform coefficients data 330, intra prediction and filter control data 332 and motion data 334 may be provided to a header formatter and entropy encoder 336 (e.g., a context-adaptive binary arithmetic coding (CABAC) engine) for generating one or more coded bitstreams 338 corresponding to each bitrate representation of the video asset. As noted previously, the coded bitstreams 338 may be provided to a tiled packager (not shown in this FIG. 3) for packaging and manifest generation to facilitate (pre)provisioning of the assets at appropriate downstream network locations.

Figure 6:
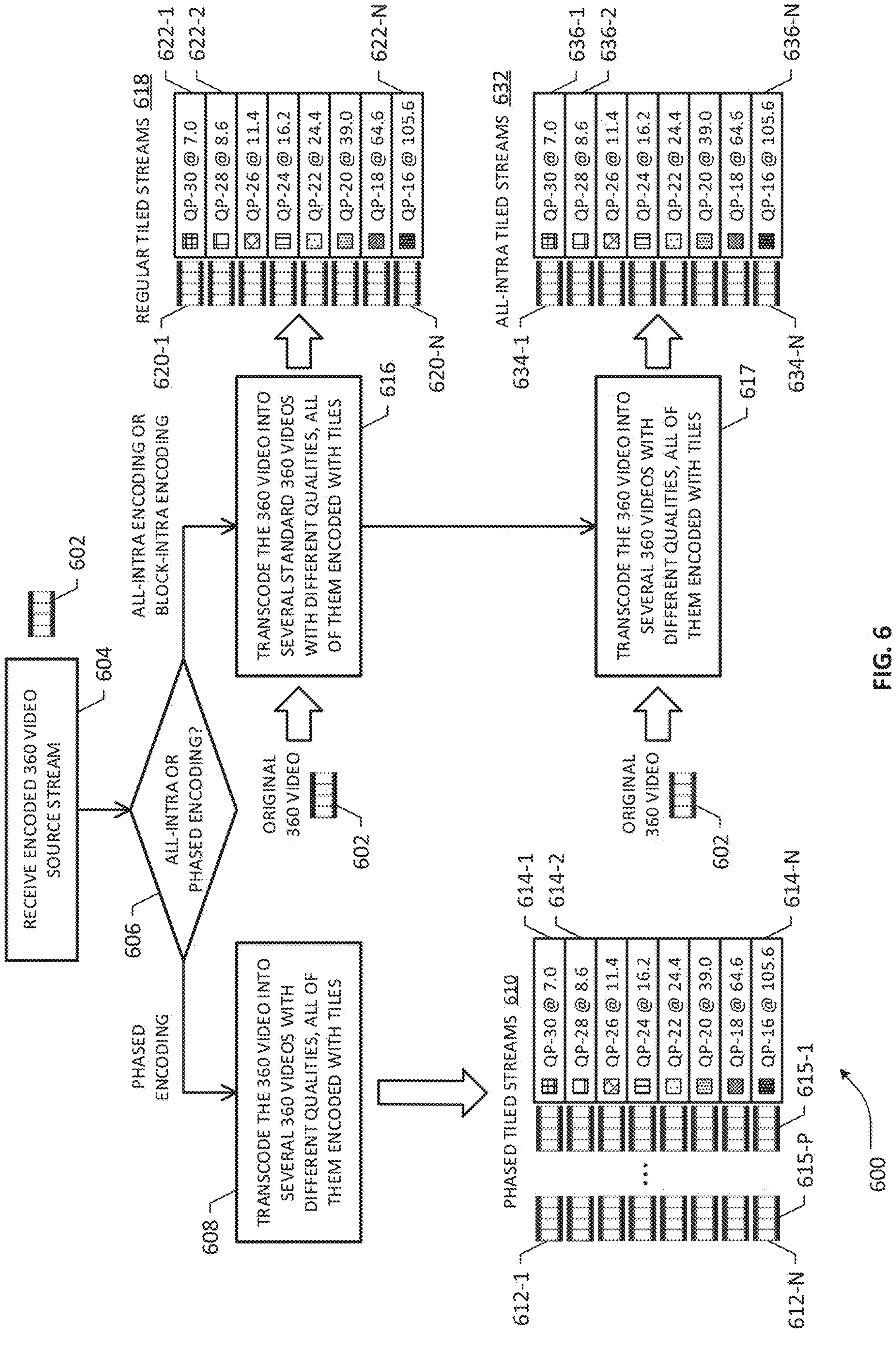
FIG. 6 is illustrative of various blocks, steps and/or acts of an example encoding arrangement involving either a Phased Encoding (PE) scheme or a Block-Intra Encoding (BIE) scheme that may be implemented as part of the example media preparation/processing method of FIG. 5 according to one or more embodiments of the present invention.

FIG. 6 is illustrative of various blocks, steps and/or acts of an example encoding arrangement 600 involving either a PE scheme or a BIE scheme that may be implemented as part of an example media preparation/processing according to an embodiment of the present invention. At block 604, a video source stream 602 is received, which may be unencoded, encoded, stitched, projection-mapped, or otherwise pre-processed, as previously described. At block 606, a determination may be made where PE or BIE is selected. A mode selector in a tile encoder system, e.g., tile encoder 300 in FIG. 3, may be appropriately configured in response. Upon selecting PE, the video source stream 602 may be encoded/transcoded into a plurality of streams with different qualities and/or bitrates, each being encoded with tiles, as set forth at block 608. Each quality or bitrate stream is phase-encoded to generate a plurality of PE streams 610. By way of illustration, reference numeral 614-1 refers to quality information relating to a set of phase-encoded streams 612-1 with corresponding phases 615-1 to 615-P (depending on where an X-frame is placed in GOP structure, where P is the GOP size), all PE streams having a Quantization Parameter (QP) setting of 30 and/or a bitrate of around 7.0 Mbits/s, which may be indicative of a lower end of quality. In similar fashion, reference numeral 614-N refers to quality information relating to a set of phase-encoded steams 612-N with corresponding phases 615-1 to 615-P, all having a QP setting of 16 and/or a bitrate of around 105.6 Mbits/s, which may be indicative of a higher end of quality.

If BIE (also referred to as All-Intra Encoding, as noted elsewhere in the present patent application) is selected, the video source stream 602 may be encoded/transcoded into a plurality of streams with varying qualities and/or bitrates (block 616). In one example embodiment, each of the streams may be tile-encoded using a standard coding scheme (e.g., HEVC, AV1, etc.) to generate normal or regular tile-encoded streams 618. Similar to the discussion above with respect to the phased-tiled streams 610, reference numeral 622-1 refers by way of illustration to quality information relating to a regular tile-encoded stream 620-1 having a QP setting of 30 and/or a bitrate of around 7.0

Mbits/s, which may be indicative of a lower end of quality. Likewise, reference numeral 622-N refers to quality information relating to a regular tile-encoded steam 620-N having a QP setting value of 16 and/or a bitrate of around 105.6 Mbits/s, which may be indicative of a higher quality stream.

Additionally, the video source stream 602 is also encoded/transcoded into a plurality of streams with corresponding qualities and/or bitrates (block 617) where each stream is tile-encoded such that all frames of it's GOP structure are provided as X frames. By way of illustration, reference numeral 632 refers to a plurality of BIE-coded and tiled streams, wherein quality information 636-1 having a QP setting of 30 and/or a bitrate of around 7.0 Mbits/s (also sometimes abbreviated as Mbs or Mb/s) relates to a lower quality BIE-coded tiled stream 634-1 while quality information 636-N of QP setting of 16 and/or a bitrate of around 105.6 Mbits/s relates to a higher quality BIE-coded tiled stream 634-N.

Skilled artisans will recognize upon reference hereto that when an encoder is configured with a target QP, the bitrate of an encoded bitstream is somewhat averaged over the course of the bitstream. For instance, if a QP of 10 is targeted in a source encoding scheme, it is possible that a low bitrate may be seen in areas of no motion (e.g., resulting in 4 Mbs). In areas of high motion, it is possible that the bitrate could shoot up to 200 Mbs. Thus, in an example encoding scheme that targets specific QPs as set forth in the foregoing, the bitrates of the output steams could be variable over a range. Accordingly, it should be appreciated that the bitrates shown in association with the QPs of PE or BIE streams in FIG. 6 are generally indicative of average bitrates over a course of time. As will be seen further below, when QPs are targeted in an encoding scheme (with varying bitrates correspondingly), certain embodiments of the present invention relating to tile selection may be configured to select tiles and fit them in accordance with an overall allocated bitrate with respect to a particular 360-degree immersive video session. In an additional or alternative embodiment, an example encoder may be configured to generate coded bitstreams having specific target bitrates instead of target QPs. In such an arrangement, while an output bitstream may maintain a particular bitrate, the QP values may vary, however. An embodiment of tile selection may therefore select tiles based on video qualities that may be controlled by different encoding parameters and settings and fit them accordingly to optimize the allocated bandwidth. For purposes of the present patent application, the terms "quality", "video quality", and terms of similar import with respect to coded bitstreams or bitrate representations may be broadly related to and/or based on QPs, bitrates, and other indicia. Thus, embodiments relating to PE/BIE encoding, tile selection, stitching and the like set forth herein based on targeted QPs are also equally applicable to bitstreams having targeted bitrates, mutatis mutandis.

Accordingly, it should be understood by the reader that although certain examples and portions of the description within this disclosure are provided assuming the use of a fixed quantization parameter (QP) value per stream, streams in practice may contain QP values that vary between pictures and within a picture as noted above. An encoder according to an embodiment of the present invention may control its output bitrate by the means of a rate-control or the like, and thereby change the QP value between pictures. An encoder may also encode pictures within one stream using varying QP values to optimize the visual quality of the stream. Within one picture, the QP value may change between blocks using e.g., adaptive quantization mechanisms to optimize the visual quality as known in the art. The use of "QP" in phrases within this disclosure such as e.g., but not limited to, "encoded with that QP", "video of different QP values", "generated videos with different QP values", "stream having a QP value of N", "QP value of the video stream" should be understood as a way of characterizing streams such that a stream associated with a lower QP value is of higher bitrate and higher quality than one associated with a higher QP value, and not that the QP is kept static for each block in a stream.

It should be further appreciated that adaptive bitrate encoding and tile encoding of media assets may be integrated within an apparatus as part of a content preparation system in one example embodiment such that various types of encoding and/or transcoding may take place in different sequences and/or in parallel processes. Further, additional functionalities such as projection-mapping, source stream stitching, packaging, etc., may also be combined or otherwise integrated with the tile-coding/transcoding schemes of the present patent application depending on implementation.

Figure 5:
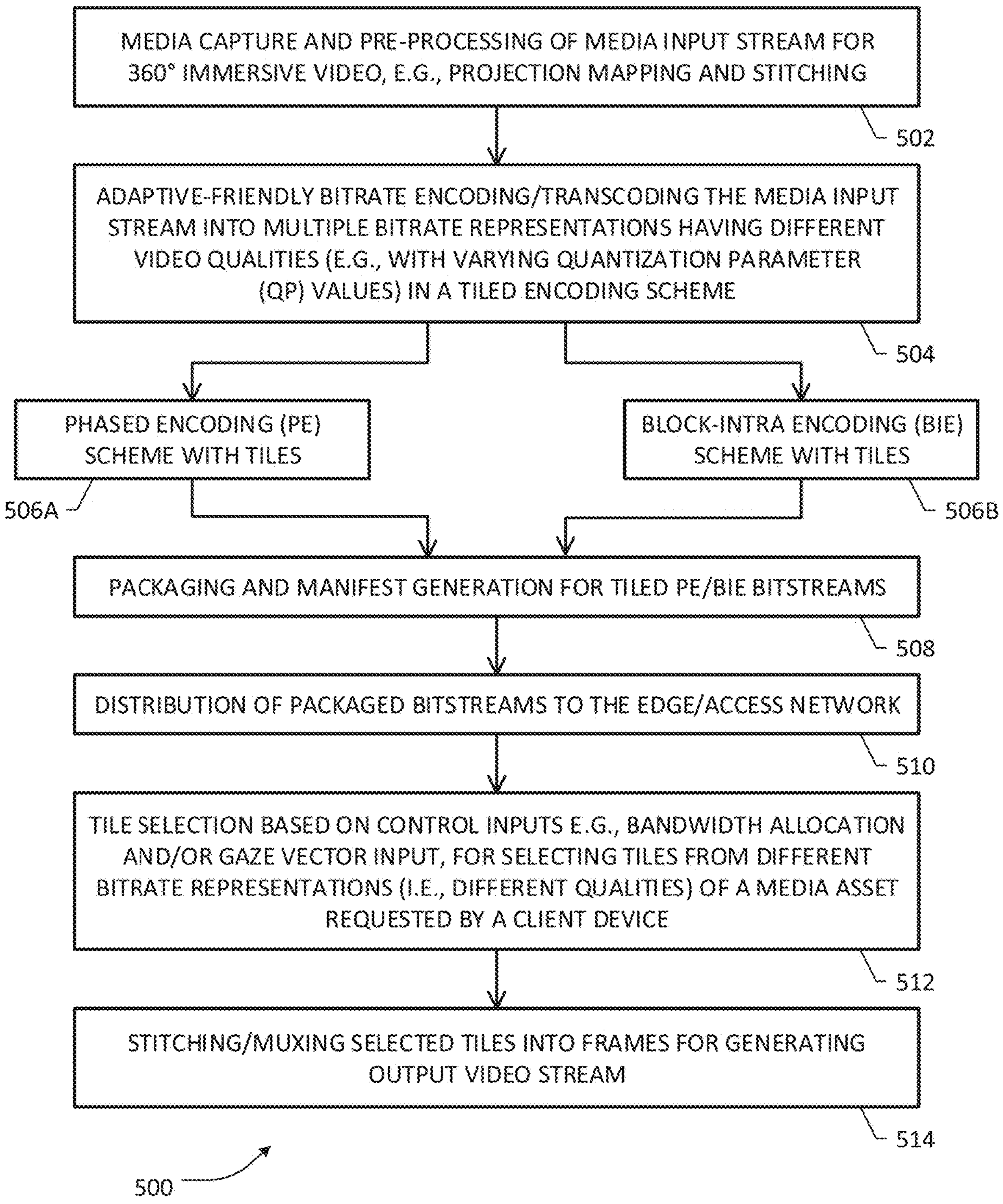
FIG. 5 is a flowchart illustrative of various blocks, steps and/or acts of a media preparation/processing method that may be (re)combined in one or more arrangements, with or without blocks, steps and/or acts of additional flowcharts of the present disclosure, for facilitating optimized 360° immersive video according to one or more embodiments of the present invention.

FIG. 5 is a flowchart illustrative of various blocks, steps and/or acts of a method 500 that may be (re)combined in one or more arrangements, with or without blocks, steps and/or acts of additional flowcharts of the present disclosure, for facilitating optimized 360° immersive video according to one or more embodiments of the present invention. At block 502, various operations relative to media capture and preprocessing of a media input stream for immersive video, e.g., source stream stitching, encoding, projection mapping, etc. may be effectuated. At block 504, adaptive-friendly bitrate encoding/transcoding of the preprocessed media input stream into multiple bitrate representations or streams having different video qualities (e.g., with varying QP values) may be effectuated in association with a tiled encoding scheme. As noted previously, either a PE-based coding process (block 506B) or a BIE-based coding process (block 506A) may be configured to generate coded bitstream output. It should be noted that the processes of blocks 504 and 506A/B could be executed as single encoding operations such that the adaptive-friendly bitrate encode/transcoding of block 504 is done using either a PE scheme (block 506A) or a BIE scheme (block 506B) using a single encode process. Thereafter, the coded bitstreams may be packaged (block 508) and distributed to appropriate network edge locations (block 510) for delivery and consumption by clients using suitable end user equipment. When a user request for a particular media asset is received and processed, a tile selection process based on control inputs e.g., transmission conditions, bandwidth allocation and/or gaze vector input, etc., may be effectuated for selecting tiles from different bitrate representations (i.e., different qualities) of the media asset (block 512). A stream generation process may be effectuated for stitching the selected tiles into frames as an output video stream to be delivered to the requesting client device (block 514).

Figure 7:
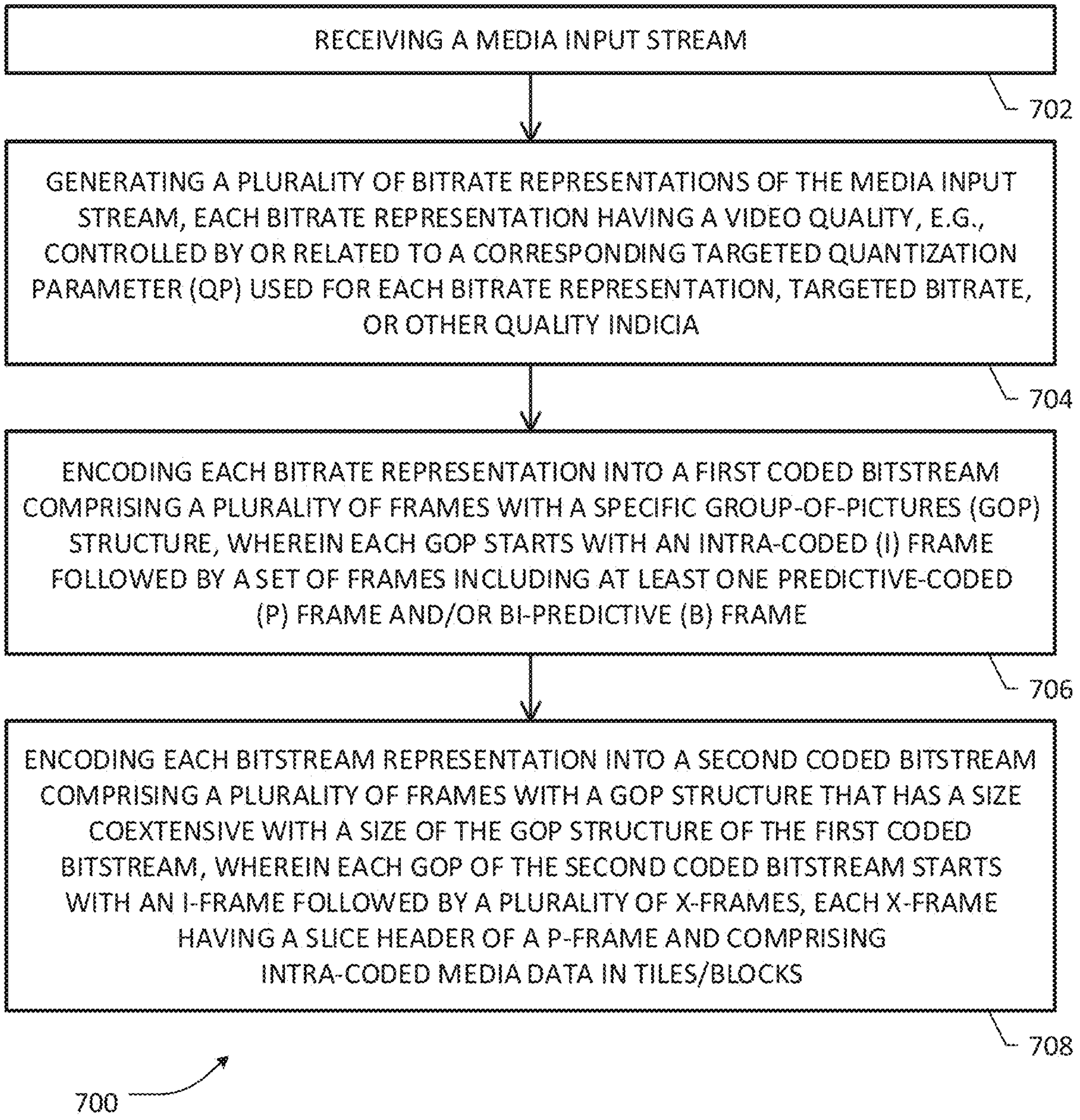
FIG. 7 is a flowchart illustrative of a BIE scheme according to an example embodiment of the present invention.

Skilled artisans will recognize that at least a portion of the foregoing steps, acts or operations may comprise media preparation and (pre)provisioning with respect to one or more 360° immersive video assets distributed in a network environment or architecture illustrated in FIGS. 1 and 2 described above. Turning to FIG. 7, additional details regarding a BIE scheme 700 according to an example embodiment of the present invention are set forth. At blocks 702 and 704, a media input stream relative to a 360° immersive video asset is received and processed to generate multiple bitrate representations having different/separate qualities, e.g., each video quality related to or controlled by a corresponding targeted QP value used for each bitrate representation and/or targeted bitrate, or other indicia of respective quality. Each bitrate representation is coded into a first coded bitstream comprising a plurality of frames with a specific GOP structure, wherein each GOP starts with an I-frame followed by a set of frames including at least one P-frame or B-frame (block 706). Further, each bitrate representation is encoded into a second coded bitstream comprising a plurality of frames with a GOP structure that has a size coextensive with the size of the GOP structure of the first coded bitstream, wherein each GOP of the second coded bitstream starts with an I-frame followed by a plurality of X-frames, each X-frame being coded with a slice/picture header of a P- or B-frame and comprising intra-coded media image data only (i.e., similar to an I-frame of the GOP), as set forth at block 708. As noted previously, the first coded bitstream and the second coded bitstream may be encoded as respective tile-encoded streams using any tile-compatible compression scheme, wherein each frame of the tile-encoded bitstream comprises an array of tiles organized into at least one slice per frame, each tile comprising a portion of the media data of the frame formed as a number of coding units, blocks or trees. One skilled in the art will recognize that in one implementation, processes of block 704 and 706 may be performed in a single encode process as noted previously in respect of blocks 504 and 506A/B of FIG. 5. For instance, in practice, a single process encoding/transcoding would be desirable to minimize the computational complexity and minimize degradations introduced by tandem or cascaded encoding.

Figure 11:
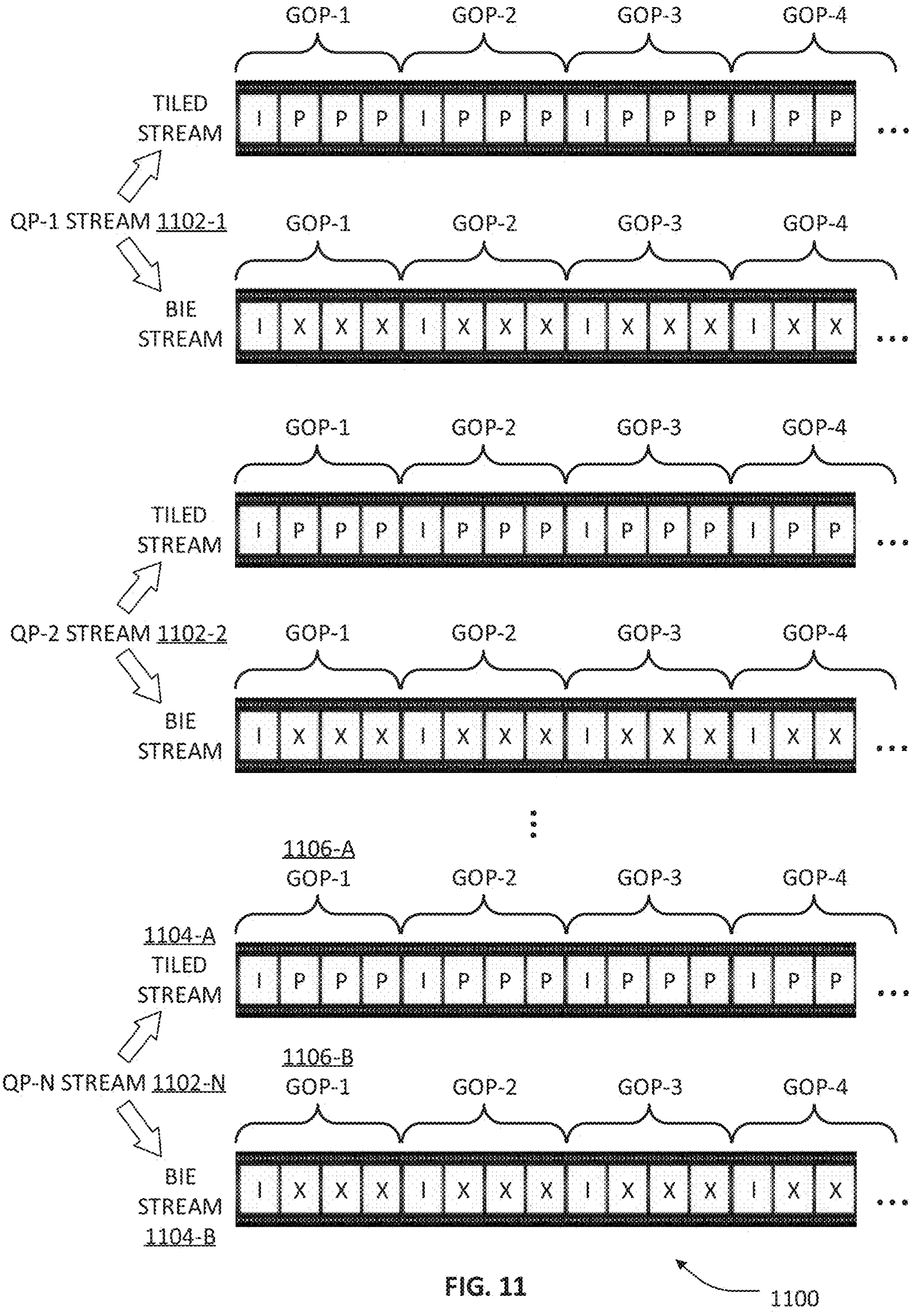
FIG. 11 depicts a plurality of coded bitstreams having different qualities generated by a BIE-based tiled encoder system in an example embodiment.

FIG. 11 depicts a plurality of coded bitstreams 1100 having different qualities or QPs generated by a BIE-based tiled encoder system in an example embodiment. Reference numerals 1102-1 to 1102-N refer to N streams or bitrate representations having corresponding qualities or QPs. A normally encoded tiled stream 1104A corresponding to a particular bitrate representation, e.g., QP-N 1102-N, is illustrated with a GOP structure 1106A having four frames, starting with an I-frame followed by three P-frames. Corresponding BIE-coded stream 1104B has a GOP structure 1106B, which is also illustrated with four frames, starting with an I-frame but followed by three X-frames.

Figure 8A:
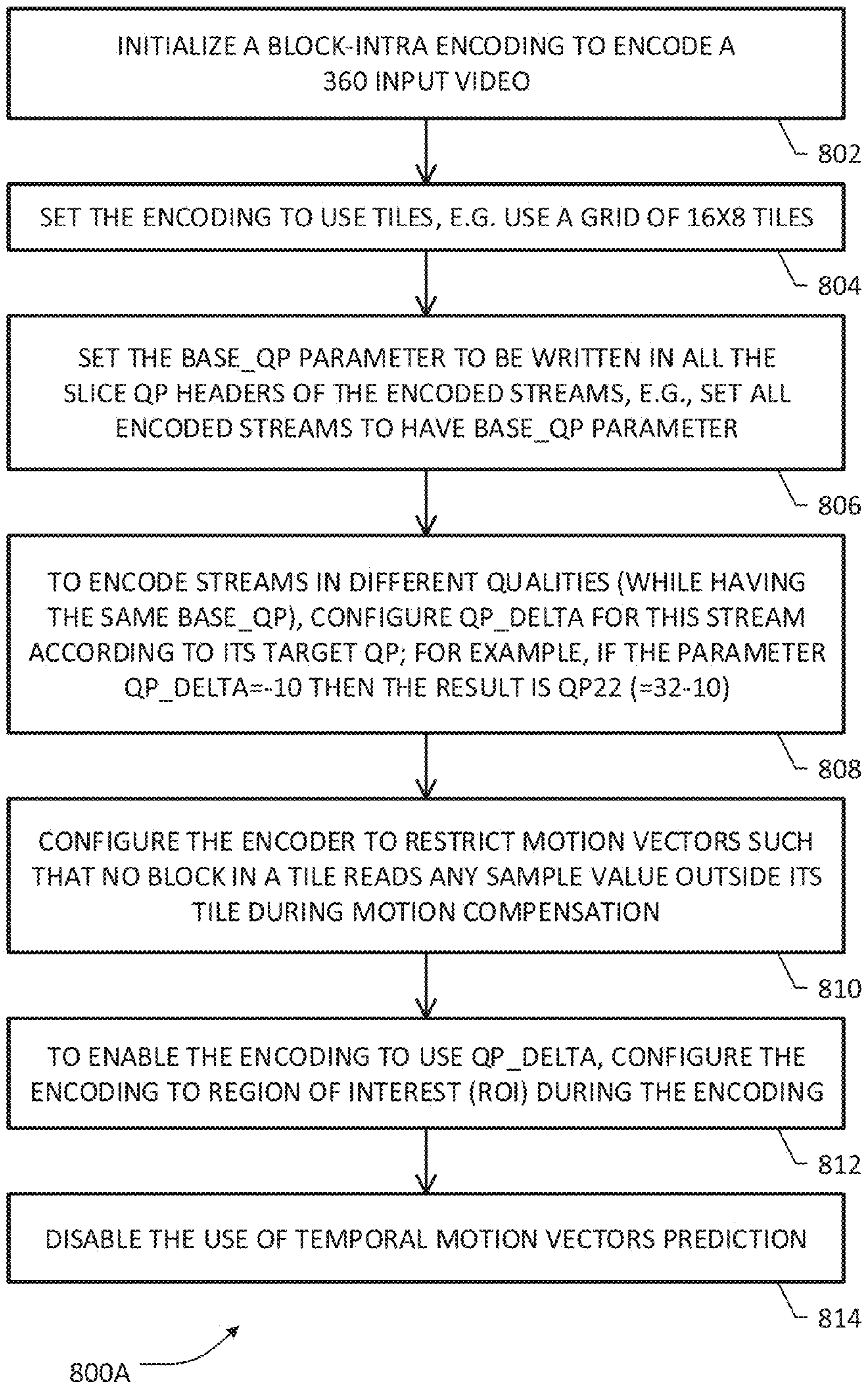
FIG. 8A is a flowchart illustrative of a process for configuring a BIE scheme in a tiled encoding arrangement according to an example embodiment of the present invention.

FIG. 8A is a flowchart illustrative of a process 800A for configuring a BIE scheme in a tiled encoding arrangement according to an example embodiment of the present invention. Without limitation, example process 800A will be described in reference to configuring an HEVC scheme for performing BIE based on modifying certain parameters, although other schemes may also be applied for purposes herein.

In general, an embodiment of a BIE configuration method may be configured to receive or obtain as input a source video stream for 360° immersive video and a list of output video qualities (e.g., a list of QP values, such as {QP1=16, QP2=18, QP3=20, QP4=22, QP5=24, QP6=26, QP7=28, QP8=30, or other indicia based on targeted bitrates}). Accordingly, without limitation, for every output video quality (e.g., every QP value), two video streams may be encoded—a regular/standard HEVC video with that QP or quality, and a Block-Intra HEVC video with that QP/quality—as noted previously. In order to be able at a later time (e.g., shortly before decoding) to stitch tiles from different qualities into the same bitstream, the encoding phase of an embodiment provides that all the video streams have the same base_qp (defined below), while the actual difference between the videos of different QP values may be effectuated by means of qp_delta (defined below) from the base QP. For example, a setting of base_qp=22 may be configured, wherein the parametric values base_qp=22 and qp_delta=−6 may be used to achieve QP=16. In general, these two parameters relate to setting the quality (QP) of a video stream. Recall that all the generated videos with the different qp values need to have the same base_qp, while different QP values may be achieved by using qp_delta from the base_qp. This requirement may be imposed based on one particular time instance. That is, if pictures in a bitstream are numbered, then any two pictures from two bitstreams that are used as input for stitching with the same numbers must use the same base_qp value in one arrangement. For purposes of the present invention, "base_qp" may be described as follows: the $i^{th}$ frame (for every i=1 to N, where N is the total number of frames in a video sequence) in all the encoded versions or bitrate representations of the same video will have the same slice QP value. In other words, slice QP is the base_qp. Although slice QP may be set as the same value in all the generated streams, it can vary over time. For purposes of the present invention, the parameter delta_qp may be described as follows: by assigning a given qp_delta, the first block in each tile that signals QP is configured to signal the delta_qp (that amount of variance from the base QP). It may be noted that there could be a deblocking mismatch after stitching in some embodiments.

Another parameter that may be defined for purposes of the present invention is ROI (Region of Interest), which determines an area of a frame where the tiles can be independently encoded so that the subset of the bitstream corresponding to the ROI can be easily extracted and reconstituted into another bitstream. As noted above, in order to later stitch videos of different QPs, it is desirable to utilize the functionality of base_qp and delta_qp. This is supported for example when using HEVC ROI encoding functionality in one illustrative implementation. Accordingly, when encoding with ROI in an embodiment, the base_qp parameter for the slice QP headers may be defined, in addition to defining an ROI grid (independently defined from the grid/array of the tiles of a frame) such that the area of the grid in the $i^{th}$ row and $j^{th}$ column in the ROI grid gets its own delta_qp. Generally, this allows an embodiment to assign different delta_qp to different areas of the ROI grid, whereby selective delta_qp values may be used for purposes of the present invention. For example, to achieve a given desired QP (say QP=16), the base_qp may be defined (say base_qp=22) using the regular qp parameter, and then by using the ROI grid, all the targeted areas may be assigned a delta_qp of −6, thus effectively achieving a QP of 16 for all the tiles in the ROI grid.

In one embodiment, the content at different qualities may be encoded using the same base_qp (slice QP) for a particular frame. For each quality of that frame, a specific desired QP may be set, wherein the delta_qp syntax elements may be used so that all blocks (or alternatively, as many blocks as possible or desired) of that frame are encoded with that desired QP. Additional aspects of a BIE configuration scheme based on HEVC may be set forth as follows.

The encoder may be set to use tiled encoding. During setup, this may be effectuated by setting an appropriate flag for tiled-encoding, as well as configuring a specific grid structure of the tile (e.g., as shown in FIG. 4C). By way of illustration, the encoder may be configured to provide a 16×8 grid structure of tiles, resulting with 128 tiles in each frame, for a 4K video input.

The encoder may be configured to disable temporal motion vectors prediction. Although an example BIE scheme does not use MVs (motion vectors), temporal motion vector prediction (TMVP) settings may need to be identical across streams to enable stitching at a later time. This configuration is optional, in that an embodiment of BIE may be practiced without disabling TMVP.

Also, many other elements of the slice headers may be configured to be identical across streams. For example, elements such as the number of reference pictures to use, the reference picture set, what reference pictures to use for L0, the Picture Parameter Set (PPS) to use, the picture order count, SAO parameters, etc. Further, it is also required that the decoding order is the same for all bitstreams that are to be used as input for bitstream switching. Skilled artisans will recognize upon reference hereto that a variety of slice header elements may be configured accordingly in an example BIE implementation.

Since a slice uses a single PPS id codeword to identify what PPS to use and the PPS references one single Sequence Parameter Set (SPS), all encodings may be done using identical PPS and SPS id values in an example embodiment. Likewise, many syntax elements in the SPSs and PPSs may also be configured to be identical for the multiple encodings. Although not a necessary requirement, an example BIE embodiment may therefore be configured such that the encodings are effectuated using identical SPSs and PPSs. However, it is strictly necessary that some elements in the SPS and PPS are identical in certain arrangements.

Returning to FIG. 8A, example BIE configuration process 800A may commence with initializing a mode selector of an encoder to select BIE for encoding an input video stream as set forth hereinabove (block 802). At block 804, the encoder may be configured to use tiles in a particular grid or array arrangement for each frame. At block 806, the base_qp parameter may be written in all slice QP headers of the encoded streams. To encode streams in different qualities (while having the same base_qp), a qp_delta parameter may be configured as described above with respect to each stream based on target QPs (block 808). For example, to achieve a target QP of 22 for a particular stream, a qp_delta of −10 may be configured where base_qp is 32. At noted before, it is required that all pictures with the same picture number to be used as an input for stitching must use the same base_qp value. Thus, in one embodiment, it is not a necessary requirement to set the same base_qp parameter in all the stream headers. Spatial motion vector prediction may be configured such that it is restricted within the tile only (block 810). That is, motion vectors are not allowed to cross tile boundaries in an example embodiment (i.e., only intra-tile prediction is allowed). This means that motion vectors are set such that no sample outside the boundaries of any co-located tile is read during motion compensation interpolation of the blocks inside a tile. An ROI grid may be configured for the encoder such that it uses the qp_delta information for encoding a particular stream with respect to a specific region of the frames (block 812). Further, TMVP may also be disabled (block 814) in an example BIE configuration process as set forth above.

It should be noted that whereas the foregoing BIE configuration process 800A uses certain parameters, additional or alternative embodiments may be practiced where a BIE scheme may be configured to utilize other parameters in addition to and/or in lieu of the parameters exemplified in the flowchart of FIG. 8A.

Figure 8B:
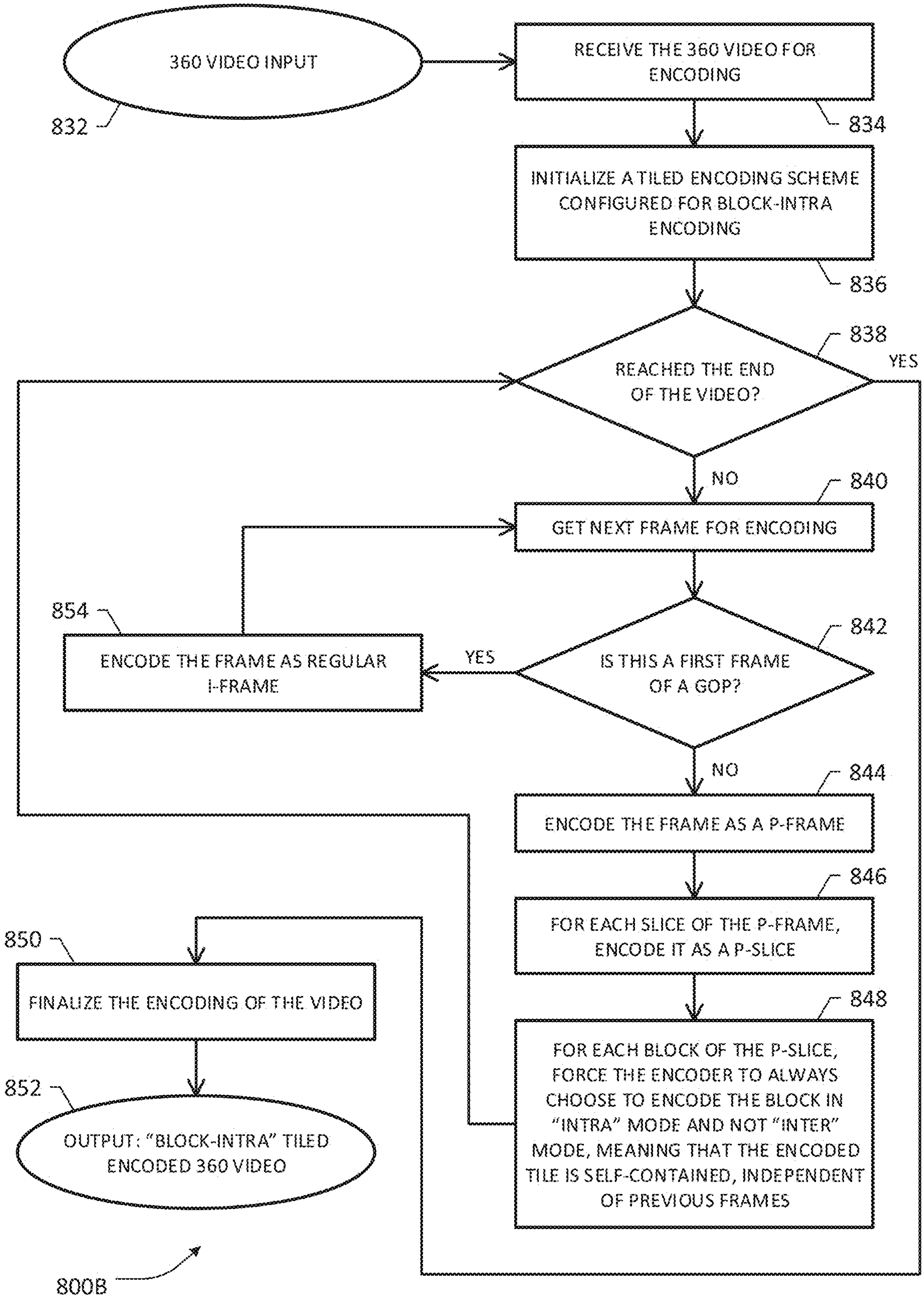
FIG. 8B is a flowchart illustrative of additional blocks, steps and/or acts in an example BIE scheme according to an example embodiment of the present invention.

FIG. 8B is a flowchart illustrative of additional blocks, steps and/or acts in an example BIE scheme 800B according to an embodiment of the present invention. In general, during BIE-based tiled coding, an encoder may be configured to effectuate several decisions. During encoding of tiles which are part of a P-frame, the encoder decides whether or not a particular tile should be encoded using any motion vector and depend on the previous frame, or whether it should be encoded in "intra" mode, where the tile is self-contained and is not dependent on any previous frame (i.e., does not use prediction from any previous frame). As noted previously, during encoding of P-frames in BIE, the encoder is forced to encode all blocks using intra modes. At block 834, a video input 832 is received for encoding. At block 836, a tiled encoder is configured for implementing a BIE process as set forth above. For each frame of the video input, an iterative process may be implemented to effectuate appropriate coding decisions on a frame-by-frame basis, which commences with a determination as to whether the video sequence has reached its end (block 838). If the end is not reached (i.e., there remain frames in the video sequence requiring processing), a next frame is obtained (block 840). If the frame is determined to be a first frame of a GOP structure (block 842), it is encoded as a regular I-frame (block 854) and the process flow returns to obtaining a next frame (block 840). Otherwise, it is encoded as a P-frame (block 844). For each slice of the P-frame, it is encoded or provided with a P-slice header (block 846). For each block or any other suitable coding unit of the P-slice, the encoder is configured to encode the image data in intra mode (block 848). Thereafter, the process flow returns to determine whether all the frames have been processed (block 838). If so, the encoding of the video sequence is finalized (block 850), which may be provided as BIE-tiled bitstream to a downstream entity (e.g., a packaging system), as set forth at block 852. An alternative arrangement, B-frames may be used in lieu of P-frames for generating X-frames as noted elsewhere in the patent application. Accordingly, blocks 844, 846 and may be suitably modified to support this arrangement.

In a further embodiment of the present invention, X-frames may be used once in each GOP (instead of multiple times as in BIE) based on a PE scheme as noted previously. Essentially, PE-based tiled encoding involves a process and apparatus for generating a stream where all the frames have P-slice headers, except for the first frame which is an I-frame, while periodically there is an X-frame (i.e., BIE-frame or AIE-frame), where all blocks are intra-encoded but the slice headers are of P-slices (or B-slices where B-frames are also encoded in a sequence). In general, all slices of any two pictures that are to be potentially used as inputs to stitching need to have the same slice type, slice qp, as well as a number of other settings in the slice header and PPS. In contrast with the BIE scheme set forth above, where all the frames of a GOP are X-frames except for the first one, an embodiment of a PE scheme is configured to provide X-frames only at select frame locations depending on two parameters: period (which is the size of the GOP, i.e., the number of frames in the GOP) and phase (which is an integer in the range {0 to [period−1]}). Frame locations where the X-frames appear in a PE scheme may be determined as follows. Let N be the total number of frames in a stream. The first frame is encoded as an I-frame. For a frame at $i^{th}$ position, $2 \leq i \leq N$, it is encoded as a regular P-frame if {i Mod (period)≠phase}; and otherwise (that is, {i Mod (period)=phase}), the frame is encoded as an X-frame (with P-slice headers and all blocks encoded in intra-mode, independent of previous frames). It should be noted that an example PE scheme may provide as many phase-encoded streams for each quality/bitrate representation of the media input as there are frame locations in a GOP (i.e., GOP size).

By using P- or B-slice headers rather than I-slice headers in X-frames for purposes of the present invention, several advantages may be realized in an exemplary embodiment, including but not limited to facilitating mid-GOP switching in a user viewing environment. Assume the user is watching a 360° immersive video program or content where the directly-gazed field of view (FoV) is in high quality (i.e., lower QP) and the user moves his head in the middle of the GOP. The user now sees a low quality video (higher QP) in their new field of view or viewport. The server can send an I-frame of a high quality (low QP) at the beginning of the next GOP, but this introduces a significant latency, as it would take time until the high quality I-frame of the next GOP for the viewport will be presented. It is desirable to receive or obtain an I-frame of the new field of view that is encoded at high quality as soon as possible while in the middle of the GOP. But it is not feasible to just put an I-frame as is in the middle of the GOP in a conventional immersive video viewing environment. By generating an X-frame (i.e., Block-Intra coded frame or All-Intra coded frame) and transmitting it in the middle of the GOP (at any frame location in a GOP structure, for instance), an embodiment of the present invention is thus effectively able to upgrade the quality of the field of view similar to the effect if an I-frame is presented in the middle of the GOP with high quality tiles. By providing P-slice headers in AI- or BI-encoded frames (i.e., AIE/BIE frames or X-frames), an embodiment of the present invention therefore allows a frame having high quality data in a region of interest (ROI) of FoV to be used in the middle of the GOP.

Further, in a tile encoding scheme where a frame is partitioned into tiles and slices, an embodiment of the present invention involving X-frames enables mixing tiles in a single output compressed frame, where some tiles may use spatial or temporal prediction (i.e., inter-picture prediction) and some tiles may use only spatial prediction (e.g., comprising intra-coded blocks only). The tiles consisting of intra-coded blocks only may originate from an X-frame. In the context of the present patent application, the terms “mixing”, “muxing”, “stitching”, “splicing” or terms of similar import with respect to output stream generation may refer to means and methods to concatenate one compressed tile (e.g., tile A) with another compressed tile (e.g., tile B) to form a part of the bitstream representing a single output frame, where tile A and tile B may originate from separate encodings of the content, which will be set forth in additional detail further below.

One of the advantages of a PE scheme relates to overcoming the issue of drift that may be present in a BIE scheme (i.e., drift elimination or reduction). It should be appreciated that while BIE allows replacement a P-frame of the previous viewport with an X-frame of the new viewport, the following frames are regular P-frames of the new viewport that are encoded with predictions made to previous frames. Thus, when a P-frame is replaced with an X-frame and then a following frame uses this X-frame for prediction instead of the original frames of the regular bitstream, there is a potential for drift where prediction errors may accumulate. On the other hand, in phased encoding, the generated stream uses the X-frame at position=<phase>+i*<period> for the prediction of the following P-frames, and thus the situation where a P-frame uses for prediction a different frame than the frame used during encoding is avoided. Hence, there is no prediction error presented due to predicting from a frame that is different than the frame generated during the encoding, and accordingly, any potential drift due to this type of prediction errors is avoided. However, the PE scheme may require a larger amount of storage since storage of the P-frames that follow the X-frames in the GOP is required.

Further, an embodiment of a PE scheme may be advantageously utilized to facilitate gradual refreshing of frames whereby lower latency is achieved during playout by selecting only a subset of the tiles to upgrade their quality and send their appropriate phased-encoded tiles. While in an embodiment of a BIE scheme, a P-frame is replaced with an X-frame, in a gradual refresh frame annealing scheme the PE-coded streams may be used to replace selected tiles with the corresponding tiles taken from the appropriate PE-coded stream. On the other hand, in another embodiment, a BIE scheme may can also advantageously operate on a tile-by-tile basis. With respect to a PE-based embodiment, accordingly, if period is P and frame number is X, one can obtain the corresponding phase by the following equation: Phase={X Mod P}. Thus, during delivery or playout of a coded video sequence, assume that a certain tile T is selected for upgrade to QP quality q in frame X, then one can replace selected tile (in frame X and following frames until the next upgrade/downgrade of T or viewport change) with the tile T from the stream with phase that satisfies the following relationship: Phase={X Mod P} at QP=q. Thereafter, the co-located tiles in the frames following frame X that belong to the same GOP are replaced by the corresponding co-located tiles from the same PE-encoded stream. It should be appreciated that the advantages of concatenating tiles from different streams when a user changes gaze direction are similar to the scenario set forth above where the user changes his gaze during mid-GOP. Identical slice QPs are used for switching/replacing the tiles because if two input tiles are encoded with different actual QP and were encoded with a single slice per picture, then if the slice QP differs, it would not be possible for the QPs of tiles in the output stream to be correct without low-level rewrite of the stream. Additional details regarding gradual refresh frame annealing and tile selection will be set forth further below in reference to additional embodiments of the present patent application.

A potential disadvantage with respect to PE may be that it requires more storage, since an input stream is encoded in many phases, potentially resulting in as many streams as the GOP size (rather than just two streams as in BIE). This disadvantage may be traded off against the advantage of reduced latency without drift in an example implementation. For fastest quality change response, the number of phases may be set equal to the size of the GOP, i.e., the period P, but an example embodiment may provide a trade-off of using fewer phases and consuming less storage while the latency of the quality upgrade may be longer, since tile upgrades will only be done on the next phase.

Figure 9:
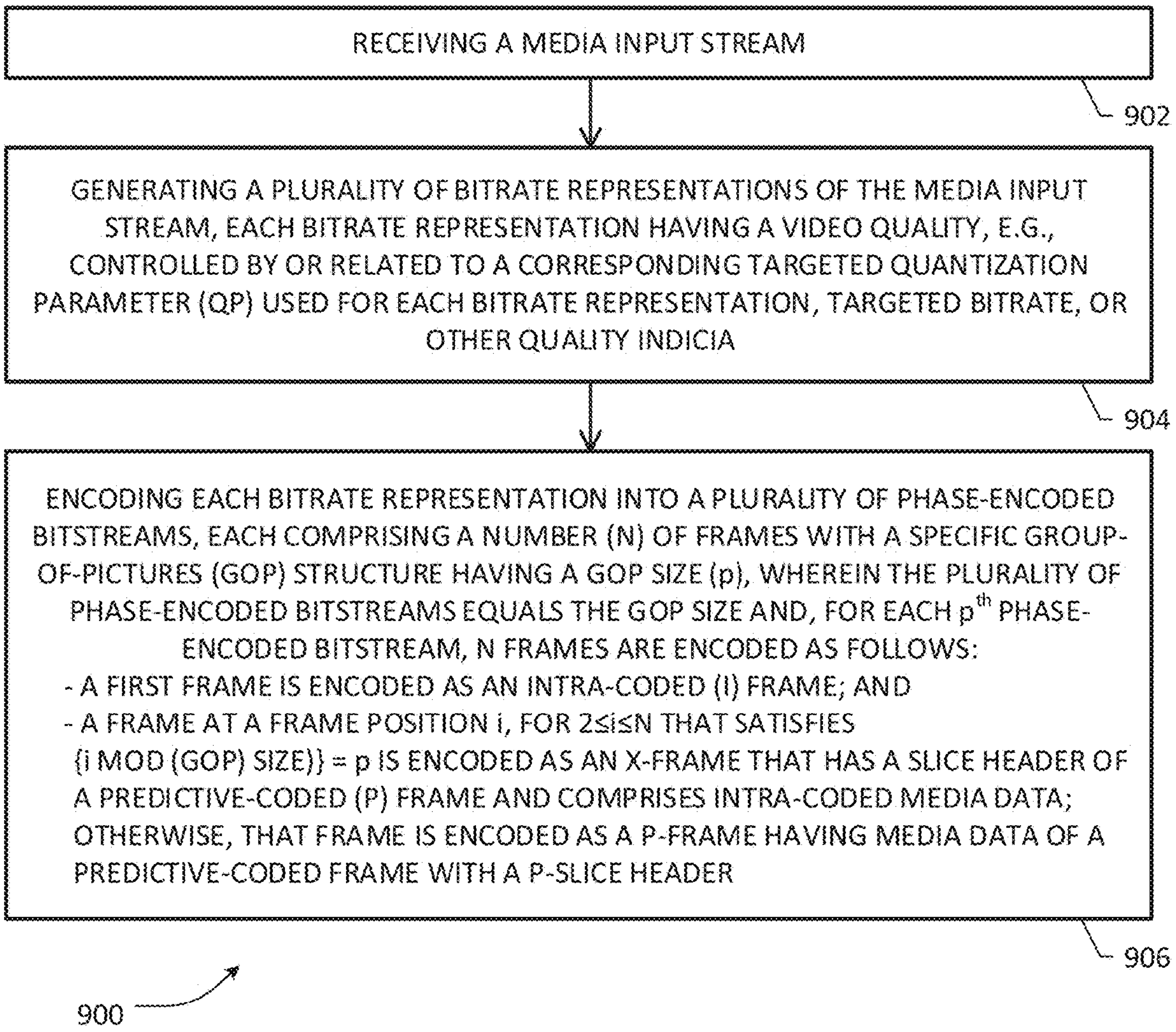
FIG. 9 is a flowchart illustrative of a PE scheme according to an example embodiment of the present invention.

FIG. 9 is a flowchart illustrative of a PE scheme 900 according to an example embodiment of the present invention. At block 902, a media input stream corresponding to a 360° immersive video asset may be received. As before, a plurality of bitrate representations of the media input stream may be generated, each bitrate representation having a separate video quality, e.g., related to or controlled by a corresponding targeted QP value used for the bitrate representation and/or targeted bitrate, or other indicia of respective quality (block 904). Each bitrate representation controlled by a corresponding QP is encoded into a plurality of phase-encoded bitstreams, each phase-encoded bitstream that belongs to a particular bitrate representation comprising a number (N) of frames with a specific GOP structure having a GOP size (p), wherein the number of the plurality of phase-encoded bitstreams equals the GOP size. In one arrangement, the GOP size, i.e., p>1. For each $p^{th}$ phase-encoded bitstream, N frames are encoded as follows: (i) at least a first frame is encoded as an intra-coded (I) frame; and (ii) a frame at a frame position i, for 2≤i≤N, that satisfies the relationship {i Mod (GOP size)}=p is encoded as an X-frame having a slice header of a P-frame and comprising blocks of only intra-coded media image data only (i.e., similar to an I-frame). Otherwise, that frame is encoded as a regular P-frame having media data of a predictive-coded frame with a P-slice header (block 906). In some arrangement, the P-frames may also contain intra-coded data. Where B-frames are also encoded in an embodiment, an X-frame in lieu of a regular B-frame may be provided similar to the foregoing process. As noted previously with respect to FIGS. 5 and 7, operations set forth at blocks 904 and 906 may be combined to be executed in a single encode process for the sake of computational efficiency in one example embodiment.

In an additional or alternative embodiment of a PE scheme, a phase-encoded bitstream may have a frame other than an I-frame as a first frame of the coded video sequence, which may be achieved by appropriate settings in an encoder in accordance with the teachings herein. For example, the first frame can be an X-frame (or some other non-I frame). All other frames of the coded sequence may contain predicted frames (P/B-frames) and X-frames at suitable locations based on phase.

Figure 12:
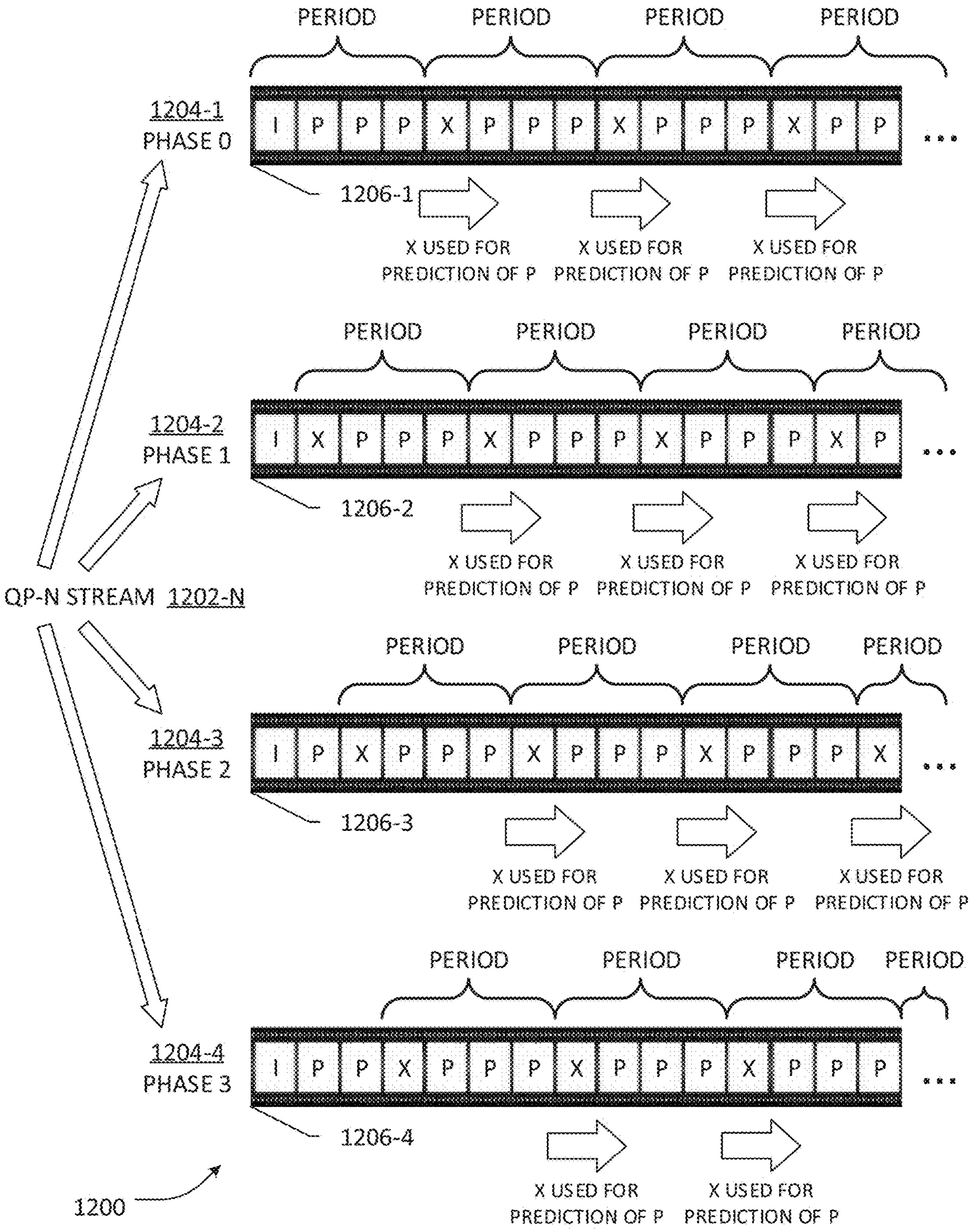
FIG. 12 depicts a plurality of coded bitstreams having different phases for a particular bitrate representation generated by a PE-based tiled encoder system in an example embodiment.

FIG. 12 depicts a plurality of coded bitstreams 1200 having different phases for a particular bitrate representation generated by a PE-based tiled encoder system in an example embodiment. By way of illustration, a QP-N stream 1202-N having a QP value of 22 is encoded or otherwise provided as four phase-encoded streams 1204-1 to 1204-4 because of the use of a GOP size of four frames in this example. For each PE stream 1204-1 to 1204-4, the first frame is encoded as an I-frame 1206-1 to 1206-4. The rest of the frames in each PE stream are encoded as either P- or X-frames based on the phase-position relationship set forth above.

Figure 10A:
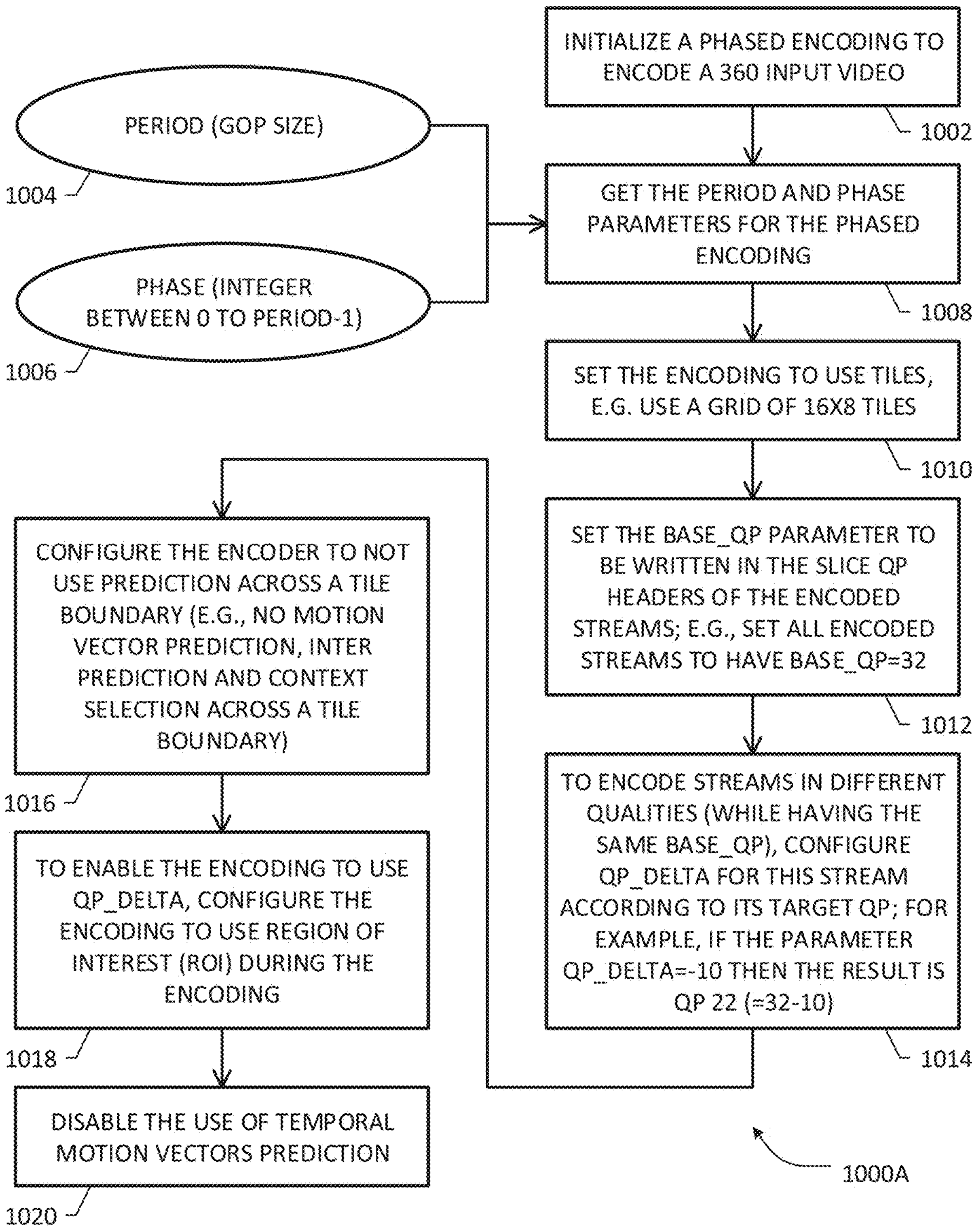
FIG. 10A is a flowchart illustrative of a process for configuring a PE scheme in a tiled encoding arrangement according to an example embodiment of the present invention.

Turning to FIG. 10A, depicted therein is a flowchart illustrative of a process 1000A for configuring a PE scheme in a tiled encoding arrangement according to an example embodiment of the present invention. At block 1002, an encoder may be initialized for selecting a PE scheme with respect to a media input stream corresponding to a 360° immersive video asset. At block 1008, period and phase parameters are obtained or otherwise configured, where period is equal to the GOP size (block 1004) and a phase is equal to or less than the GOP size (block 1006). At block 1010, the encoder may be set to use tile encoding to generate tiles in a particular grid/array arrangement per frame. Similar to a BIE configuration process set forth previously, a base_qp parameter may be written in slice QP headers of the encoded streams (block 1012). At noted before, it is required that all pictures with the same picture number to be used as an input for stitching must use the same base_qp value. Thus, it is not a necessary requirement in an example embodiment to set the same base_qp parameter in all the stream headers. To facilitate the encoded streams in different qualities (while having the same base_qp), a qp_delta parameter may be configured as described above with respect to each stream based on target QPs (block 1014). As before in an example BIE configuration process, a qp_delta of −10 may be configured where base_qp is 32 to achieve a target QP of 22 for a particular stream. Spatial motion vector prediction may be configured such that it is restricted within the tile only (block 1016). That is, motion vectors are not allowed to cross the tile boundaries in an example embodiment (i.e., only intra-tile prediction is allowed and no inter prediction or context selection across a tile boundary is allowed). This means that motion vectors are set such that no sample outside the boundaries of any co-located tile is read during motion compensation interpolation of the blocks inside a tile. An ROI grid may be configured for the encoder such that it uses the qp_delta information for encoding a particular stream with respect to a specific region of the frames (block 1018). Further, TMVP may also be disabled (block 1020) in an example PE configuration process as noted above.

It should be noted that an example PE configuration process is roughly similar to a BIE configuration process in one embodiment, which may be performed for every "phased" stream depending on the GOP size. Further, analogous to a BIE configuration process 800A that uses certain parameters, additional or alternative embodiments of a PE configuration process may involve other parameters in addition to and/or in lieu of the parameters exemplified in the flowchart of FIG. 10A.

Figure 10B:
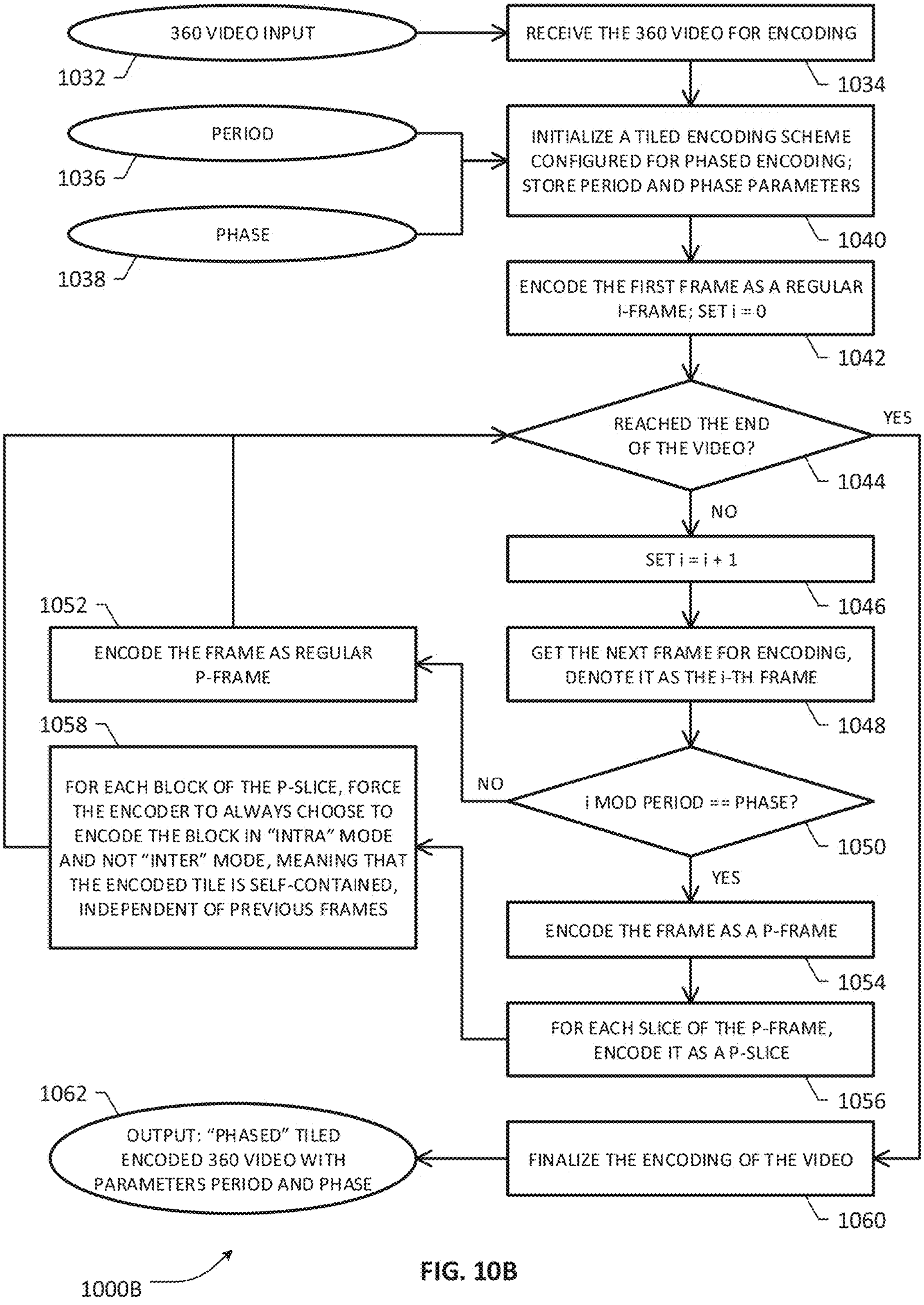
FIG. 10B is a flowchart illustrative of additional blocks, steps and/or acts in an example PE scheme according to an example embodiment of the present invention.

FIG. 10B is a flowchart illustrative of blocks, steps and/or acts in an example PE implementation according to an embodiment of the present invention. In general, an encoder may be configured to effectuate several decisions during PE-based tiled coding to generate an X-frame only at specific frame locations of each phase-encoded stream. At block 1034, a video input 1032 is received for encoding. At block 1040, a tiled encoder is configured for implementing a PE process based on a period (block 1036) and phase (block 1038) as set forth above. For each stream, the first frame is encoded as an I-frame (block 1042). Thereafter, an iterative process may be implemented to effectuate appropriate coding decisions on a frame-by-frame basis, which commences with a determination as to whether the video sequence has reached its end (block 1044). If the end is not reached (i.e., there remain frames in the video sequence requiring processing), a frame index (i) is incremented (block 1046) and a next frame is obtained and denoted as an $i^{th}$ frame (block 1048). A determination is made if the modular relationship {i Mod (period)=phase} is satisfied. If so, the frame is encoded as an X-frame as set forth at blocks 1054, 1056 and 1058. Otherwise, it is encoded as a regular P-frame (block 1052). Thereafter the process flow returns to determine if all the frames of the video stream have been processed (block 1044). If so, the process flow proceeds to finalize encoding the video stream (block 1060), which may be provided as PE-tiled bitstream to a downstream entity (e.g., a packaging system), as set forth at block 1062.

As noted previously, a PE-based tiled encoding scheme facilitates a gradual refresh annealing process during 360° video delivery, which will be set forth in further detail below. An embodiment of phased encoding may also be used during the playout where a stitcher executing on the server side or on the client side may be used to combine tiles of different qualities. So, at every frame of the video being played, each tile has a current quality, which may correspond to the QP value, target bitrate or other indicia of the video stream the tile was taken from. When bandwidth is sufficiently large or when the user moves his head and the viewport changes, it would be desirable to upgrade the quality (e.g., lower the QP) of some tiles (the tiles on the new viewport for example). Furthermore, to reduce latency by means of reducing the usage of the buffer on the decoder side, an embodiment of the present invention provides that the entire viewport may not be upgraded at once, but rather upgrade it gradually by means of gradual refresh, only upgrading a few tiles in every frame, keeping the decoder buffer small and thus reducing latency. As will be described in additional detail further below, an example bandwidth annealing apparatus may be configured to effectuate a process for determining which tile to upgrade at every moment based on the bandwidth, the viewport and/or current buffer utilization. Further, such a process may also be configured to determine a quality level (i.e., which QP) to which a tile should be upgraded.

For example, assume that during playout, a tile selection apparatus (described in detail further below) determines to upgrade in the $i^{th}$ frame, tile T to quality QP=q. This determination may be provided as a control input to a tile/frame stitcher module, which retrieves, receives or otherwise obtains tile T from the $i^{th}$ frame of the video stream that was encoded with quality QP=base_qp+delta_qp=q using phased encoding, where the phase is determined by the modular relationship: {phase=i Mod (period)}. Then, until the next time the tile selection process decides to change the quality of this tile, tile T is taken from the same stream (i.e., the phased encoded stream with quality QP=q and with the same phase). Accordingly, it will be appreciated that an additional advantage of the PE scheme beyond the ability to perform a gradual refresh of tiles during upgrades is better video quality. Overall, phased encoding gives a better QoE than a BIE scheme where X-frames are substituted without phases, which can result in drift, and result in lower peak signal-to-noise (PSNR) values, thereby resulting in a lower QoE stream for the remainder of the GOP. As noted previously, a potential drawback of phased encoding is the requirement of multiple streams that can result in significant encode processing overhead and storage space.

Example embodiments regarding how to stitch tile-encoded bitstreams using either PE or BIE schemes will be set forth below. As noted previously, tile-stitching embodiments may be implemented at a server during stream delivery phase or on the client side for playout. In general, example embodiments for stitching tiles involve utilizing bitstreams of different qualities (e.g., based on different QPs, targeted bitrates, or other indicia) as well as ensuring that there is compatibility with respect to various pieces of parametric data relating to video pictures, e.g., Video Parameter Set (VPS), Sequence Parameter Set (SPS), Picture Parameter Set (PPS), Supplemental Enhancement Information (SEI), etc., among the bitstreams from which the tiles may be selected. In general, the tile structure should preferably be constant over time to facilitate stitching, which in turn is related to tile-encoding processes performed by an encoder of the present invention. A bitstream stitcher module is operative in response to an input comprising a list of tiles from different tile-encoded streams, which may be combined to generate a new output bitstream, where tiles closer to the viewport have a higher quality compared with tiles further away from the viewport. Further, an example embodiment to perform the tile combination and stream muxing in accordance with the teachings of the present invention may be configured such that output stream generation still remains compliant within known codec standards such as MPEG HEVC/ITU-T/ISO23008 part 2/H.265 specifications as well as emerging standards such as AV1, H.266, VVC, and the like.

For stitching BIE-coded streams, tiles from the regular streams may be used by default for splicing (e.g., until some control input is provided based on user's gaze or bandwidth allocation). The only instances where tiles from the BIE-coded streams are taken is when either the viewport changed (thereby requiring the X-frames which are frames with P-slice headers that can fit in the middle of the GOP but the tiles are intra encoded so the new viewport can be presented) or when a bandwidth annealing process determines to upgrade the quality of the tile (in which case the Block-Intra frame with the P-slice headers contains the tile with the upgraded higher quality).

Figure 13A:
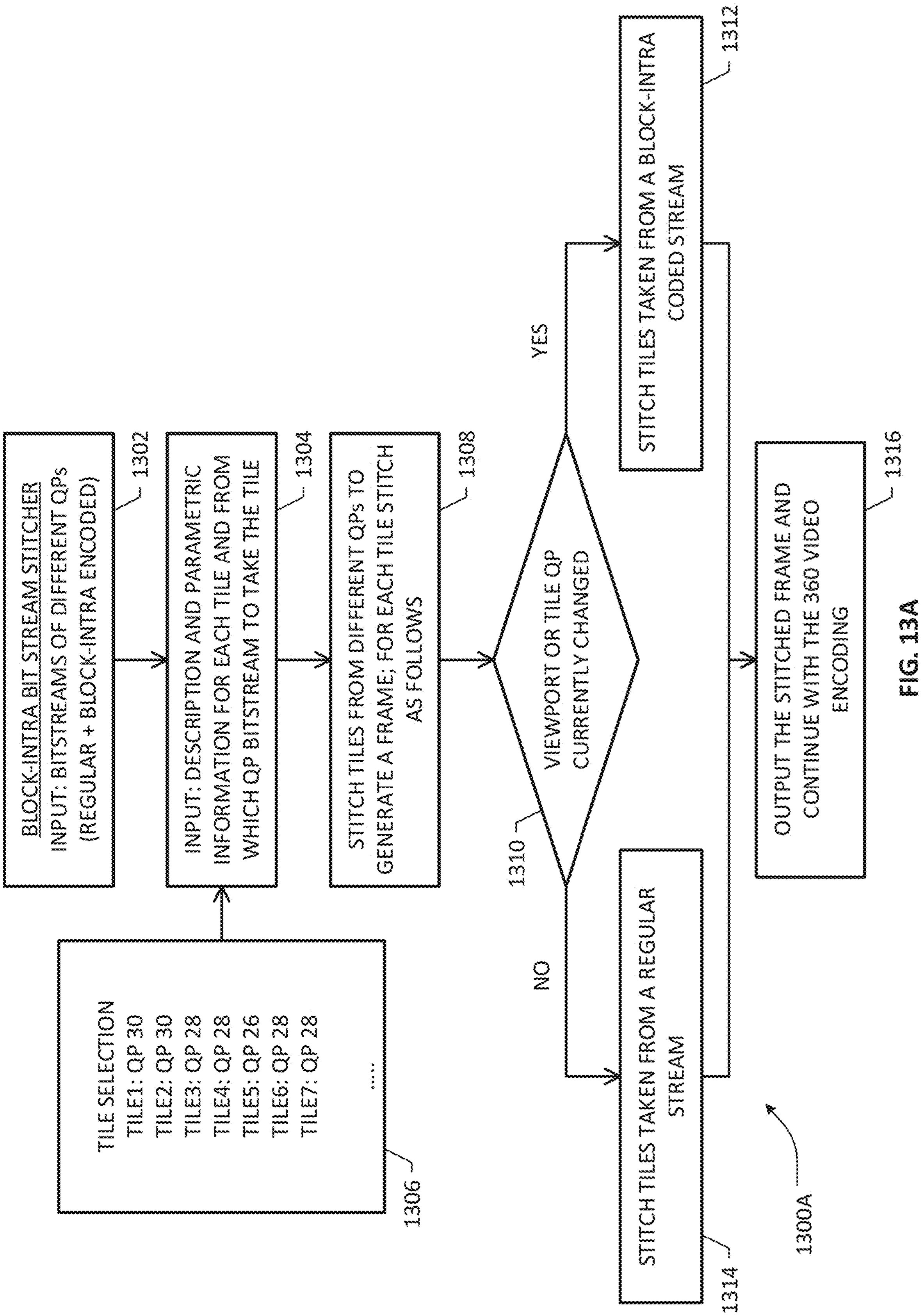
FIG. 13A is illustrative of various blocks, steps and/or acts of an example tile stitching scheme involving BIE-based tiled streams according to an embodiment of the present invention.

FIG. 13A is illustrative of various blocks, steps and/or acts of an example tile stitching scheme 1300A involving BIE-coded tiled streams according to some example embodiments of the present invention. At block 1302, a BIE bitstream stitcher receives input bitstreams of different QPs, a first set comprising regular tile-coded streams and a second set comprising BIE tile-coded streams. As noted above, the streams in example embodiments are motion constrained and have the same base_qp for each frame N as the base QP in any other frame N. A tile selection module provides a list of tiles with different QPs (block 1306), which forms part of overall input regarding the description and parametric information for each tile and the particular QP bitstream from which the tile is to be retrieved or obtained (block 1304). A tile stitching process may be effectuated on a tile-by-tile basis, as set forth in block 1308. If the viewport and/or the tile QP has/have changed (block 1310), the tile is taken from a BIE-coded stream having the appropriate QP and stitched into the frame (block 1312). Otherwise, the tile is taken from a regular tile-encoded stream and stitched accordingly (block 1314). After all the tiles are stitched in a frame (in a predetermined grid array), the stitched frame having different qualities of tiles may be provided as output (block 1316). If additional video frames remain for processing (e.g., encoding and stitching), the process flow may continue.

By way of illustration, consider a block-intra stream stitching scenario in which there are at least three streams: (1) a regular stream of lower quality (e.g. QP setting of 30); (2) a regular stream of higher quality (e.g. QP setting of 22); and (3) a BIE (all-Intra) stream of higher quality. Broadly, when the viewport changes, the quality of some tiles may be increased. That is done in block 1312, which means that, e.g., a tile at position A that in previous pictures was taken from stream (1) is now taken from stream (3). In the next picture, the tile at position A should be taken from stream (2) if the tile is still within the viewport. If the tile is no longer within the viewport, the position A tile could be taken from stream (1). More particularly, it may be further dependent upon gaze vector information. In other words, it is not just if the tile at position A is in the viewport or not; rather, it is where the tile is located in a gaze-to-weight determination scheme used for tile selection (described in detail further below). Thus, it should be understood that tiles within the viewport depending on where they are located may be upgraded or downgraded based on how far the tile are from the direct line of sight in an example embodiment of the present invention.

Figure 13B:
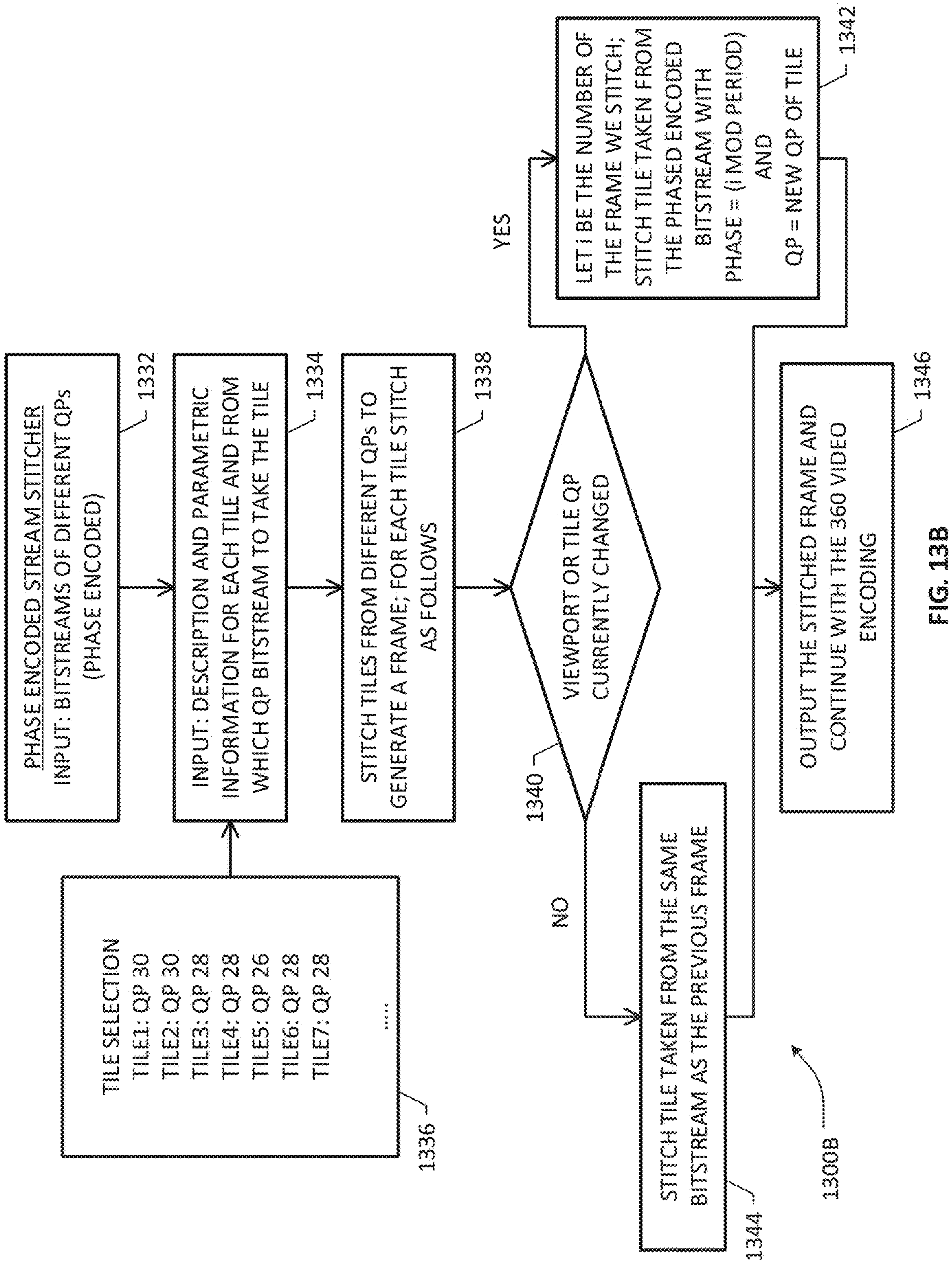
FIG. 13B is illustrative of various blocks, steps and/or acts of an example tile stitching scheme involving PE-based tiled streams according to an embodiment of the present invention.

In similar fashion, an example tile stitching scheme 1300B involving PE-based tiled streams is illustrated in FIG. 13B. A PE bitstream stitcher is operative to receive input bitstreams of different QPs, each encoded into a plurality of phase-encoded bitstreams (block 1332). A tile selection module provides a list of tiles with different QPs (block 1336), which forms part of overall input regarding the description and parametric information for each tile and the particular QP bitstream from which the tile is to be retrieved or obtained (block 1334). A tile stitching process similar to BIE tile stitching may be effectuated on a tile-by-tile basis, as set forth in block 1338. If the viewport and/or the tile QP has/have changed such that the quality of a current tile is required to change (block 1340), the tile is taken from a PE-coded stream having the appropriate QP based on a phase-frame modular relationship and stitched into the frame (block 1342). For example, if the QP of tile at frame I changes to QP=q, the tile from the stream whose phase equals {i Mod (period)} and QP=q is taken and stitched at appropriate location of a tile grid. Otherwise, the tile is taken from the same bitstream from which it was taken in the previous frame and stitched accordingly (block 1344). After all the tiles are stitched in a frame (in a predetermined grid array), the stitched frame having different qualities of tiles may be provided as output (block 1346). Further, if additional video frames remain for processing (e.g., encoding and stitching), the process flow may continue.

Regardless of whether tiles from BIE-coded bitstreams or PE-coded bitstreams are stitched, an example embodiment of stitching may involve taking tiles from different streams having compatible slice headers in addition to other parametric information as set forth previously. In general, slice type (i.e., I/P/B-slice), the slice QP and other fields or parameters that may affect the CABAC decoding process may be monitored to ensure compatibility and compliance. Further, some embodiments, such as example embodiments set forth in FIGS. 13A/13B, may require that inter prediction is done using only the previously decoded picture.

Figure 13C:
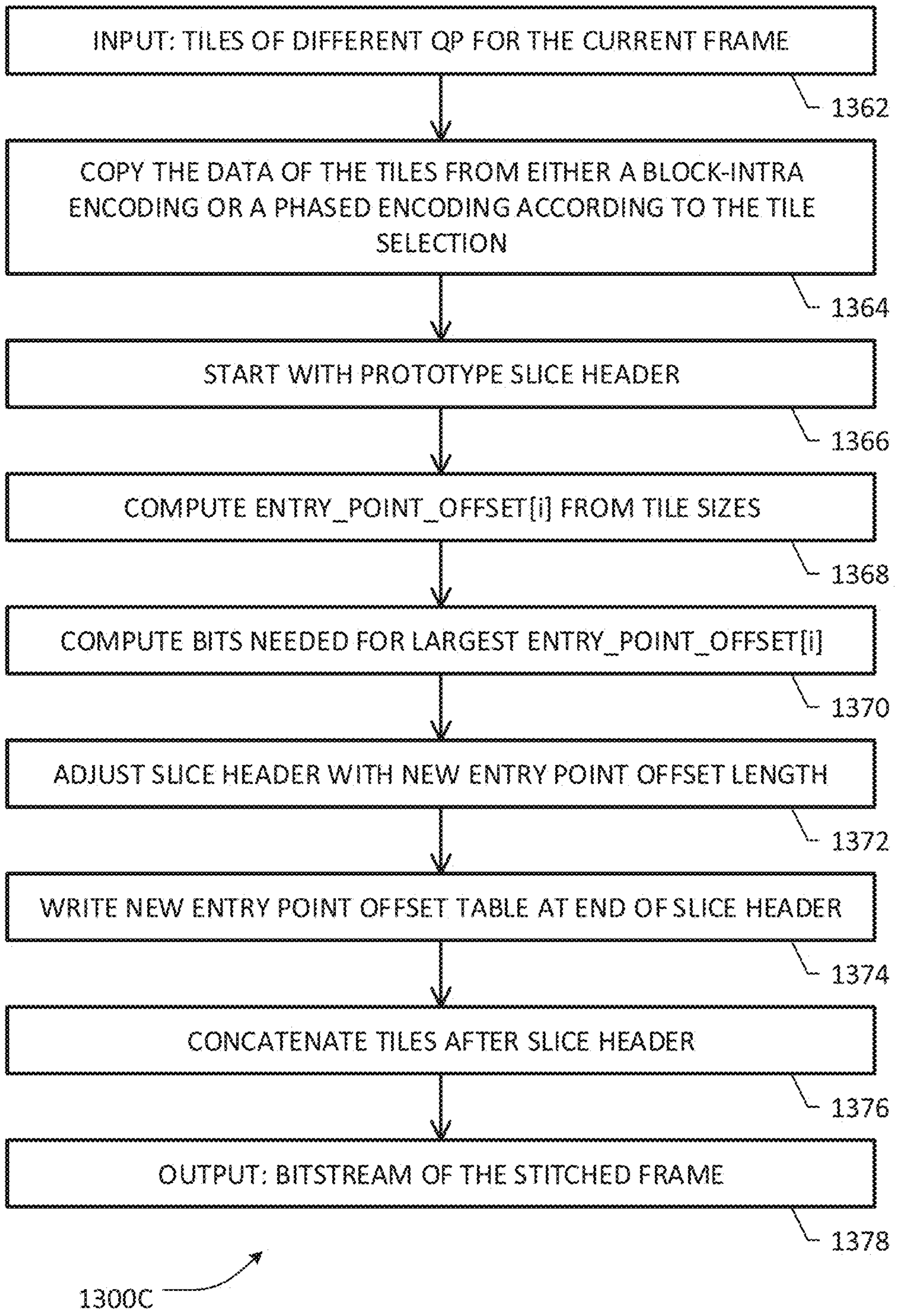
FIG. 13C is a flowchart illustrative of additional blocks, steps and/or acts with respect to an example tile stitching scheme according to an embodiment of the present invention.

Turning to FIG. 13C, shown therein is a flowchart illustrative of additional blocks, steps and/or acts with respect to an example tile stitching/splicing scheme according to an example embodiment of the present invention. At block 1362, tiles of different QPs for the current frame (to be stitched) are obtained as input. The data of the tiles (either from the BIE streams or from the PE streams) selected based on a tile selection process is copied in a memory (block 1364). At block 1366, the splicing process commences with a prototype slice header that may include a header field, an offset field, etc. (block 1368). For a tile index (i), an entry_point_offset[i] may be determined from the tile sizes (block 1368). Bits needed for the largest value of entry_point_offset[i] is determined (block 1370). The slice header may be adjusted with a new Entry Point Offset (EPO) length based on the largest offset value of all the tile indices as determined previously (block 1372). At block 1374, the EPO field is written into the slice header. Thereafter, the tiles are concatenated together after the slice header (block 1376), thereby generating an output bitstream of the stitched frame (block 1378).

Skilled artisans will recognize that in order to splice tiles they need to be retrieved from specific source bitstreams responsive to a tile selection process. To facilitate efficient retrieval, an embodiment of splicing may involve providing a memory-mapped tile pointer cache that allows a quicker referencing of parsed files corresponding to tiles, wherein a file format is optimized to be memory mapped instead of being parsed into RAM. Set forth below is an example file format for purposes of an exemplary splicing embodiment:

```
file format:
u(16) magiclen;
s(magiclen) magic_string;
loop { // each iteration is a group
u(32) nrec;
for (i =0; i<nrec, i++) {
// per frame
u(64) rec_end_relative[i];
}
// rec_end_relative[i] is relative to the offset of the file represented by
this comment.
// rec_end_abs[i] = this_offset + rec_end_relative[i]
for (i=0; i<nrec, i++) {
```

-continued

```
// this iteration is per frame
// prefixes are NAL units that appear before the Slice in the access unit
u(32) n_prefixes,
for (j=0; j<prefixes; j++) {
   u(64) prefix_start_abs[i][j];
   u(64) prefix_len[i][j];
}
// the slice
u(64) slice_start_abs[i];
u(64) slice_len[i];
u(32) n_tiles;
for (j=0; j<n_tiles; j++) {
   u(64) tile_start_abs[i][j];
   u(64) tile_len[i][j];
}
// suffixes are NAL units that appear after the Slice in the access unit
u(32) n_suffixes;
for (j=0; j<n_suffixes; j++) {
   u(64) suffix_start_abs[i][j];
   u(64) suffix_len[i][j];
}
}
}
magic_string is "TPTCACHE1 [ii[ ][iI[ ]IIiI[]iI[ ]]]"
```

Figure 14:
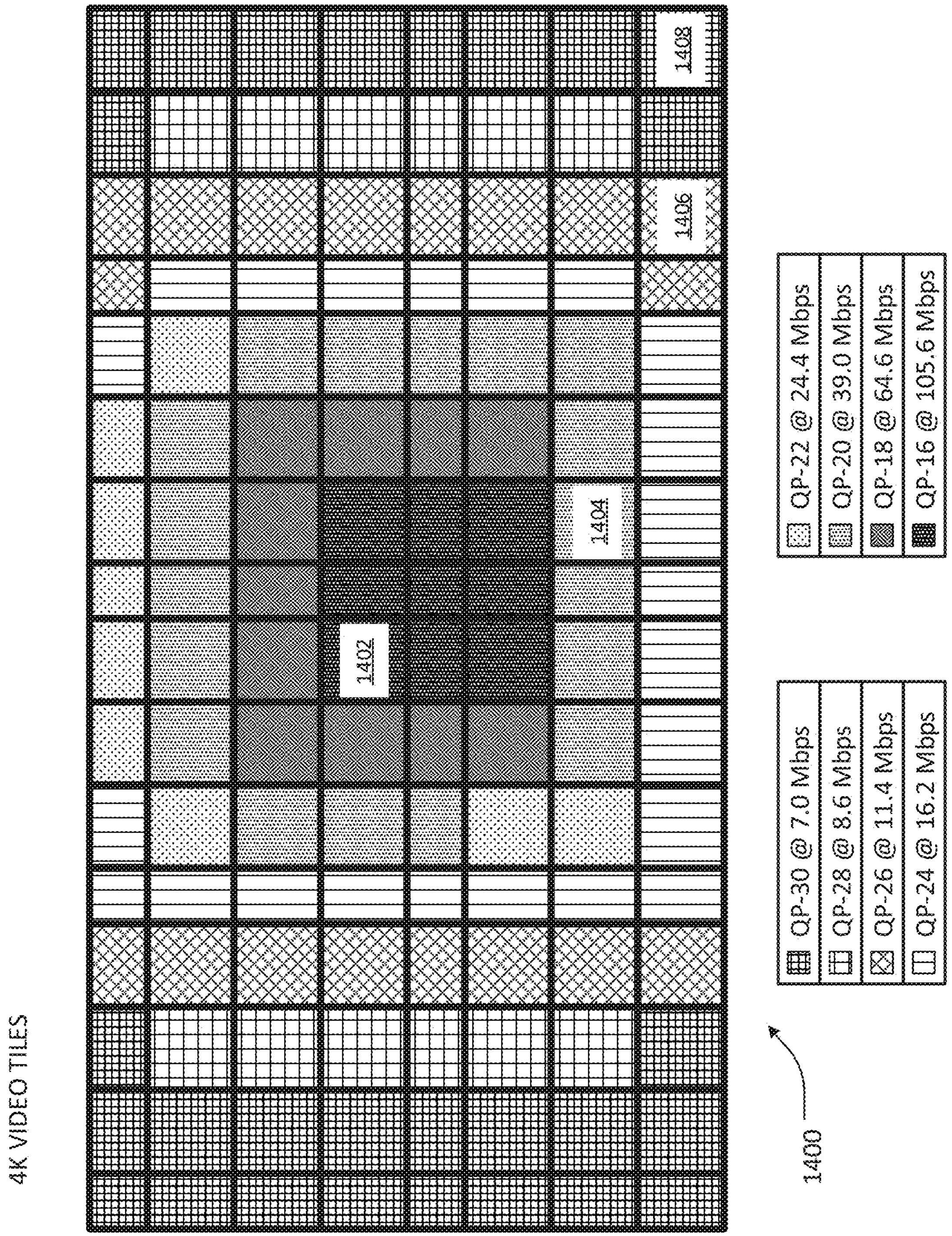
FIG. 14 is illustrative of a 360° video frame comprising tiles selected from coded bitstreams having different qualities or QPs in accordance with an example embodiment of the present invention.

Referring to FIG. 14, shown therein is an example 360° video frame 1400 comprising tiles selected and spliced from coded bitstreams having different qualities or QPs in accordance with an embodiment of the present invention. By way of illustration, video frame 1400 is formed from 128 tiles (16 columns by 8 rows) of a 4K video input, shown in unwrapped format (i.e., not projected in a 3D spherical space), wherein a field 1402 which may correspond to an ROI of the frame 1400 based on the viewport or gaze vector location. In accordance with the teachings herein, ROI 1402 may be formed from splicing high quality tiles (i.e., tiles selected from coded bitstreams having low QPs, e.g., QP-16 at 105.6 Mbps, and concatenated in a stitching process). Regions or fields disposed proximate/adjacent to ROI 1402 may have medium quality tiles (e.g., field 1404). On the other hand, fields or regions distally disposed from ROI 1402, e.g., those farther away from the viewport, may be formed from lower quality tiles, as exemplified by regions 1406 and 1408.

To facilitate gaze-based tile selection control, additional embodiments of the present invention involve monitoring where a user is viewing in a 360° immersive video program (i.e., the user's viewport) and determining appropriate tile weights based on the user's gaze. In general, a gaze vector (GV) may be returned by the user/client device defining a gaze direction in a 3D immersive space displaying 360° video, e.g., where the headset is pointed. In further embodiments, the user's eyeball movement may be tracked for similar purposes. As will be seen below, the tiles of a tiled frame also have direction vectors (which are not dependent on the user's gaze) based on how the frame is mapped in a 3D display environment. A dot product (also referred to as a scalar product or inner product) of tile vector and gaze vector can be calculated to determine the angular separation between the gaze direction and the direction of the middle of any tile of a frame, which may be provided to a weighting function module for determining corresponding tile weights.

Figure 15A:
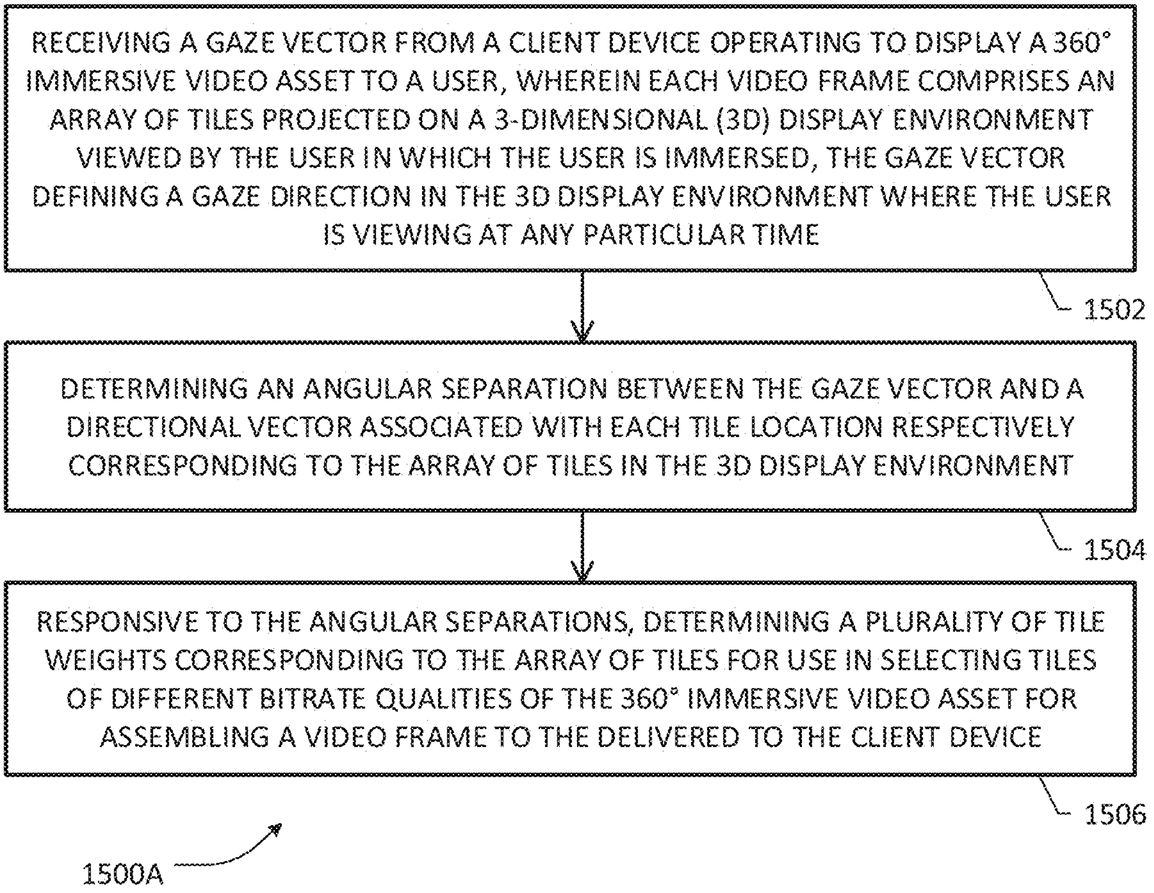
FIGS. 15A and 15B are flowcharts illustrative of various blocks, steps and/or acts of a method that may be (re) combined in one or more arrangements, with or without blocks, steps and/or acts of additional flowcharts of the present disclosure, for facilitating optimized tile selection based on weights associated with user gaze in a 360° immersive video viewing environment according to one or more embodiments of the present invention.
Figure 15B:
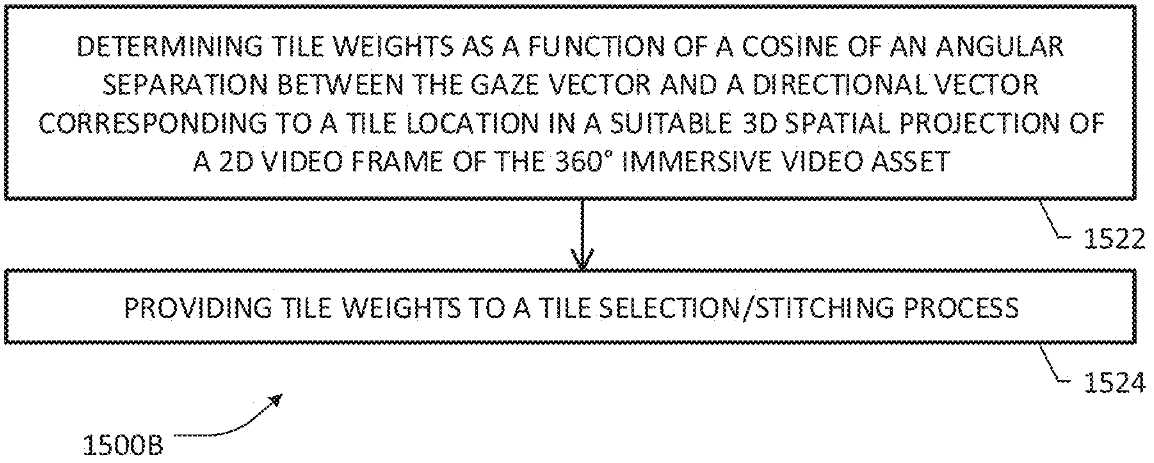

FIGS. 15A and 15B are flowcharts illustrative of various blocks, steps and/or acts of a gaze control scheme that may be (re)combined in one or more arrangements, with or without blocks, steps and/or acts of additional flowcharts of the present disclosure, for facilitating optimized tile selection according to one or more embodiments of the present invention. Process 1500A involves receiving a gaze vector from a client device operating to display a 360° immersive video asset to a user, wherein each video frame comprises an array of tiles projected on a 3-dimensional (3D) display environment viewed by the user in which the user is immersed, the gaze vector defining a gaze direction in the 3D display environment where the user is viewing at any particular time (block 1502). In one embodiment, gaze vector information may comprise (x,y,z) information in a 3D Cartesian coordinate system that may be associated with the display environment. In another embodiment, gaze vector information may comprise (ρ,θ,φ) information in a 3D spherical coordinate system based on an equirectangular projection mapping. In another embodiment, a 3D gaze vector may be normalized (to obtain a unit-length directional vector). Skilled artisans will therefore recognize that GV information may be provided in a number of ways depending on geometrical modeling, projection mapping, computational methodology, etc., used in a particular implementation. At block 1504, a determination may be made as to what the angular separation is between the gaze vector and a directional vector associated with each tile location respectively corresponding to the array of tiles in the 3D display environment, which again may be dependent on the particular geometrical modeling, projection mapping, computational methodology, and the like. At block 1506, responsive to the angular separations, a plurality of tile weights are determined corresponding to the array of tiles for use in selecting tiles of different bitrate qualities (QPs) of the 360° immersive video asset for assembling a video frame to be delivered to the client device. In general, tiles (or, more broadly, tile positions or locations) close to or within an arbitrary angular distance from the gaze vector may be assigned higher values, whereas tiles that are directly opposite to the gaze vector (i.e., 180° or π radians) may be assigned lowest weight values, with the remaining tiles in between (in both horizontal and vertical directions) receiving varying weight values between the maximum and minimum values according to any suitable mathematical relationship (e.g., linear, quadratic, etc.).

Process 1500B sets forth additional details with respect to effectuating gaze-based control in an example embodiment. At block 1522, tile weights may be determined as a function of a cosine of an angular separation between the gaze vector and the directional vector corresponding to a tile location in a suitable 3D spatial projection of a 2D video frame of the 360° immersive video asset. At block 1524, the tile weights may be provided as an input along with a dynamic bandwidth allocation input to a tile selection and bandwidth annealing process, which is further described elsewhere in the present patent application.

In one example embodiment, depending on where the tile is located in relation to the gaze vector, a determination is made how much bandwidth is allocated to that tile location corresponding to the weight. Where the gaze vector $\vec{a}$ and tile directional vector $\vec{b}$ are denoted by vectors, their dot product may be determined as follows:

$$\vec{a}\cdot\vec{b}=|a|\cdot|b|\cos\theta$$

Upon normalization, i.e., if [â]=gaze/|gaze|, then |a|=1. Likewise, by assigning [$\hat{b}$]=tile_direction/|tile_direction|, |b|=1. Accordingly, by normalizing, the foregoing relationship simplifies to:

$$\hat{a}\cdot\hat{b}=\cos\theta$$

Rather than mapping cos(θ) back to θ to determine a weight, an embodiment of the present invention involves defining a mathematical function to map from cos(θ) to a weight as follows: x=cos(θ), and f(x)={x+1} if x≥0 and f(x)=[α{x+1}] if x<0, where α=a scaling factor, e.g., 0.1. Thus, if the angular separation between a gaze vector and tile directional vector is 0°, cos(θ)=1 and f(x)=2. Likewise, for a tile that is 60° or 300° away from the gaze vector, cos(θ)=0.5 and the corresponding f(x) value is 1.5. In an equirectangular projection of a 3D frame, the angle exactly opposite to where the user is looking is 180°, which yields cos(θ)=−1.0, thereby obtaining a weight f(x) value of 0 regardless of the scaling factor. Accordingly, an example embodiment may provide a suitable scaling factor based on how smoothly or quickly tile qualities may vary in relation to a gaze direction within a frame.

Figure 16A:
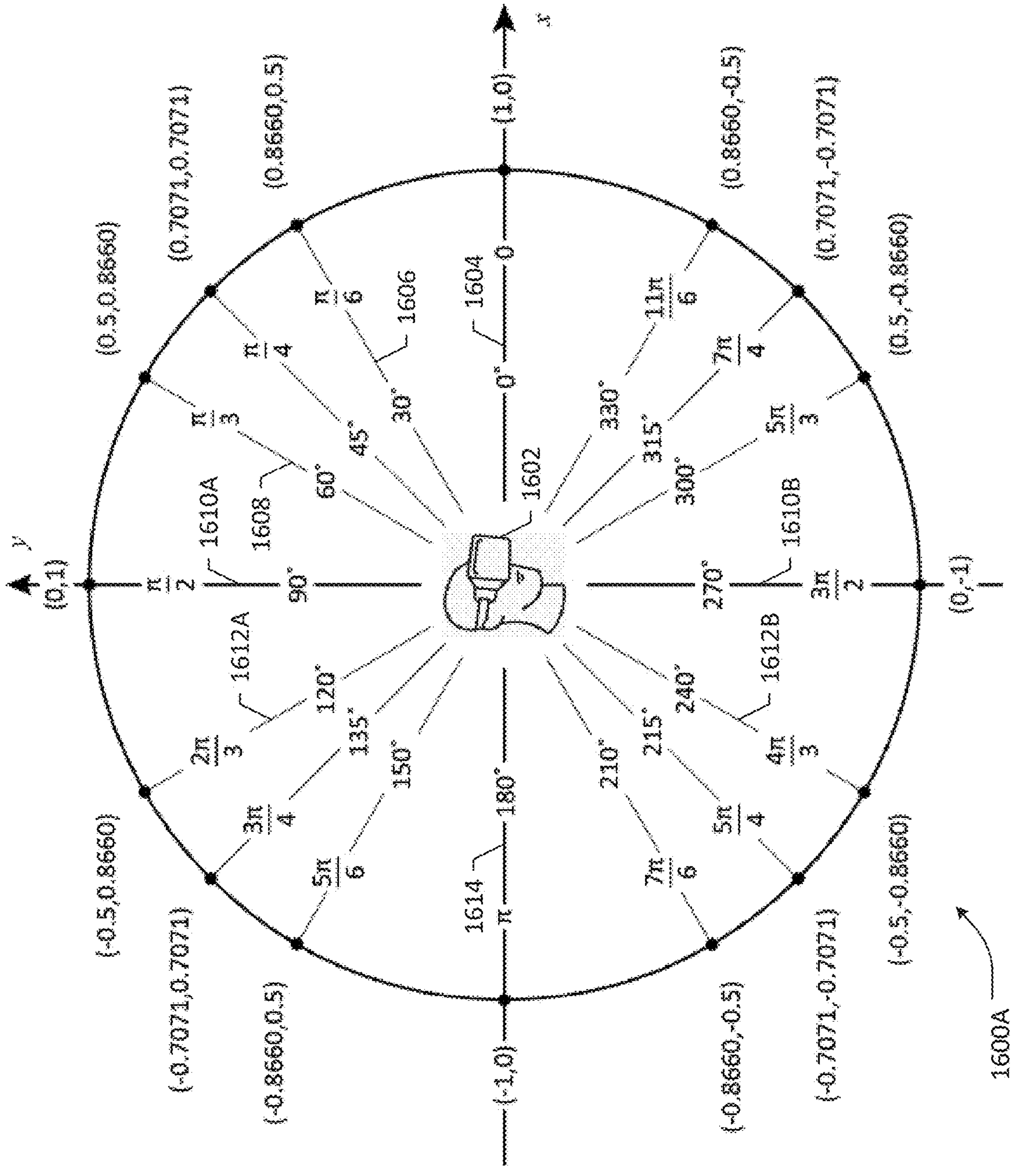
FIGS. 16A and 16B are illustrative of example geometrical arrangements for facilitating determination of angular separation between a user's gaze direction and tile positions in a tile encoded frame.

FIG. 16A illustrates an example unit-circular geometrical arrangement 1600A for facilitating determination of angular separation between a user's gaze direction and tile positions. A user location 1602 is set as the center of a unit-circular cross section of a 3D spherical space. By referencing the user's gaze along a first referential axis (e.g., X-axis) 1604, different angular displacements for the tile locations may be determined as set forth above. By way of illustration, reference numerals 1606 and 1608 refer to two tile directional vectors that are 30° and 60° away from the gaze direction 1604. In general, tile locations approaching near ±90° or thereabouts (e.g., reference numerals 1610A/1610B) with respect to the gaze direction 1604 connote a user's mid-to-far peripheral vision and a weighted scaling factor may be utilized such that tiles in such regions and beyond may be allocated a faster reduction in bandwidth (i.e., lesser quality). At a directional vector location 1614, the tiles are ±180° away from the gaze direction 1604.

In an example embodiment, instead of actual angular displacements, cosine values corresponding to different locations may be provided in reference to the gaze direction. For instance, if a tile direction vector is 90° or 270° from the gaze vector, x=0.0 may be fed to the weighting function, which yields a weight of 1.0. Likewise, for a tile direction vector is 330° away, x=0.866 is provided to the weighting function, thereby yielding a weight value of 1.866. As a further example, if the tile direction vector is 120° deg away, x=−0.5, is provided to the weighting function, thereby yielding a weight value of 0.05 (assuming α=0.1), which is the same if the tile direction were 240° away from the gaze vector).

Figure 16B:
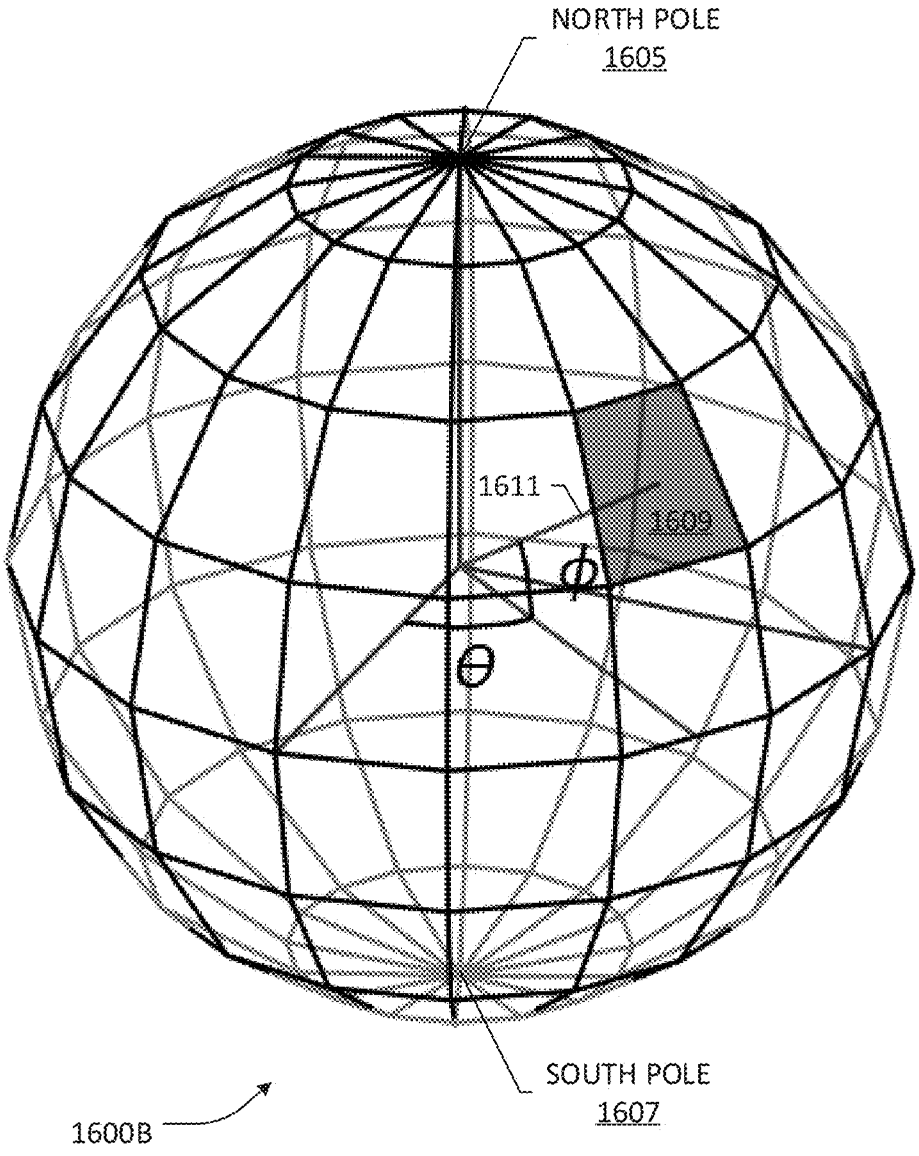

Further, both gaze vector information and tile direction vector information may be converted to appropriate tile coordinate information relative to the tile grid used in tile encoding during media preparation for facilitating identification of tiles by rows and columns, which may be input along with the weight information to a tile selection and bandwidth annealing process. One skilled in the art will recognize that the determination of tile coordinate information is dependent on the projection mapping used in an example embodiment. FIG. 16B illustrates an equirectangular projection mapping scheme resulting in a spherical display environment 1600B where the tiles form the surface. One example implementation provides placing a north pole 1605 in the direction of {0,1,0} and a south pole 1607 in the opposite direction, whereas the left and right edges of a tiled frame are in the direction of {0,0,1} and the center of the image (i.e., the tiled frame) is in the direction of [0,0,−1}. In an example implementation involving uniform tile sizes, an embodiment of the present invention provides an apparatus and method for determining the location of a tile 1609 which has a directional vector 1611, which may be configured to compute $t_x$ (the column index of the tile) and $t_y$ (the row index of the tile) for a given grid arrangement of $n_x$ (the number of tile columns) and $n_y$ (the number of tile rows) as follows, where θ is the polar angle and φ is the azimuthal angle of the spherical coordinate system:

$$\theta=\{[t_x+1/2]/n_x\}2\pi$$

$$\varphi=\lfloor 1/2-\{t_y+1/2\}/n_y\rfloor\pi$$

$$y=\sin\varphi$$

$$r=\cos\varphi$$

$$z=r*\cos\theta$$

$$x=r*\sin\theta$$

Where the encoding has non-uniform tile sizes, the foregoing equations may be modified based on, e.g., pixel areas of individual tiles, etc. By way of illustration, using (i) as the tile index for the left edge of tile column i, (j) as the tile index for the top edge of the tile row j, w is the number of pixel columns, and h is the number of pixel rows, an embodiment of the present invention may be configured to determine the following wherein both $x_i$ and $y_j$ involve a "floor" operator to round out (i.e., the fractional part is removed) with respect to using an example coding unit or block size (e.g., 64 pixels):

$$x_i=\left\lfloor\frac{iw}{64n_x}\right\rfloor 64$$

$$\theta=\frac{x_i+x_{i+1}}{2w}2\pi$$

$$y_j=\left\lfloor\frac{jh}{64n_y}\right\rfloor 64$$

$$\phi=\frac{y_i+y_{j+1}}{2h}2\pi$$

Figure 16C:
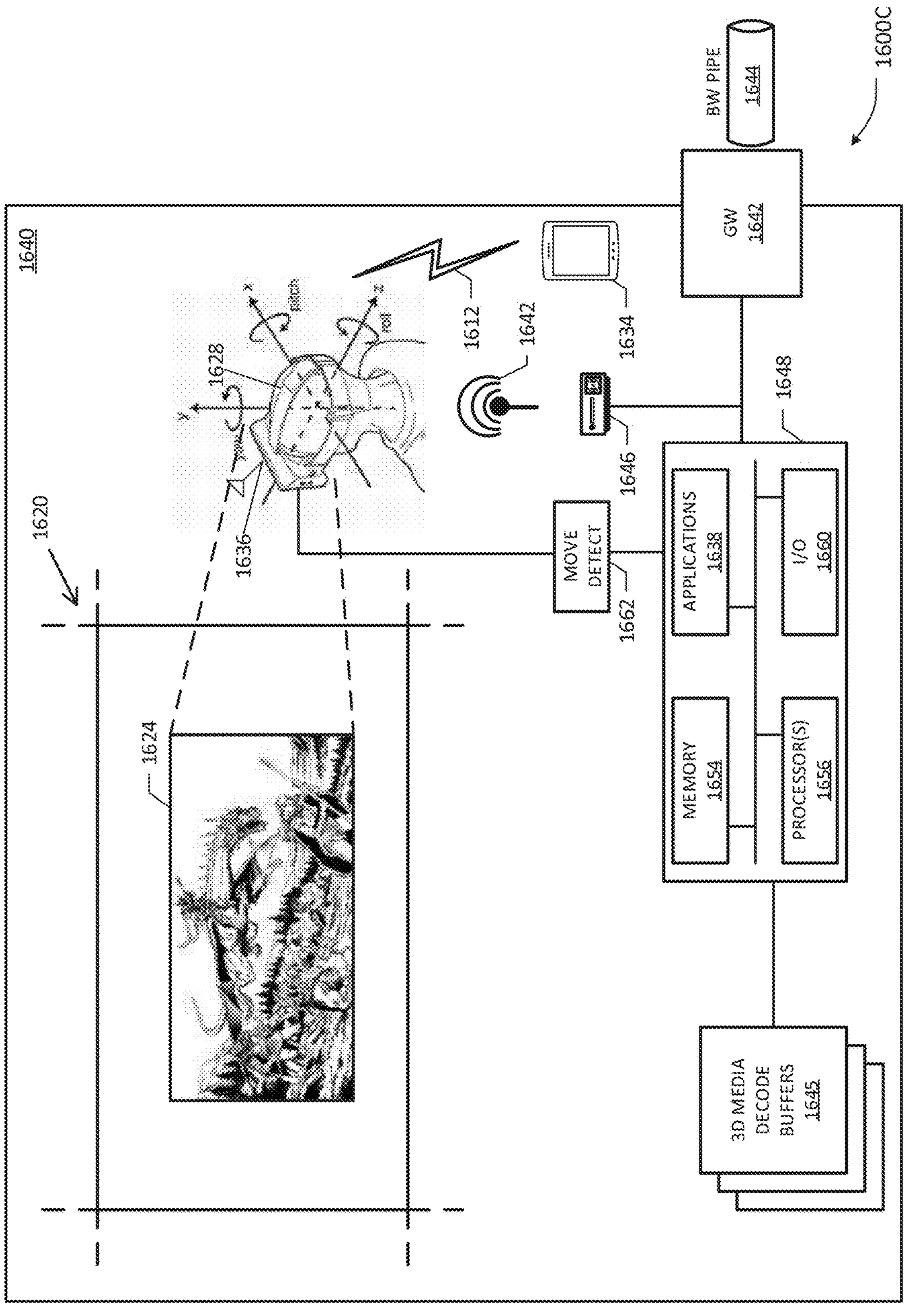
FIG. 16C is illustrative of an example 360° immersive video viewing environment for purposes of one or more embodiments of the present invention.

FIG. 16C is illustrative of an example 360° immersive video viewing environment 1600C for purposes of one or more embodiments of the present invention. A premises node or gateway (GW) 1642 associated with subscriber premises 1640 is served by a delivery pipe 1644 for providing immersive media content. In one arrangement, such immersive media content may be presented in a 3D-panoramic virtual space viewed in a suitable headset worn by the subscriber/user. An example UE may comprise a CPE 1646 served by GW 1642, such as a gaming console, laptop, or a smartphone, for example, that executes one or more gaming or media applications to provide suitable signals to one or more devices such as a display device 1636 mounted to or on a user's head 1628. Additional examples of such devices may comprise visors, goggles, wired/wireless headgear or helmets, masks, etc. that can display or effectuate an immersive viewing space surrounding the user. In an example display device arrangement, there may be additional instrumentation such as a gyroscope, accelerometer and a magnetometer, etc., to facilitate head tracking, i.e., when the user 1628 moves her head, the field of view around the simulated space may move accordingly, along with a portion of the space being gazed at (i.e., the viewport) by the user. Thus, in a head-tracking headset, the cone of view or field of view as well as the user's viewport moves around as the user looks up, down and moves side to side or angles her head. An example system may include the so-called 6 DoF (six degrees of freedom) arrangement that can plot the user's head in terms of X-, Y- and Z-axes to measure head movements, also known as pitch, yaw and roll, which may be used for tracking the user's point of view within the simulated 3D panoramic viewing space.

By way of illustration, CPE 1646 may be embodied as a platform 1648 including one or more processors 1656, volatile and nonvolatile/persistent memory 1654, input/output (I/O) interfaces 1660 (e.g., touch screens, gaming controllers, hand-tracking gloves, etc.), as well as one or more 360-degree media/gaming applications 1638 that can effectuate a 3D virtual viewing space or "screen" 1620 for the user 1628 wearing head-mounted display (HMD) 1636. In one example arrangement, HMD 1636 may be wirelessly coupled to CPE 1646 via wireless interface 1642. A plurality of decoder buffers 1645 may be provided as part of an example CPE platform 1646/1648 corresponding to one or more 360° immersive video content channels available to the user 1628.

Additional 3D-media-capable CPE 1634 (e.g., a tablet, phablet or smartphone, etc.) may also be separately or optionally provided. Example CPE apparatus 1646/1634 operating together or separately in conjunction with HMD 1636 may be operative to effectuate 3D virtual viewing space 1620 that is an immersive environment in which the user 1628 can move her point of view in full 360° in one of a vertical plane, a horizontal plane, or both planes, defined in the 3D environment, wherein the viewport 1624 changes accordingly. In an additional or alternative arrangement, CPE apparatus 1646/1634 operating in conjunction with HMD 1636 may be operative to effectuate a 3D virtual viewing space 1620 that may be partially immersive in that it is less than 360° along any one of the axes.

A movement and gaze detection module 1662 is operative to detect a movement in a point of view or gaze direction of the user/subscriber 1628 with respect to the 3D virtual viewing space 1620 and provide a suitable gaze vector output to a serving node as the subscriber 1628 shifts her gaze within the viewing space 1620. In one embodiment, a tile weighting module may be configured to operate at a 360° video optimization node (e.g., node 216 in FIG. 2) to determine appropriate tile weights based on the gaze vector information. In another embodiment, tile weighting may be performed locally at example apparatus 1646/1634 and/or at HMD 1636.

Figure 17A:
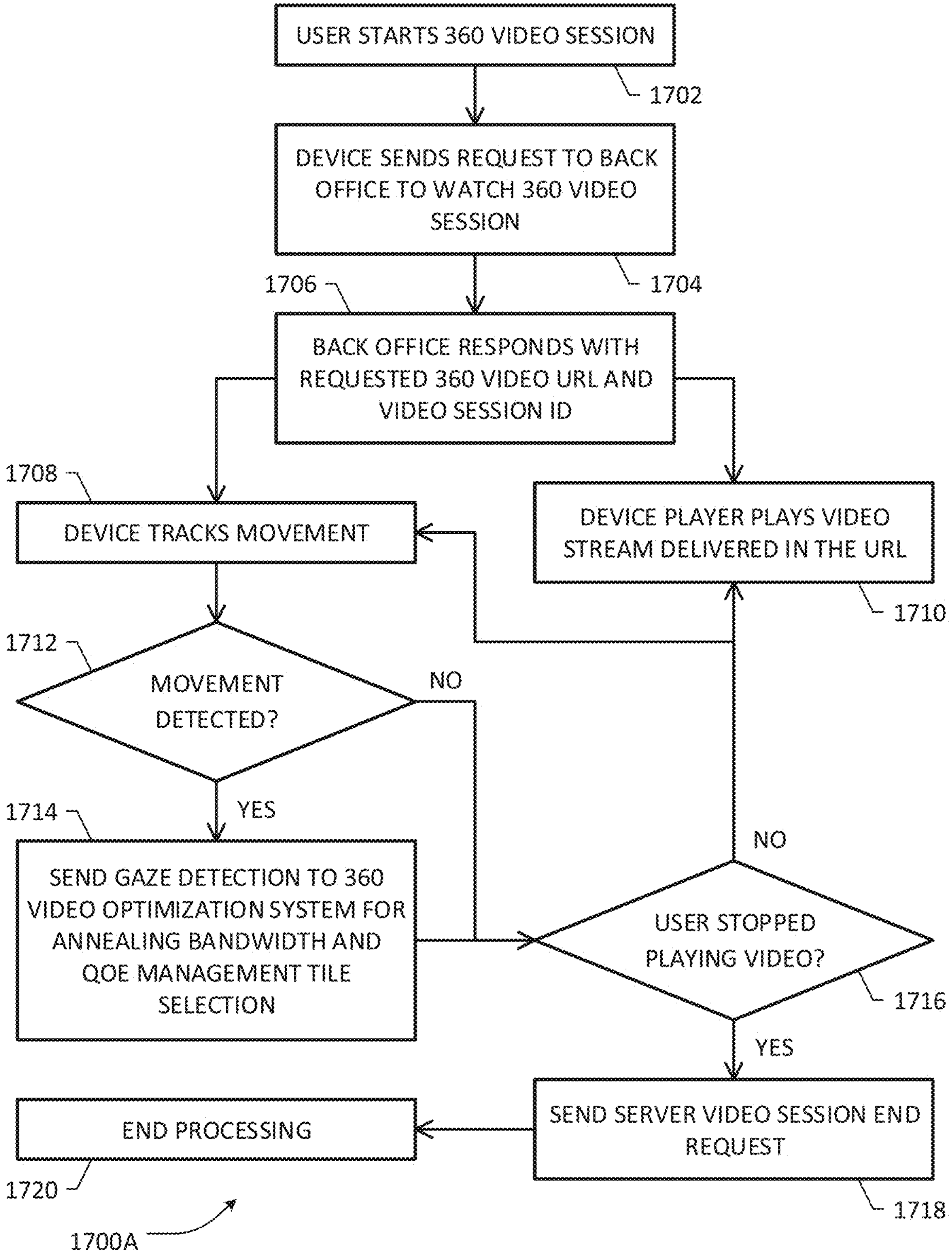
FIG. 17A is a flowchart illustrative of additional blocks, steps and/or acts with respect to an example 360° immersive video optimization process according to an example embodiment of the present invention.

FIG. 17A is a flowchart illustrative of additional blocks, steps and/or acts with respect to an example 360° immersive video optimization process according to an example embodiment of the present invention. In particular, process 1700A exemplifies client-side processing with respect to gaze/movement detection in one implementation. At block 1702, a user commences a 360° video session, whereupon a client device sends a request to a back office node (e.g., node 238 in FIG. 2) with respect to a requested 360° video asset (block 1704). At block 1706, the back office node responds with a URL for the requested asset and provides a video session ID to the client. Responsive thereto, the client device commences receiving the encoded video asset via streaming from the location identified in the URL, which a device player of the client device decodes and renders in a 3D immersive environment (block 1710). Also, the client device may commence monitoring or tracking head/ocular movement of the user operating the client device in connection with the ongoing 360° video session (block 1708). Responsive to detecting that a movement is detected (block 1712), gaze vector information with respect to a current viewport is provided to a 360° video optimization node (e.g., node 216 in FIG. 2), which utilizes the gaze vector information in combination with other pieces of information in a bandwidth annealing and tile selection process (block 1714). In one embodiment, gaze vector information may be generated until the user has stopped playing the video and/or no head/ocular movement is detected (e.g., over a period of time), as illustrated in an iterative loop involving decision blocks 1712 and 1716. In one embodiment, gaze vectors may be generated at a predetermined frequency (e.g., 40 times per second). As will be seen below, not all gaze vectors may be utilized in an example bandwidth annealing and tile selection process, which may be configured to be triggered only when there is a need for tile quality modification, e.g., upgrading or downgrading. When the user stops playing the video asset, appropriate session termination request/message may be generated to the delivery sever (block 1718), whereupon the process flow may terminate (block 1720).

Set forth below is a list of gaze vectors provided by a client device in an example implementation over a configurable time window:

| |
|---|
| 0.3203731, 0.1810199, 0.9298348 |
| 0.3201844, 0.1811305, 0.9298784 |
| 0.3201652, 0.1811581, 0.9298795 |
| 0.3201838, 0.1811286, 0.9298789 |
| 0.3201413, 0.1811444, 0.9298905 |
| −0.02325181, −0.6079658, 0.7936227 |
| −0.01977778, −0.6028962, 0.7975745 |
| −0.01794935, −0.6024268, 0.7979723 |
| −0.01342396, −0.6015137, 0.7987497 |
| −0.01229509, −0.6009697, 0.7991772 |
| −0.0120346, −0.5997405, 0.8001041 |
| −0.01373066, −0.6005607, 0.7994613 |
| −0.01506477, −0.5993657, 0.8003336 |
| −0.01094525, −0.5975212, 0.8017784 |
| −0.009084027, −0.5964078, 0.8026301 |
| −0.008858532, −0.5953203, 0.8034396 |
| −0.00746176, −0.5926894, 0.8053966 |
| −0.007450074, −0.5930958, 0.8050975 |
| −0.01072073, −0.5926897, 0.8053595 |
| −0.01269324, −0.5921446, 0.8057318 |
| −0.01323339, −0.5883871, 0.8084711 |
| −0.01338883, −0.586729, 0.8096727 |
| −0.01282388, −0.5847392, 0.81112 |
| −0.01634659, −0.5839438, 0.8116295 |
| −0.02636183, −0.5821166, 0.8126778 |
| −0.02774585, −0.5801842, 0.8140126 |
| −0.0245801, −0.5784537, 0.8153448 |
| −0.02183155, −0.5797198, 0.8145235 |
| −0.02022467, −0.5769228, 0.8165482 |
| −0.9961338, 0.007874234, 0.0874956 |
| −0.9719607, −0.02848928, 0.2334113 |
| −0.9855442, −0.0176625, 0.1684957 |
| −0.9825167, −0.0296559, 0.1837972 |
| −0.9824995, −0.03729712, 0.182493 |
| −0.982159, −0.03973407, 0.1838061 |
| −0.9689301, −0.02837855, 0.2457015 |
| −0.8717358, −0.01528142, 0.4897378 |
| −0.4374043, −0.01084228, 0.8991996 |
| 0.2052692, 0.0161775, 0.9785718 |
| 0.6165089, −0.005071477, 0.7873316 |
| 0.7826833, −0.01918624, 0.6221244 |
| 0.778906, −0.0795427, 0.6220759 |
| 0.7230754, −0.0673095, 0.6874819 |
| 0.6768191, −0.06240646, 0.7334994 |
| 0.5633906, −0.0747445, 0.8228027 |

In a non-normalized format, example GVs in a Cartesian coordinate system may comprise (x,y,z) values such as [3,5,1]; [10,4,1], etc. In a normalized spherical coordinate system, the GV values may comprise sets of angles such as, e.g., (59.04°, 80.27°), where r=radius has been normalized out, θ=polar inclination and φ=azimuth angle. Regardless of the format, whereas the gaze vector information may be provided or otherwise obtained at configurable frequencies, time periods, etc., not all gaze vectors may need to be utilized in a tile weight determination process. For example, tile weights may be determined and utilized only in response to triggering a tile selection and bandwidth annealing process, as noted previously with respect to certain embodiments. Accordingly, unused gaze vector information may be periodically discarded in such embodiments.

Figure 17B:
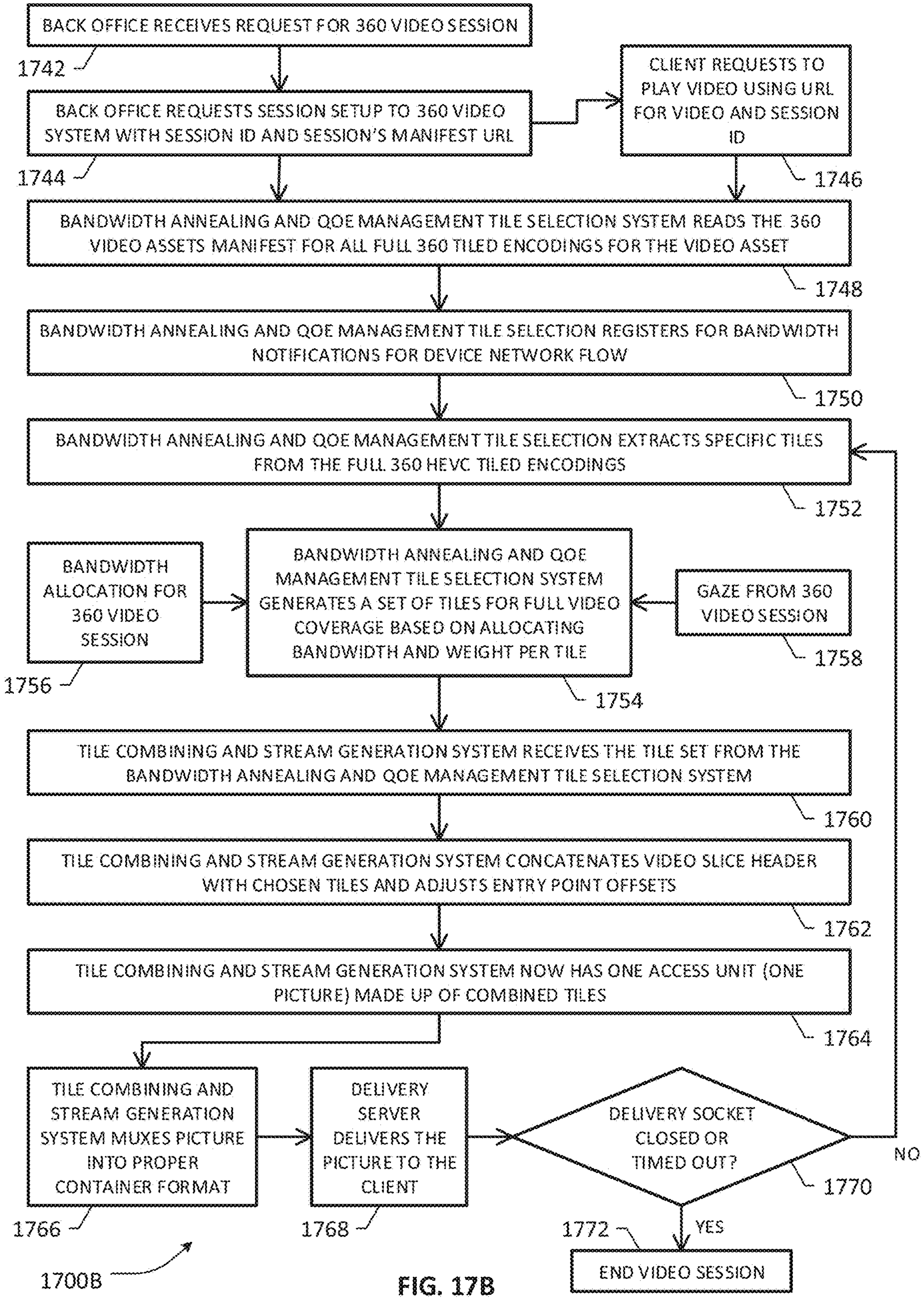
FIG. 17B is a flowchart illustrative of additional blocks, steps and/or acts with respect to further aspects of an example 360° immersive video optimization process according to an example embodiment of the present invention.

FIG. 17B is a flowchart illustrative of additional blocks, steps and/or acts with respect to further aspects of an example 360° immersive video optimization process according to an example embodiment of the present invention. In particular, process 1700B illustrates server-side processing with respect to tile weight determination based on gaze/movement detection and utilization of tile weights in bandwidth annealing and tile selection, inter alia, in an example implementation. At block 1742, a video back office node receives a user request for commencing a session, whereupon a session setup request may be generated to a 360° video optimization system (block 1744). Responsive to obtaining appropriate pieces of information, e.g., session ID, session's manifest URL, etc., the back office provides the requisite information to a client device for starting the requested video asset (block 1746). A bandwidth annealing and QoE management module with tile selection functionality (also referred to as BWA-TS module in some embodiments) is operative to obtain, retrieve, read and/or process the manifest associated with the requested video asset in all encoding representations (block 1748). At block 1750, BWA-TS module may also be configured to receive dynamic bandwidth notifications from the delivery network infrastructure (e.g., DSLAM/CMTS in an example embodiment) with respect to the client device's video session. At block 1752, BWA-TS module is operative to extract specific tiles from the tiled encoding streams or representations. At block 1754, BWA-TS module is operative to receive control inputs (blocks 1756, 1758) regarding bandwidth allocation for the 360° immersive video session as well as any gaze vector information. As noted previously, if the gaze vector input is not available initially, a default value may be used that may be configurable based on content type, content provider policy, client device type and capabilities, etc. Responsive to the control inputs, BWA-TS functionality is operative to generate or otherwise indicate a selected set of tiles based on the bandwidth and tile weights (block 1754). A tile combining/stitching and stream generation functionality (also referred to as TC-SG module in some embodiments) is operative to receive the selected tile set (block 1760), which may be concatenated as set forth hereinabove. Accordingly, in one implementation, a video slice header is concatenated with select tiles and appropriately modified to include applicable entry point offsets (block 1762). For purposes of tile stitching, certain operations may be performed at a Network Abstraction Layer (NAL) access unit level, where the coded video data is organized into multiple NAL units in a tiling hierarchy. A NAL access unit, which is effectively a packet that contains an integer number of bytes, may be treated as a logical substructure of an elementary stream formed by binary audio/video flows and compressed to facilitate bitstream manipulation access. In one implementation, it is the smallest data organization that is possible to be attributed in a system of synchronization involving layer compression, where MPEG decoding operations may be made, taking into account that consistency among the video parametric information (e.g., spatial/temporal redundancy, etc.) is maintained.

Continuing to refer to FIG. 17B, at block 1764, TC-SG module is provided with a segment of data for one frame/picture comprising combined tiles, which may be containerized in a suitable container format, e.g., MPEG-2 Transport Stream container format (M2TS; also referred to as MP2TS sometimes), MPEG 4 part 14 (MP4) container format, or ISO Base Media File Format (ISOBMFF) container format, and the like (block 1766). A delivery server may be configured to deliver the muxed picture/frame to the client device over a suitable network (block 1768). As set forth in the embodiment of FIG. 17B, operations comprising BWA-TS, TC-SG and delivery service of process 1700B may continue to take place until the delivery communications socket is closed or timed out (block 1770). Thereafter, the 360° video session with the client device may be terminated (block 1772).

In an example embodiment, the bandwidth allocation for an exemplary 360° immersive video session may be 19 Mb/s. The video may be encoded with full 360 video using a 128-tile grid, covering bitrates varying from a high of 105.6 Mb/s with a QP value of 16 to a low of 7 Mb/s with a QP value of 30. The higher quality tiles are targeted at the user's direct field of vision. The quality of tiles degrades (i.e., QP values rise) in proportion to the distance from the user's direct field of vision. The functionality of BWA-TS insures that the overall bandwidth of the 360 video session is not exceeded. The tile selection is based on the bitrate of each tile. In an example when the user is looking up at a cloudy sky in a scene, most of the tiles provided in that viewport are relatively high quality. The content of the tiles when looking up in such a scenario is relatively static (i.e., very little motion) and therefore not as many bits are dedicated to the low motion areas by the encoder. This results in the ability to show tiles from the highest quality video encoding with a QP value of 16. When the bandwidth allocation for the 360 video is reduced (for example from 19 Mb/s to 7 Mb/s), the quality of the tiles is also reduced. In the foregoing example, the highest quality tiles in the direct field of vision may have a bitrate of 22.4 Mb/s with a QP value of 22.

FIG. 18A illustrates a tile-weighted frame 1800A comprising 16-by-8 array of tiles, wherein each tile is assigned a weight based a gaze vector of {0.783, 0.396, −0.481} provided by a client device in an example implementation. Reference numeral 1802 refers to a viewport associated with the gaze, where the tiles are given highest values in accordance with the teachings of the present invention. One skilled in the art will recognize that as the viewport changes, the region of tiles with highest values also changes concomitantly. In a 360° immersive video display space based on equirectangular projection, the region of tiles with highest values thus also moves around, e.g., to the polar regions if the user is gazing directly up or down, or to the equator if the user is gazing directly in the middle of a picture. By way of illustration, FIG. 18C depicts a 3D immersive display or viewing space 1800C where the tiles of highest quality are near the North Pole region 1852 when the user is directly looking up, with the progressively lower quality tiles forming the remaining portion of the immersive space, wherein the lowest quality tiles are located near the South Pole region 1854. Likewise, FIG. 18D depicts a 3D immersive display or viewing space 1800D where the tiles of higher quality are near the South Pole region 1854 when the user is directly looking down, with the progressively lower quality tiles spanning toward the North Pole 1852.

Figure 18B:
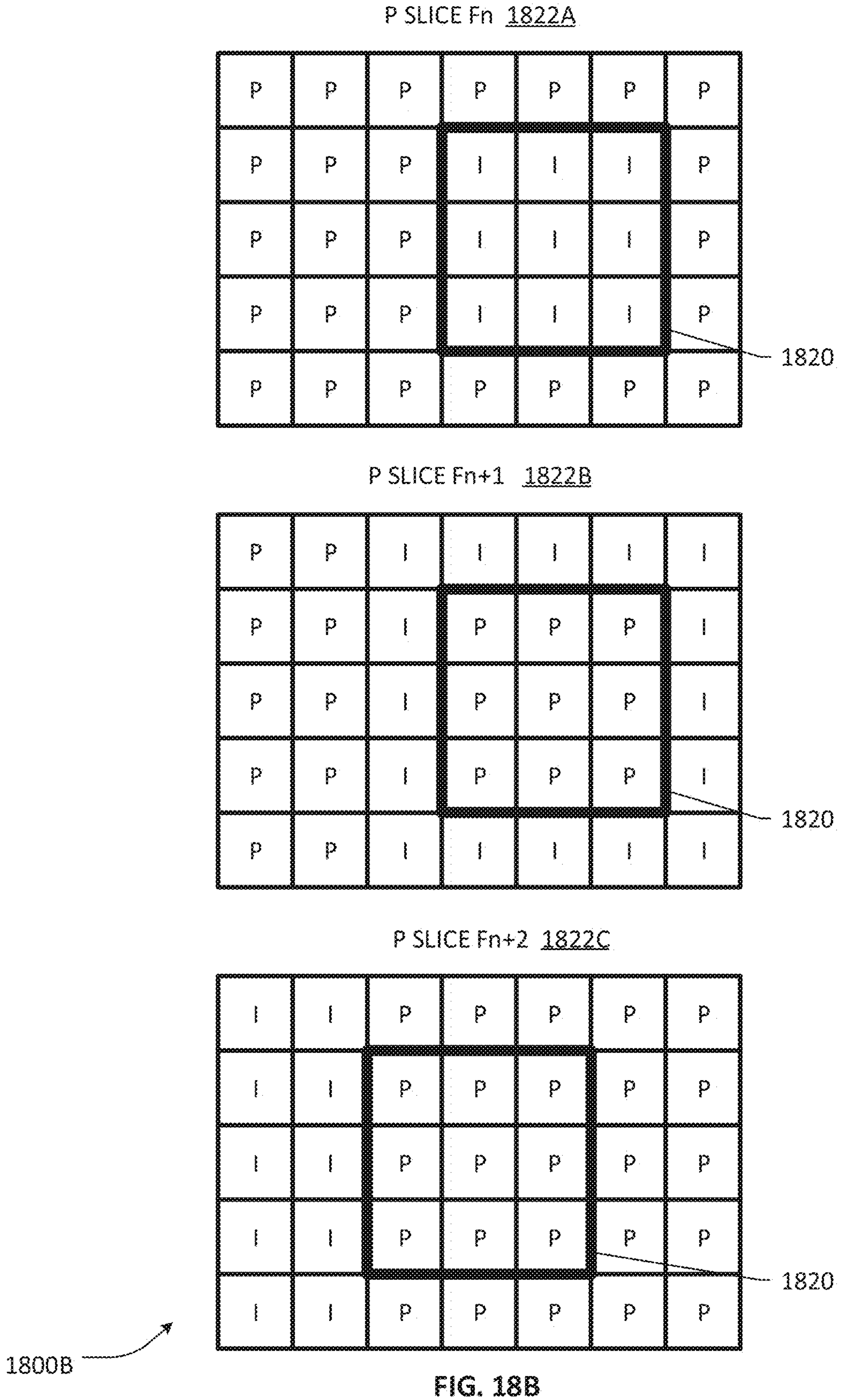
FIG. 18B depicts an example device buffer with frames of differently-coded viewport tiles.
Figure 18C:
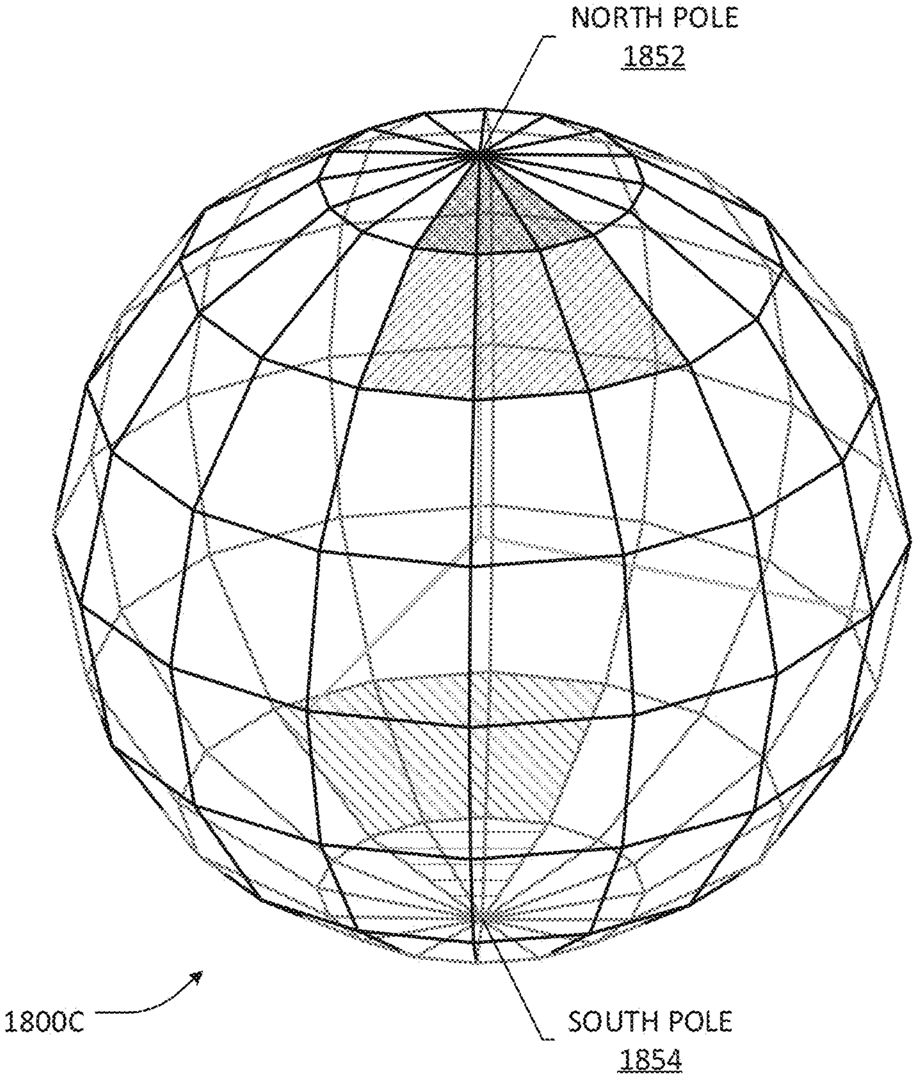
FIGS. 18C and 18D illustrate 3D viewing spaces where tile qualities are distributed based on user gaze direction.
Figure 18D:
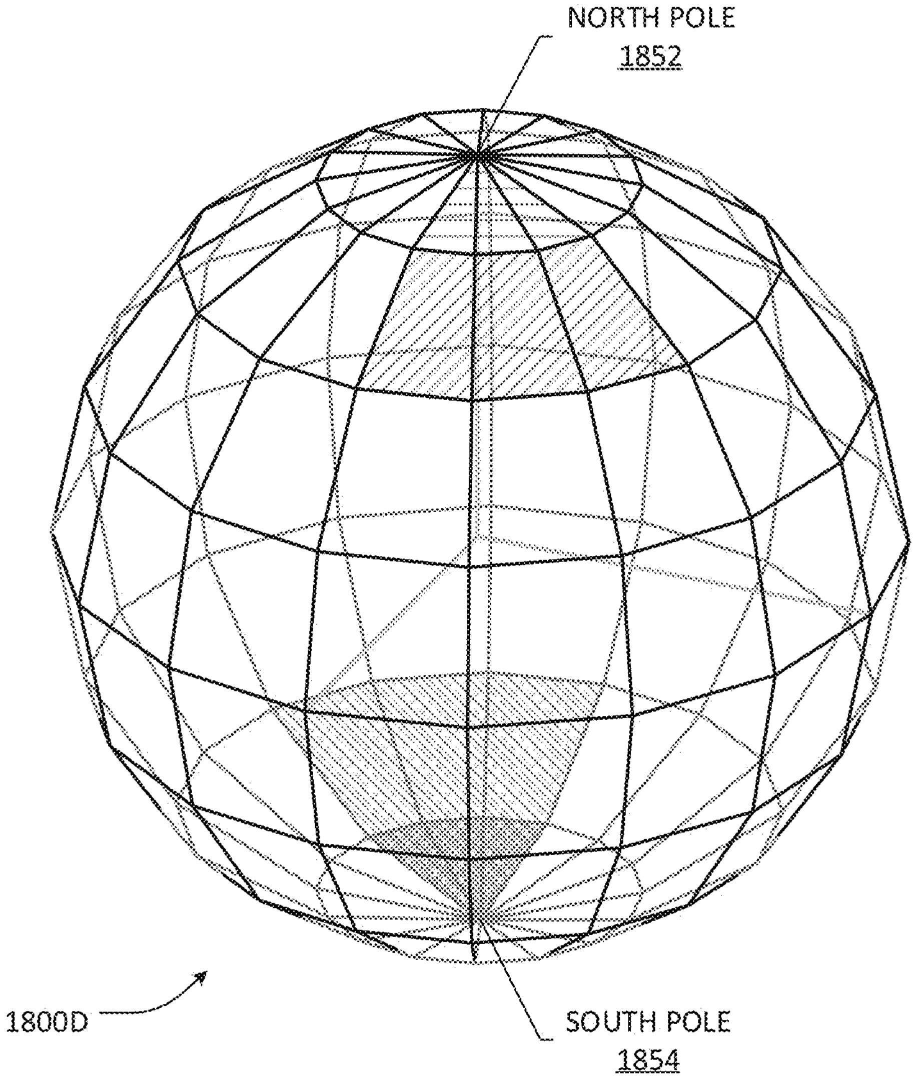

FIG. 18B illustrates a device frame buffer 1800B in an example embodiment. Three consecutive frames 1822A-1822C in the buffer are illustrated, each having a P-slice header but comprising different sets of tiles in a viewport 1820 based on the headset view. Whereas a current frame 1822A has all I-tiles in its viewport 1820, the following frames are shown with viewports 1820 having P-tiles.

As noted hereinabove, an aspect of the functionality of a BWA-TS module is to insure that the overall bandwidth of an example 360° immersive video session does not exceed a designated bandwidth allocation (e.g., based on network operator policies, content provider policies, subscriber/device policies, or any combination thereof), while still maximizing quality and viewing experience. Optimized tile selection having suitable bitrate qualities may therefore be configured responsive to a user's field of vision, bandwidth allocation/limitation, bitrates per tile as well as a transmit buffer model such that tiles in the direct line of sight have the best quality possible, with decreasing qualities moving farther away from the direct gaze.

FIG. 19 is a flowchart illustrative of various blocks, steps and/or acts of a BWA-TS process 1900 that may be (re) combined in one or more arrangements, with or without blocks, steps and/or acts of additional flowcharts of the present disclosure, according to one or more embodiments of the present invention. As set forth at block 1902, process 1900 may commence with or responsive to receiving, retrieving or otherwise obtaining one or more stream manifest files provided by a 360° video asset packager (e.g., packager 214 in FIG. 2) with respect to a plurality of tile-encoded streams that may be generated according to a BIE or PE scheme. In general, the manifest files may include information or data describing various characteristics of tile groupings per frame, including location URLs, bitrates, slice/block type, media type, etc., for each tile-encoded bitstream corresponding to a particular one of a plurality of bitrate representations of a media input stream. In one arrangement, manifests may be organized in a hierarchical manner, i.e., with certain manifests for describing overall coded bitstreams, while other manifests are provided for describing individual tiles in a stream. As set forth passim in the present patent application, each stream is a particular bitrate representation of the source media having a video quality, e.g., related to or controlled by a corresponding QP used for the bitrate representation, and/or targeted bitrate, or other indicia, wherein each frame of a tile-encoded bitstream comprises an array of tiles organized into at least one slice per frame, wherein a plurality of frames form a GOP structure of the tile-encoded bitstream. At block 1904, process 1900 proceeds to receiving, retrieve or otherwise obtain gaze vector information, and responsive thereto, determines tile weights corresponding to an array of tiles forming a frame, e.g., based on the gaze vector or by default settings. At block 1906, process 1900 proceeds to receive, retrieve or otherwise obtain variant weights corresponding to the plurality of bitrate representations or associated tile-encoded bitstreams of the media input stream. In one arrangement, the variant weights may be defined as a policy-based property of the streams where higher quality stream representations (i.e., variants) are accorded a higher priority or weight that may be used in further computations involving weight based knapsack packing selections. At block 1908, a determination is made with respect to an adequacy metric value as a function of a variant weight and a tile weight for each tile/GOP-tuple combination over a set of frames across a GOP structure for each of the tile-encoded bitstreams. At block 1910, process 1900 proceeds to selecting tiles having different bitrate qualities from corresponding tile-encoded bitstreams for assembling a frame, responsive at least in part to the adequacy metric values, wherein the bitrate qualities of the selected tiles are optimized to satisfy a transmit buffer model for transmitting a multiplexed video output stream. Thereafter, a list of the selected tiles may be provided to a tile stitcher for generating a frame containing the selected tiles as part of the muxed video output stream (block 1912). Where the tile stitching is performed in a device-side embodiment, the selected tiles may be provided to the client device in an example embodiment, as noted elsewhere in the present patent application.

An example stream-level manifest for purposes of an embodiment of the present invention is illustrated below:

```
<?xml version="1.0"?>
<TiledMediaDefinition>
<TileGroup>
<Representation tiles="128" columns="16" rows="8" height="2160"
id="1" mimeType="video/H265" width="3840" QP="16">
  <URL>race360-105Mbs.hevc</URL>
</Representation>
<Representation tiles="128" columns="16" rows="8" height="2160"
id="2" mimeType="video/H265" width="3840" QP="18">
  <URL>race360-64_6Mbs.hevc</URL>
</Representation>
<Representation tiles="128" columns="16" rows="8" height="2160"
id="3" mimeType="video/H265" width="3840" QP="20">
  <URL>race360-39Mbs.hevc</URL>
</Representation>
<Representation tiles="128" columns="16" rows="8" height="2160"
id="4" mimeType="video/H265" width="3840" QP="22">
  <URL>race360-24_4Mbs.hevc</URL>
</Representation>
<Representation tiles="128" columns="16" rows="8" height="2160"
id="5" mimeType="video/H265" width="3840" QP="24">
  <URL>race360-16_2Mbs.hevc</URL>
</Representation>
<Representation tiles="128" columns="16" rows="8" height="2160"
id="6" mimeType="video/H265" width="3840" QP="26">
  <URL>race360-11_4Mbs.hevc</URL>
</Representation>
<Representation tiles="128" columns="16" rows="8" height="2160"
id="7" mimeType="video/H265" width="3840" QP="28">
  <URL>race360-8_6Mbs.hevc</URL>
</Representation>
<Representation tiles="128" columns="16" rows="8" height="2160"
id="8" mimeType="video/H265" width="3840" QP="30">
  <URL>race360-7Mbs.hevc</URL>
</Representation>
</TileGroup>
</TiledMediaDefinition
```

An example lower-level manifest based on DASH-MPD for purposes of an embodiment of the present invention involving multiple phase encoded streams is illustrated below:

```
<?xml version="1.0" encoding="UTF-8" ?>
- <MPD xmlns:xsi="http://www.w3.org/2001/XMLSchema-instance"
xmlns="urn:mpeg:dash:schema:mpd:2011"
xsi:schemaLocation="urn:mpeg:dash:schema:mpd:2011 DASH-
MPD.xsd" type="static" mediaPresentationDuration="PT654S"
minBufferTime="PT2S" profiles="urn:mpeg:dash:profile:isoff-on-
demand:2011">
- <Period tag="batman-plain">
- <AdaptationSet mimeType="audio/mpegts">
  - <Representation>
  <BaseURL>batman-audio.ts</BaseURL>
  </Representation>
</AdaptationSet>
- <AdaptationSet mimeType="video/mp4" framePeriod="1/24">
  - <Representation label="batman qp 16 @ 38.0"
  weight="37.99" graphNote="16">
  <BaseURL phase="0" label="batman phase 0 qp
  16">batman-phase-0-qp16.mp4</BaseURL>
  <BaseURL phase="1" label="batman phase 1 qp
  16">batman-phase-1-qp16.mp4</BaseURL>
  <BaseURL phase="2" label="batman phase 2 qp
  16">batman-phase-2-qp16.mp4</BaseURL>
```

-continued

```
  <BaseURL phase="3" label="batman phase 3 qp
  16">batman-phase-3-qp16.mp4</BaseURL>
   <BaseURL phase="4" label="batman phase 4 qp
  16">batman-phase-4-qp16.mp4</BaseURL>
  <BaseURL phase="5" label="batman phase 5 qp
  16">batman-phase-5-qp16.mp4</BaseURL>
  <BaseURL phase="6" label="batman phase 6 qp
  16">batman-phase-6-qp16.mp4</BaseURL>
  <BaseURL phase="7" label="batman phase 7 qp
  16">batman-phase-7-qp16.mp4</BaseURL>
  <BaseURL phase="8" label="batman phase 8 qp
  16">batman-phase-8-qp16.mp4</BaseURL>
  <BaseURL phase="9" label="batman phase 9 qp
  16">batman-phase-9-qp16.mp4</BaseURL>
  <BaseURL phase="10" label="batman phase 10 qp
  16">batman-phase-10-qp16.mp4</BaseURL>
  <BaseURL phase="11" label="batman phase 11 qp
  16">batman-phase-11-qp16.mp4</BaseURL>
  <BaseURL phase="12" label="batman phase 12 qp
  16">batman-phase-12-qp16.mp4</BaseURL>
  <BaseURL phase="13" label="batman phase 13 qp
  16">batman-phase-13-qp16.mp4</BaseURL>
  <BaseURL phase="14" label="batman phase 14 qp
  16">batman-phase-14-qp16.mp4</BaseURL>
  </Representation>
  -
  <Representation label="batman qp 18 @ 28.9"
  weight="28.88" graphNote="18">
  <BaseURL phase="0" label="batman phase 0 qp
  18">batman-phase-0-qp18.mp4</BaseURL>
  <BaseURL phase="1" label="batman phase 1 qp
  18">batman-phase-1-qp18.mp4</BaseURL>
  <BaseURL phase="2" label="batman phase 2 qp
  18">batman-phase-2-qp18.mp4</BaseURL>
  <BaseURL phase="3" label="batman phase 3 qp
  18">batman-phase-3-qp18.mp4</BaseURL>
  <BaseURL phase="4" label="batman phase 4 qp
  18">batman-phase-4-qp18.mp4</BaseURL>
  <BaseURL phase="5" label="batman phase 5 qp
  18">batman-phase-5-qp18.mp4</BaseURL>
  <BaseURL phase="6" label="batman phase 6 qp
  18">batman-phase-6-qp18.mp4</BaseURL>
  <BaseURL phase="7" label="batman phase 7 qp
  18">batman-phase-7-qp18.mp4</BaseURL>
  <BaseURL phase="8" label="batman phase 8 qp
  18">batman-phase-8-qp18.mp4</BaseURL>
  <BaseURL phase="9" label="batman phase 9 qp
  18">batman-phase-9-qp18.mp4</BaseURL>
  <BaseURL phase="10" label="batman phase 10 qp
  18">batman-phase-10-qp18.mp4</BaseURL>
  <BaseURL phase="11" label="batman phase 11 qp
  18">batman-phase-11-qp18.mp4</BaseURL>
  <BaseURL phase="12" label="batman phase 12 qp
  18">batman-phase-12-qp18.mp4</BaseURL>
  <BaseURL phase="13" label="batman phase 13 qp
  18">batman-phase-13-qp18.mp4</BaseURL>
  <BaseURL phase="14" label="batman phase 14 qp
  18">batman-phase-14-qp18.mp4</BaseURL>
  </Representation>
  . . .
  </Representation>
  </AdaptationSet>
</Period>
</MPD>
```

Figure 20:
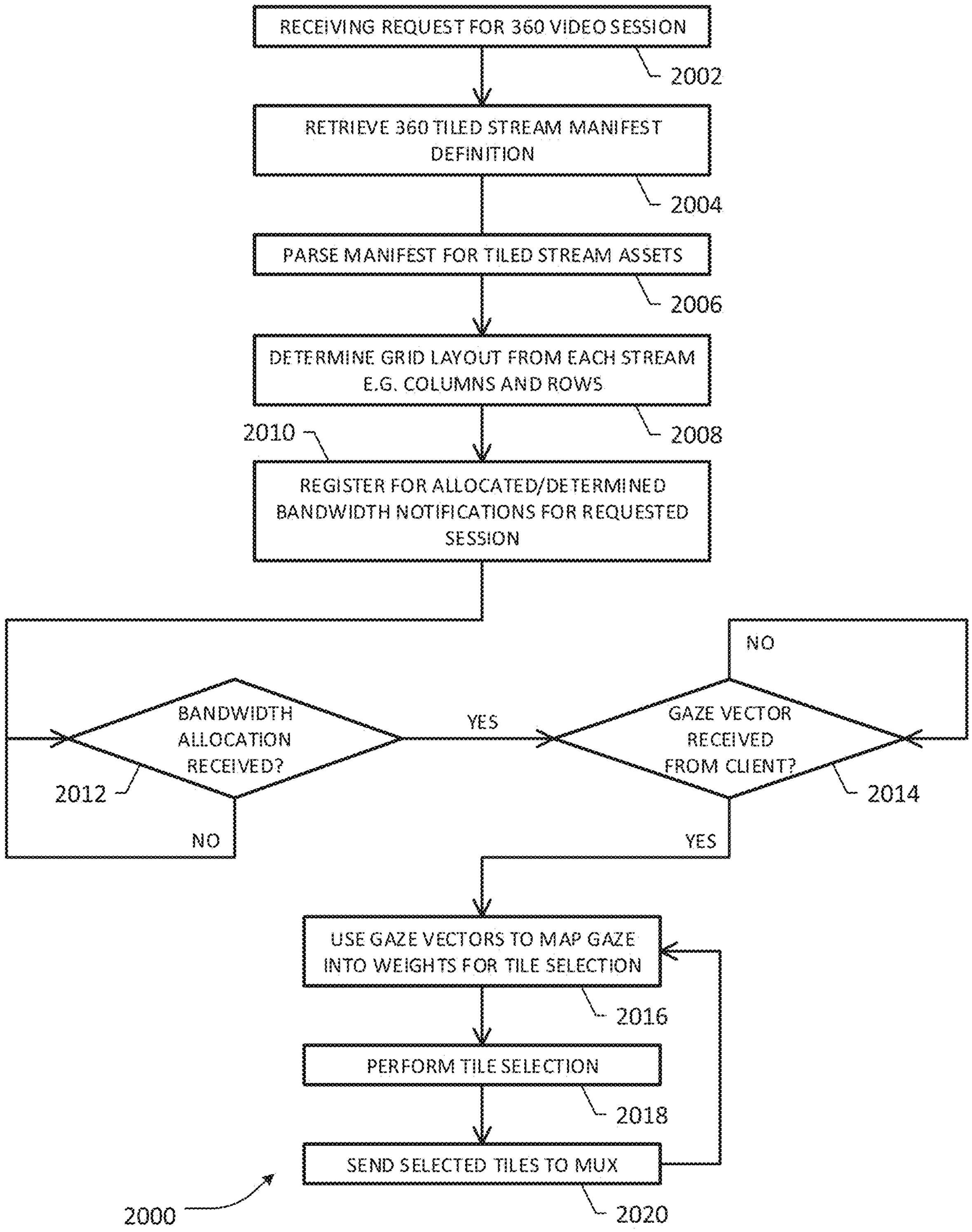
FIG. 20 is a flowchart illustrative of additional blocks, steps and/or acts with respect to an example tile selection and bandwidth annealing process according to an embodiment of the present invention.

FIG. 20 is a flowchart illustrative of additional blocks, steps and/or acts with respect to an example tile selection and bandwidth annealing process according to an embodiment of the present invention. In one arrangement, a knapsack combinatorial optimization may be used for tile selection and annealing based on the inputs comprising gaze vectors, bandwidth allocation/limitation, stream weights, etc., as pointed out previously. At block 2002, process 2000 executing at a server or node associated with video optimization commences with or responsive to receiving a request for a 360° immersive video session. At block 2004, process 2000 proceeds to retrieve or otherwise obtain tiled stream manifest definitions so as to be able to determine all aspects of the video characteristics based on deep-level inspection and processing in order to extract the needed tiles, which may be effectuated by way of parsing the steam manifests (block 2006). A grid layout is determined for each stream, e.g., columns and rows per frame (block 2008). In an example variation, process 2000 may register with a network management and orchestration node to receive notification messages relative to allocated/determined bandwidth for the requested session (block 2010). If a bandwidth allocation is received (block 2012), a further determination may be made whether gaze vector information is received (block 2014). Thereafter, tile weights are determined based on the gaze vector information (block 2016). Tile selection may be performed as a knapsack annealing process responsive to available bandwidth allocation notification (block 2018). At block 2020, selected tiles are provided to a tile stitching process (executing at the server or at the client device).

Figure 21A:
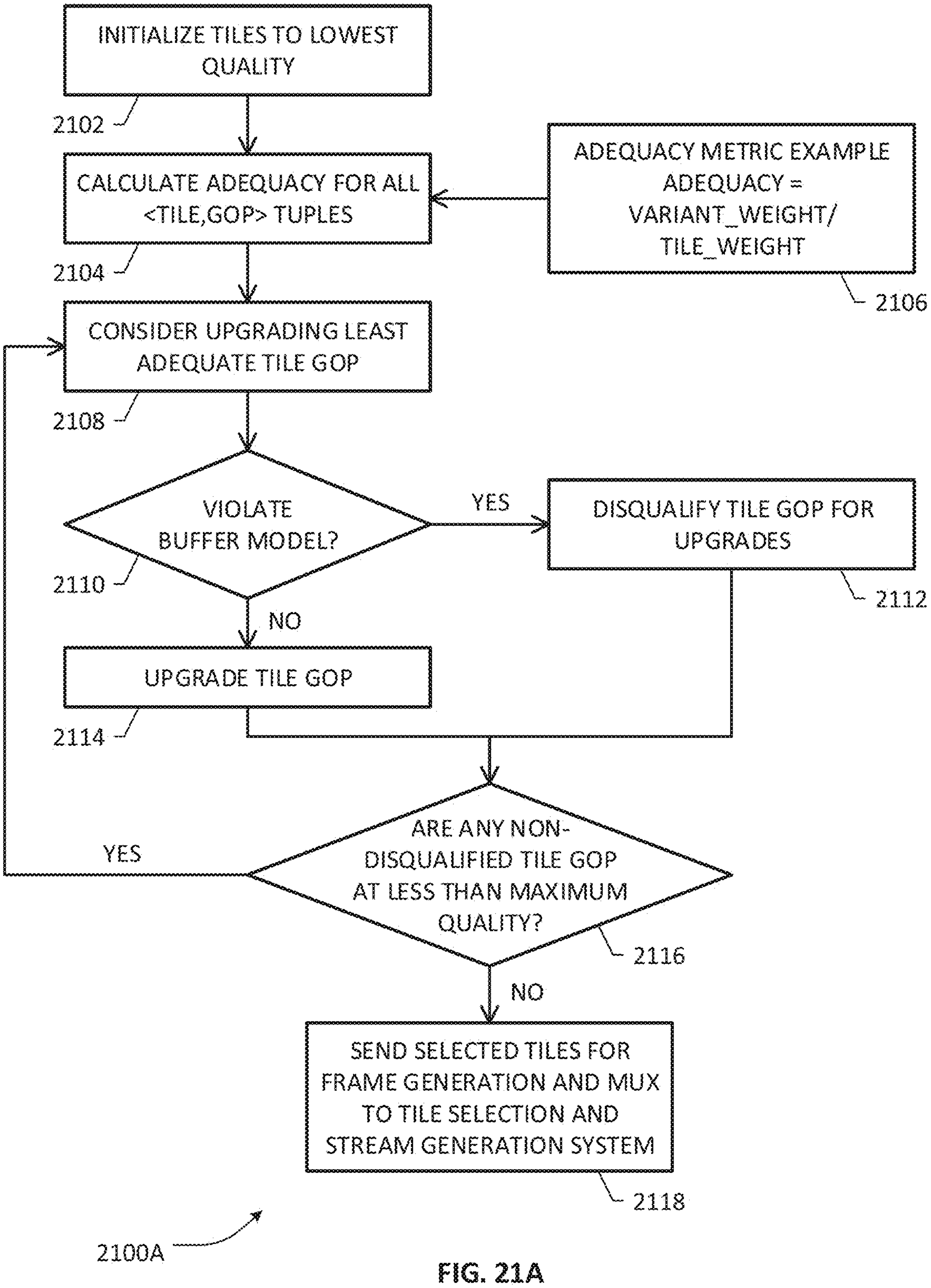
FIGS. 21A and 21B are flowcharts illustrative of additional blocks, steps and/or acts with respect to further aspects of a tile selection and bandwidth annealing process according to an example embodiment of the present invention.
Figure 21B:
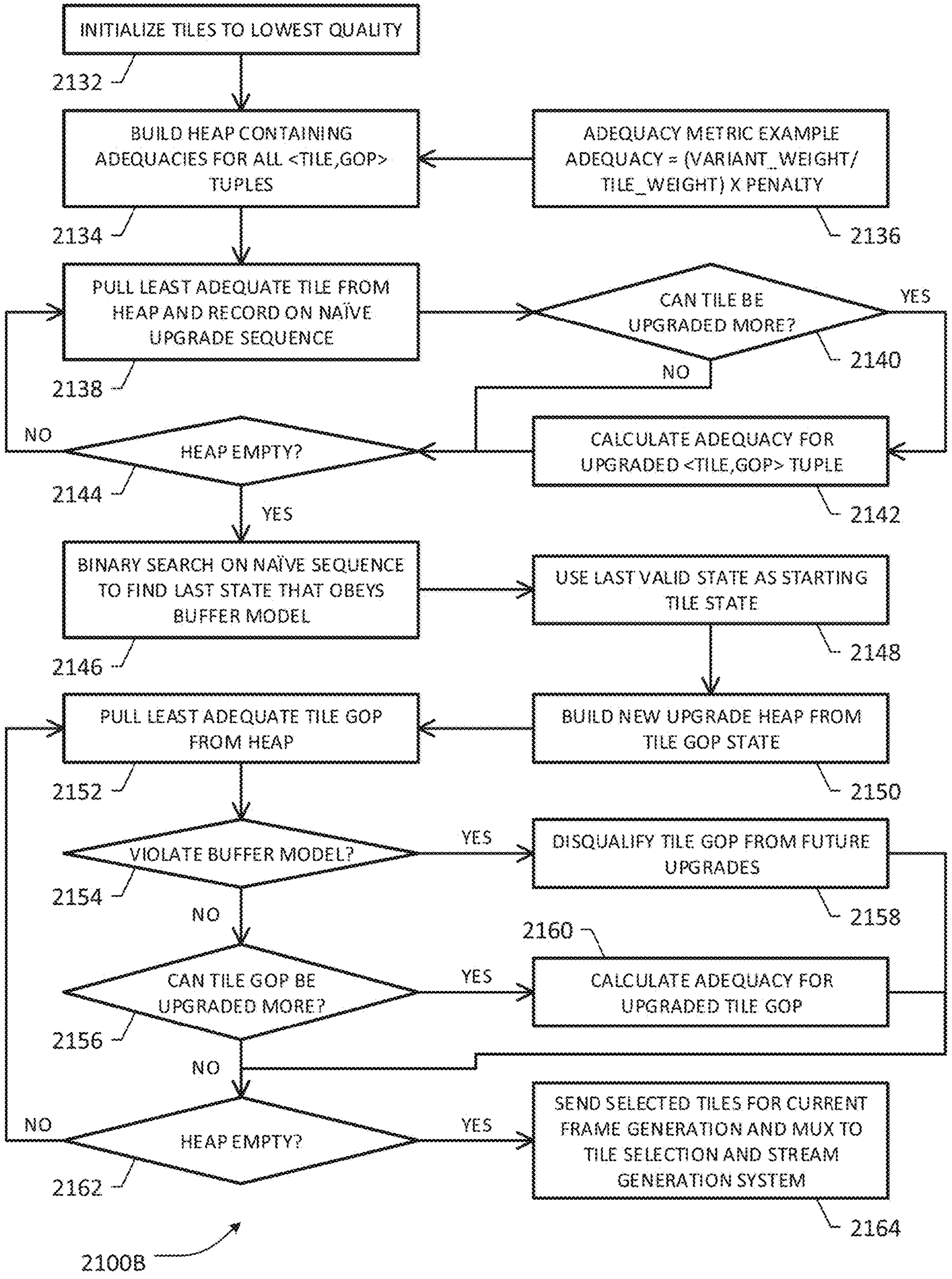

FIGS. 21A and 21B are flowcharts illustrative of additional blocks, steps and/or acts with respect to further aspects of a tile selection and bandwidth annealing process according to an example embodiment of the present invention. In particular, process 2100A shown in FIG. 21A exemplifies a relatively simpler knapsack annealing process, which may be computationally more expensive that can result in about approximately 1 second for tile splicing. At block 2102, the tiles are initialized to a lowest quality. An adequacy metric may be determined as a ratio between a stream variant weight and a tile weight, which may be provided with respect to all <tile,GOP>-tuples or combinations (block 2104). A determination is made with respect to upgrading the <tile, GOP>-tuple having the least adequacy (i.e., most inadequacy), as set forth at block 2108. A determination is made whether a transmit buffer model is violated or satisfied (block 2110). If the buffer model is not satisfied (i.e., violated), that tile/GOP combination may be disqualified for upgrades and the process flow returns to considering the next tile/GOP combination for upgrading, as set forth at block 2112. If the buffer model is not violated, the tile/GOP combination is upgraded in quality (block 2114). The foregoing process may be iteratively performed until there are no non-disqualified tile/GOP combinations at less than maximum quality (block 2116). If none, process 2100A is completed by sending selected tiles to a tile mux and stream generation process, as set forth at block 2118.

Turning to FIG. 21B, a performance-optimized tile selection and annealing process 2100B is shown, which in some implementations may result in faster tile section, resulting in overall tile splicing times around 10 milliseconds or so. Broadly, a penalty factor may be imposed with respect to I-tile upgrades (which are costlier than P-tile upgrades as I-tiles pack more data) and a "naïve" upgrade sequence may precede initially where tile upgrades are not checked against the transmit buffer model regardless of whether the upgrades comply with an adequacy metric. Further, as tiles in the ROI/viewport get upgraded first and the rest of the tiles of a frame are upgraded/updated subsequently, an example embodiment may factor in a penalty based on where the tile position is. For example, if the tile position is close to the gaze vector, the penalty associated with that position may be lower. Further, penalty may also be related to the tile position as a balance between the quality/type of the tile to be upgraded vs. where it is in the frame. The effects of a penalty factor or combination may be incorporated in the annealing process by suitably modulating the adequacy metric used in the naïve upgrade sequence in an example embodiment.

Similar to the embodiment of FIG. 21A, the tiles of all video encodings are initialized to a lowest quality (block 2132). An adequacy metric may be determined as a ratio between a stream variant weight and a tile weight, multiplied by a penalty factor, which may be provided with respect to all <tile,GOP>-tuples or combinations (block 2136). At block 2134, a heap structure (e.g., as a large pool of memory) may be configured for containing adequacy values for all <tile,GOP>-tuples. At block 2138, a least adequate tile is pulled from the heap and recorded on a naïve upgrade sequence or process. If the tile quality can be upgraded more (block 2140), it is performed and an adequacy metric for the upgraded tile is determined (block 2142). The foregoing process may be executed in an iterative loop until the heap is empty and all the tiles that can be upgraded have been upgraded (block 2144). A binary search sequence may be effectuated to on the naïve sequence to find a last valid state that obeys a given transmit buffer model (block 2146), which may be used as a starting tile state (block 2148). A new upgrade heap may be configured for containing the tile/GOP states (block 2150). A least adequate tile/GOP combination is pulled from the heap (block 2152) and validated against the transmit buffer model (block 2154). If the pulled tile/GOP cannot satisfy the buffer model, it is disqualified from future upgrades (block 2158). Otherwise, a determination is made if it can be upgraded more (block 2156). If so, an adequacy value for the upgraded tile/GOP combination that satisfies the transmit buffer model is determined (block 2160). The foregoing operations are performed iteratively until the new upgrade heap is empty, as set forth at block 2162. If so, process 2100B is completed by sending selected tiles to a tile mux and stream generation process, as set forth at block 2164.

Example annealing processes set forth herein advantageously facilitate gradual refreshing of frames when a viewport or bandwidth is changed, thereby allowing for the ability to minimize latency in increasing quality based on a user's field of vision and at the same time not overload the bandwidth. Typically, when attempting to perform quality changes on all tiles at the same time, several issues may be encountered due to the result of changing P-tiles for I-tiles at the same time, which are expensive in terms of encoded bitrate. On the other hand, performing this substitution with a minimal client buffer can cause too much delay in delivering the I-slices/frames.

In an example embodiment that employs gradual refreshing, the video streams do not have I-frames (except for the initial I-frame or any other special frames like Instant Decode Refresh or IDR frames). Instead, a video stream has I-blocks or I-tiles that may be distributed throughout a time sequence so that any particular spot on the screen gets an I-block at regular intervals, e.g., by way of phase-encoded streams as described in detail in the earlier sections of the present patent application. Thus, in such a scenario, there is no frame where all the pixels are refreshed by I-blocks. By performing gradual refresh annealing, example embodiments of the present invention can be advantageously configured to level out frame sizes (i.e., in terms of the amount of coded image data) and reduce the bandwidth consequences of injecting an I-frame to upgrade the quality of tiles that enter the FoV or viewport. Whereas a PE scheme may allow selective early refreshes of a tile in a time/frame sequence, it may impose certain bandwidth cost (e.g., due to having multiple I-tiles in a frame, which can cause an increase in the required bandwidth for that time interval corresponding to the transport of that video frame). However, an example embodiment involving PE can be configured such that the advantage of having a steadier level of bytes/frame overweighs such costs.

Over time in a frame sequence, a PE-based embodiment may allow manipulation of the phases of the various tiles around until the I-tiles are roughly evenly distributed in time again. Such a capability can be configured to be user- and/or content-dependent with respect to when this redistribution occurs as it requires the user to keep their field of view steady long enough for it to occur. In order to choose tiles to fill the bandwidth, an example embodiment may involve modeling the byte sizes of frames stretching 3 GOPs into the future (this choice is arbitrary) and performing hypothetical early refreshes (HER) based on the buffer model (e.g., with 3 GOPs in a look-ahead scenario). Based on the embodiments set forth in FIGS. 21A and 21B, it can be seen that such a process starts by picking the minimum-quality stream for all the tiles and then considers each GOP of tiles, both for the current frame and future frames, and evaluates whether upgrading that GOP will violate any bandwidth constraints (which are a combination of individual frame sizes and buffer considerations). If considering upgrading a current (as opposed to future) tile-GOP combination above the quality of an already-delivered I-frame, an embodiment of the present invention may temporally realign this tile to start with an I-frame (which may affect the rest of the frames in a splicing window). Once the list of possible upgrades is obtained, they may be weighted according to the quality and the tile's position in the FoV (so tiles near the center of vision will be favored for upgrades). In one implementation, the foregoing upgrade step may be repeated until buffer constraints make any more upgrades impossible.

It should be appreciated that an example upgrade process may move around in time and in space depending on the look-ahead GOP modeling. In one arrangement, each tile may have a 3-4 GOP horizon, which can each be upgraded as the process is iterated, where future GOP upgrades are for potential future enhancements for early refreshes covering 3-4 GOPs in to the future.

In considering a HER-based implementation, a few potential metrics may be identified and/or employed to obtain a suitable trade-off: (i) dead air, (ii) maximum buffer level, and (iii) end buffer level, among others. In one example implementation, the maximum buffer level may be weighted as a leading criterion for HER upgrades where adequate bandwidth may be freed up to allow tile-GOP quality upgrades.

As set forth in the embodiment of FIG. 21B, once the end is reached in the upgrading iterations, a slice/frame can be muxed using a set of tiles, whereby the byte size of the muxed slice/slice may be calculated and its effect on the transmit buffer may be recorded so that the next slice/frame is accurately constrained in accordance with the given transmit buffer model. When the next time a frame is spliced (e.g., the user gaze has changed, thereby causing adjustments to be made), the knapsack annealing process may be repeated wherein one extra frame is modeled relative to the previous operation, which can validate and/or fine-tune the knapsack/annealing process.

Skilled artisans will recognize that a heap memory structure employed in the embodiment of FIG. 21B is particularly advantageous for keeping track of upgradable tiles because recalculating the score of the tile-GOP upgrades on every iteration may be avoided. As noted previously, an adequacy metric is defined for scoring tiles, which is used in choosing which tile to upgrade, wherein parameters such as variant_weight, tile_weight and penalty are provided in a suitable mathematical relationship to capture a desirable upgrade scenario. As such, the variant_weight parameter may be defined as a property of an encoded stream and higher quality stream variants (having lower QPs) have a higher variant_weight. Some example variant_weights are {1/QP}, {100−QP}, or a value defined in the manifest examples set forth above, or it could be the bitrate of the entire stream. The tile_weight may also be provided as a function of the tile's position relative to the gaze as set forth above. In general, tiles in the user's direct FoV or ROI/viewport may be accorded higher tile_weights. The example adequacy metric formulation set forth in the embodiments of FIGS. 21A/B is configured such that as the stream quality increases, the adequacy value also increases, and the tiles closer to the gaze vector have lower adequacy than tiles of the same quality farther from the gaze vector (which configures the annealing process to upgrade tiles closer to the gaze vector before upgrading tiles away from the gaze vector).

Further, example embodiments also include a penalty factor in scoring the tiles for an upgrade process as noted above. In one arrangement, a penalty may be imposed when an early refresh with an I-tile is required wherein a tile in the current GOP is to be upgraded beyond the quality it had in the previous slice/frame. Such a penalty has the effect of increasing that tile's adequacy which delays the upgrade relative to other tiles in the heap. This allows tile upgrades when the gaze has changed enough but defers early refreshes in marginal cases.

It will be apparent to one skilled in the art that additional/alternative formulations may also be used for scoring tile upgrades in some variations within the scope of the present invention.

Figure 22:
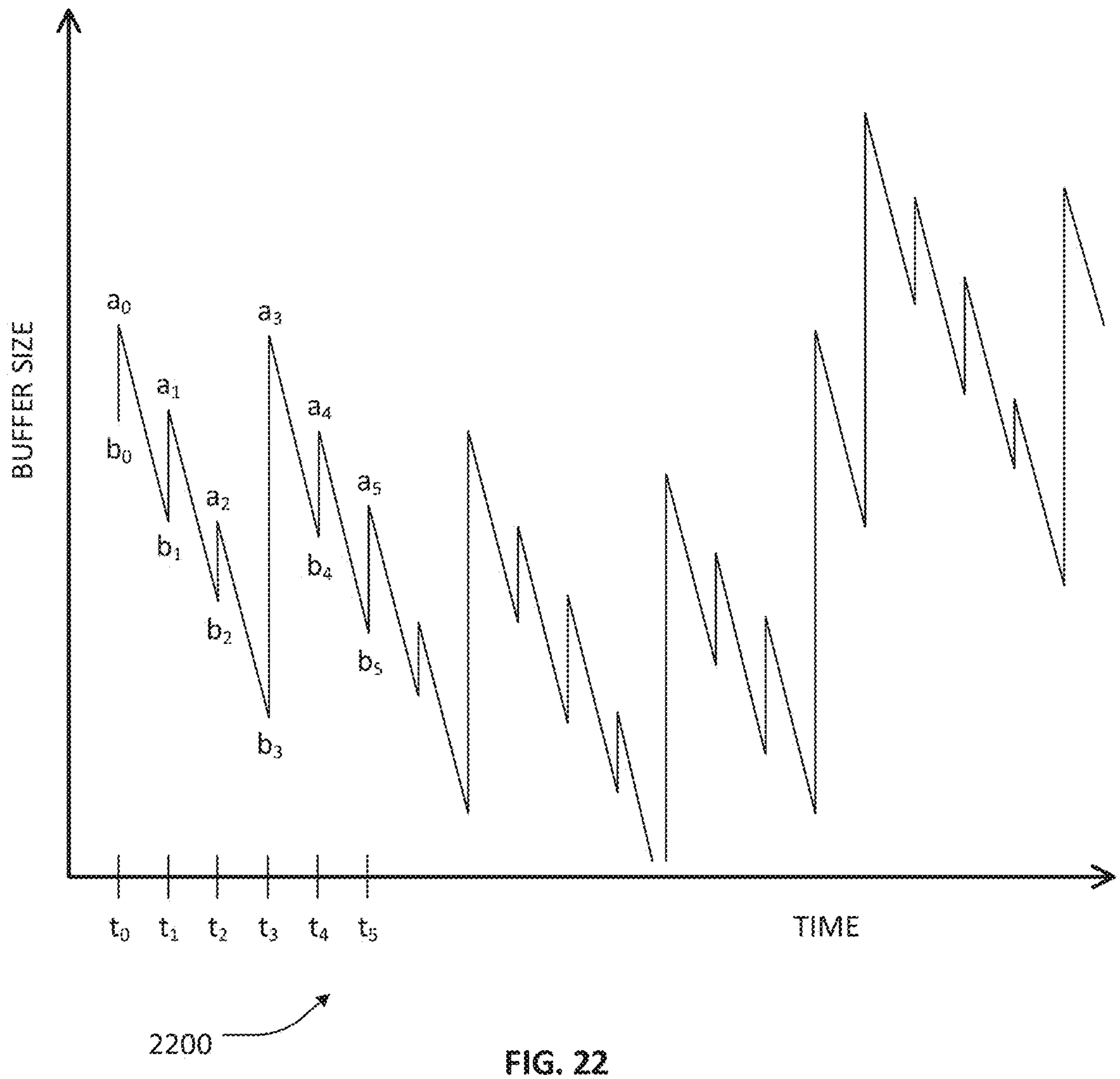
FIG. 22 is illustrative of a transmit buffer model configuration for use a tile selection and bandwidth annealing arrangement according to an example embodiment of the present invention.

FIG. 22 is illustrative of a transmit buffer model process for use in a tile selection and bandwidth annealing arrangement according to an example embodiment of the present invention. In general, a transmit buffer model may be configured to be consistent with a frame rate depending on the implementation (e.g., 30 fps, 60 fps, etc.), wherein a temporal variation of how data is added into and transmitted out of a buffer may be parameterized in order to determine whether and when there might be an overflow (i.e., a violation). In the example transmit buffer model 2200, $b_0$ is starting buffer level, $b_i$ is the size of buffer before adding an access unit or NAL unit, $n_i$ is the size of the access/NAL unit, and $a_i$ is the size of buffer after adding an access/NAL unit, where $a_i=b_i+n_i$, for $i\geq 1$. Assuming a transmit rate of r, and $\Delta t=1/\text{frame rate}$, the following relationship obtains:

$$b_{i+1}=\text{Max}\{0,a_i-r(t_{i+1}-t_i)\}$$

A buffer_size parameter may be defined as follows:

$$\text{buffer\_size}=r(\text{latency\_frames})\Delta t$$

According to the foregoing model, if $\text{Max}(a_i)>$ buffer_size, it may be indicated as a buffer overflow condition. Thus, as different $n_i$ are being added pursuant to a tile upgrade process, the buffer end point level can be checked against a calculated buffer size in order to insure that no buffer violations are engendered in the upgrade process.

Figure 23:
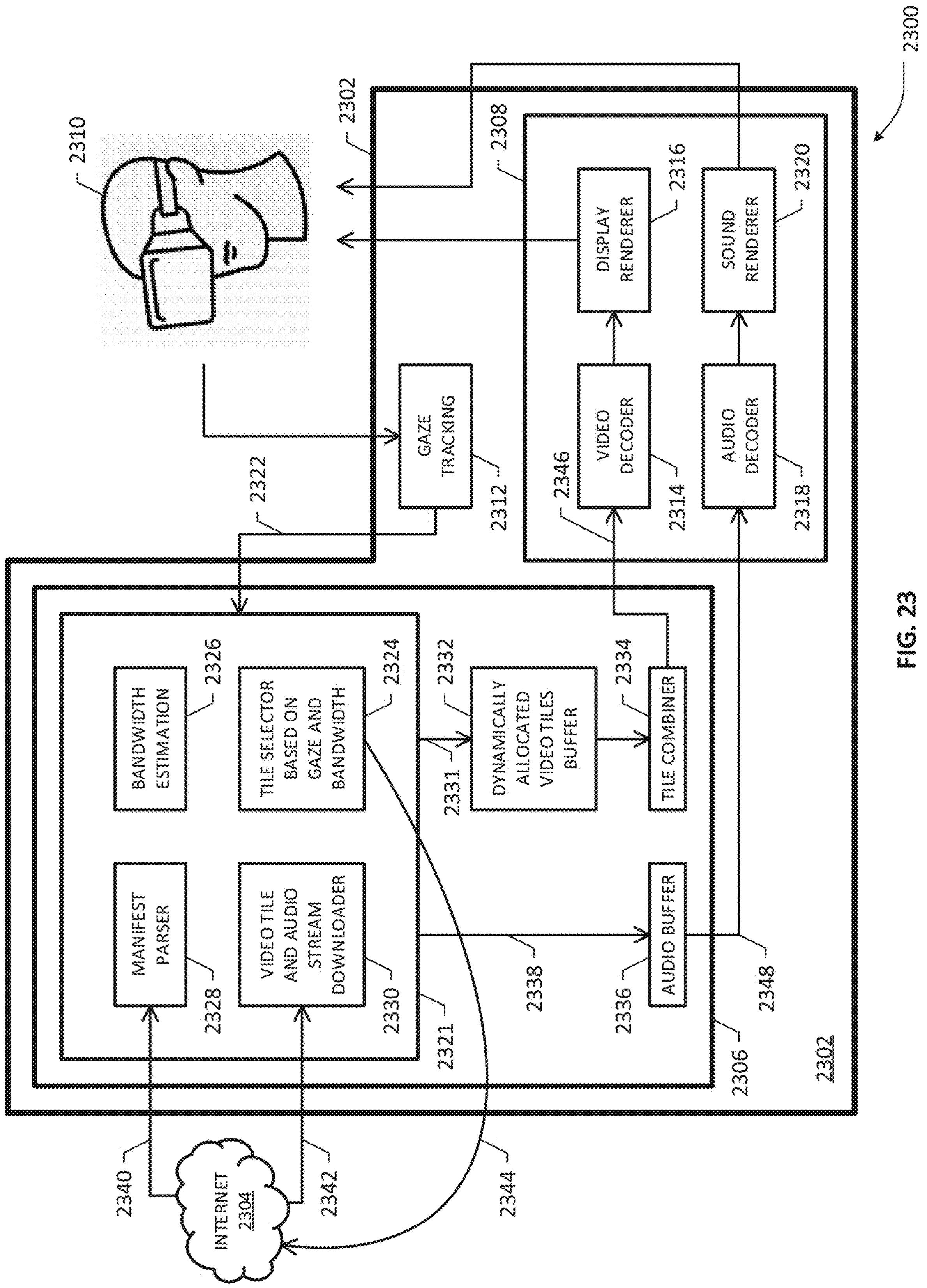
FIG. 23 depicts an arrangement where a UE device may be configured to perform certain aspects of 360° immersive video optimization for purposes of an embodiment of the present patent disclosure.

Turning to FIG. 23, depicted therein is an arrangement 2300 where a client UE device may be configured to perform certain aspects of 360° immersive video optimization for purposes of an embodiment of the present patent disclosure, which may involve ABR-based Over-the-Top (OTT) streaming. User 2310 having a suitable 360° display device is operative with a connected UE device 2302 that includes a video optimization client module 2306 and a connected player 2308 disposed to generate suitable playback signals to the display device. In one embodiment, player 2308 may comprise an HEVC or AV1 player configured with appropriate video decoder 2314, display renderer 2316, audio decoder 2318, and sound renderer 2320. Similar to an example embodiment set forth hereinabove, a gaze tracking module 2312 may be provided with the connected UE device 2302, which may be configured to consume 360° immersive video content delivered over the Internet 2304 in an ABR streaming environment.

Client optimization module 2306 preferably includes a 360° immersive video interface module 2321 comprising a manifest parser 2328, a video tile and audio stream downloader 2330, a bandwidth estimation module 2326 and a tile selection module 2324, which may be configured to operate in a manner similar to the embodiments set forth hereinabove with suitable device-centric modifications, mutatis mutandis. An HEVC tile/audio request 2344 may be generated to a network location, e.g., a content provider network or a cloud-based storage, via the Internet 2304, based on a manifest 2340 with respect to a particular content. Requested video tiles and audio data may be received via path 2342. Gaze vector information provided to the immersive video interface module 2321 from the gaze tracking module 2312 (e.g., via path 2322) may be utilized along with bandwidth estimation in selecting tiles per frame, which may be provided via a video signal path 2331 to a dynamically allocated video tile buffer 2332. Likewise, corresponding audio segments may be provided to an audio buffer 2336 via an audio signal path 2338. Tiles of different qualities may be provided to a tile combiner 2334, which generates a muxed encoded video stream 2346 to the player's video decoder 2314. Encoded audio stream 2348 may be generated from the audio buffer 2336 to the audio decoder 2318. Decoded audio and video data provided to the respective renderers 2320, 2316 of the player 2308 are rendered appropriately for display/presentation in an immersive environment effectuated by the user's display device, essentially similar to the example embodiments set forth previously.

Figure 24:
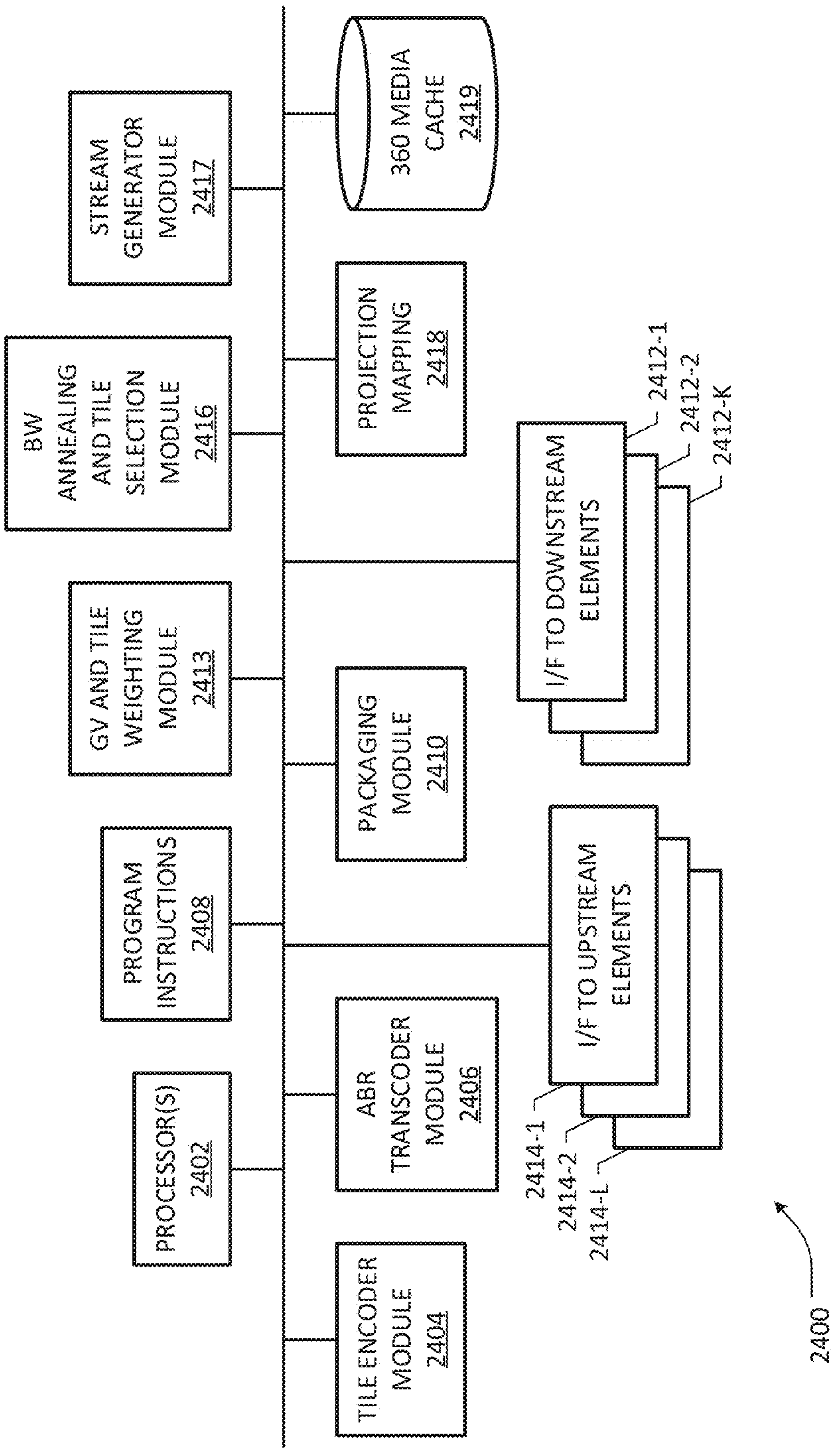
FIG. 24 depicts a block diagram of an apparatus that may be (re)configured and/or (re)arranged as a platform, node or element to effectuate one or more aspects of 360° immersive video processing, preparation and optimization according to an embodiment of the present invention.

FIG. 24 depicts a block diagram of a computer-implemented apparatus that may be (re)configured and/or (re) arranged as a platform, node or element to effectuate one or more aspects of 360° immersive video processing, preparation and tile selection optimization according to an embodiment of the present invention. Depending on implementation and/or network architecture, apparatus 2400 may be configured or otherwise integrated in different arrangements suitable for operation at one or more hierarchical levels of an example environment (e.g., as shown in FIGS. 1 and 2). One or more processors 2402 may be provided as part of a suitable computer architecture for providing overall control of the apparatus 2400, wherein processor(s) 2402 may be configured to execute various program instructions stored in appropriate memory modules or blocks, e.g., persistent memory 2408, including additional modules or blocks specific to media preparation, preprocessing, BIE/PE-based tile encoding including adaptive bitrate encoding/transcoding, optimized tile selection and bandwidth annealing, tiled media packaging, tile stitching, etc. as described in detail hereinabove. For example, such modules may include tile-based PE/BIE encoder 2404, ABR encoder/transcoder 2406, GV processing and tile weight processing module 2413, tile selection and annealing module 2416, packager and manifest generator 2410, projection mapper 2418, and the like. Also, a packaged media database 2419 may be provided in an example embodiment depending on the implementation of apparatus 2400. Accordingly, various network interfaces, e.g., I/F 2414-1 to 2414-L, operative for effectuating communications with network infrastructure elements including video back office elements, DRM entities, origin servers, client controller nodes, source media nodes, management nodes, and cache databases as well as interfaces 2412-1 to 2412-K for effectuating communications sessions with one or more downstream nodes, e.g., including delivery servers, DSLAM/CMTS elements, RAN infrastructure elements, premises gateway nodes, etc., may be provided as part of the apparatus 2400 depending on the network hierarchical level and/or integration.

Figure 25:
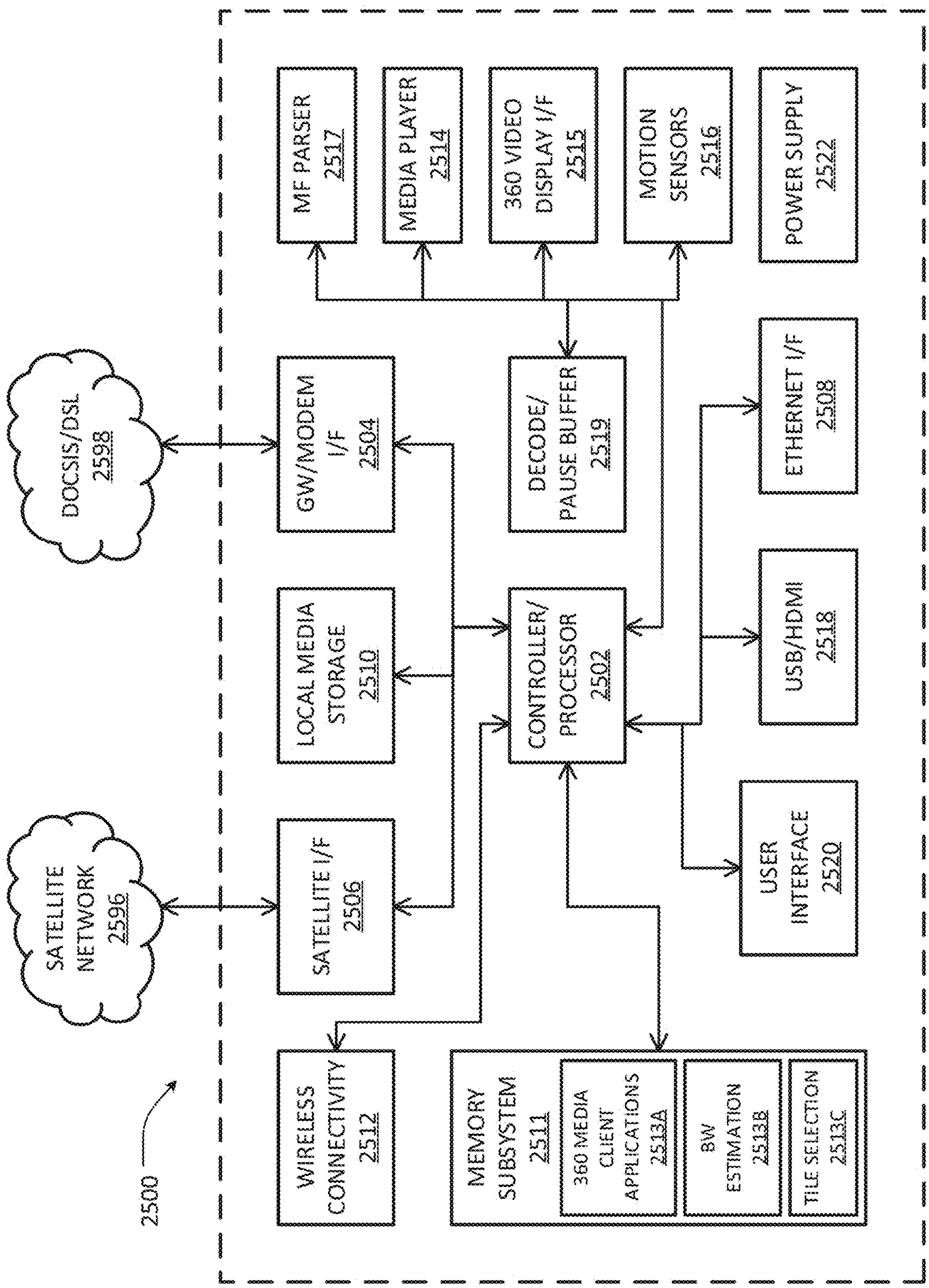
FIG. 25 depicts is a block diagram of an example UE device with additional details for purposes of an embodiment of the present patent disclosure.

FIG. 25 depicts a block diagram of an example client UE device or subscriber station 2500 configured for performing various client-side processes according to one or more embodiments of the present patent disclosure. Client device 2500 is generally representative of various viewing devices illustrated in one or more Figures described above, and may include appropriate hardware/software components and subsystems configured for performing any of the device-side processes (either individually or in any combination thereof) with respect to media request generation, gaze vector generation, tile selection and bandwidth estimation, among others, depending on implementation. One or more microcontrollers/processors 2502 are provided for the overall control of the client device 2500 and for the execution of various stored program instructions embodied in one or more persistent memory modules that may be part of a memory subsystem 2511 of the device 2500. For example, 360° immersive video client applications 2513A including VR applications may be operative with a bandwidth estimator 2513B and associated tile selector 2513C, that may be provided as part of the memory subsystem 2511. A manifest parser 2517 may be provided to facilitate the generation of media requests to appropriate locations. Controller/processor complex referred to by reference numeral 2502 may also be representative of other specialty processing modules such as graphic processors, video processors, digital signal processors (DSPs), and the like, operating in association with suitable video and audio interfaces (not specifically shown). Appropriate network interfaces such as network I/F modules 2504 and 2506 involving or operating with tuners, demodulators, descramblers, MPEG/H.264/H.265/AV1 decoders/demuxes may be included for processing and interfacing with IPTV and other content signals received via a DSL/CMTS network 2598 or a satellite network 2596. Where an STB is configured as an example client device or application, suitable demodulators may also be included. One or more media players 2514 may be provided for operating in conjunction with the other subsystems of the client device 2500, e.g., user interface 2520, video decode buffers and one or more pause buffers (collectively shown as buffers 2519), etc., which may be further configured with additional subsystems for facilitating user control over media playback, including channel change requests and any trick mode operations. For example, client/user control functions may include pausing, resuming, fast forwarding, rewinding, seeking, bookmarking, etc. with respect to a particular 360-degree immersive video asset that is being played. Example media players may be configured to operate with one or more A/V coder/decoder (codec) functionalities based on known or hereto unknown standards or specifications.

Other I/O or interfaces such as an immersive display interface 2515, touch screen or keypad interface 2520, USB/HDMI ports 2518, Ethernet I/F 2508, and short-range and wide area wireless connectivity interfaces 2512 may also be provided depending on device configuration. Various motion detection and gaze tracking sensors 2516 may also be included, some of which may comprise gyroscopes, accelerometers, position sensors, etc. A hard disk drive (HDD) or local DVR system 2510 may be included in an example implementation for local storage of various program assets. A suitable power supply block 2522 may include AC/DC power conversion to provide power for the device 2500. It should be appreciated that the actual power architecture for the device 2500 may vary by the hardware platform used, e.g., depending upon the core SoC (System-on-Chip), memory, analog front-end, analog signal chain components and interfaces used in the specific platform, and the like.

In further aspects of the present invention, embodiments are set forth below with respect to effectuating a client-based system and method for providing quality control in 360° immersive video during the pausing of a video session. In one implementation, a client device arrangement based on an embodiment of the 360-video optimized client devices 2302/2500 of FIG. 23 and FIG. 25 may be configured for pulling 360-video in an OTT/unmanaged environment as well as for controlling video quality of downloaded tiles while the 360-video session is in pause mode. According to an example device-centric approach, a tiled encoder of a content source network may be configured to generate tiles of varying qualities (e.g., high quality or HQ tiles and low quality or LQ tiles). A manifest defining the tiles, resource locations, tile bitrates, etc. may be provided to the client device, which may be configured to measure available bandwidth and select a set of HQ tiles (having corresponding bitrates) for overlay in a viewport associated with the client's display device (e.g., in a headset's FoV). Thus, whereas most of the video frame outside the viewport may comprise low quality tiles, the viewport may be optimized to contain/display high quality tiles based on the bandwidth measurement. As will be seen further below, embodiments herein are particularly directed to an arrangement where pause control functionality primarily resides in a 360-video optimized client device that may be configured to optimize tile quality while a user engages pause control, e.g., based on managing the tile population of a dynamically allocated video tile decode buffer of the client device. In further arrangements, one or more "backup" pause buffers may also be provided for managing selective HQ tile downloading in conjunction with the tile decode buffer such that video quality may be proactively improved for a relatively large number of future video frames following the paused frame.

Figure 26:
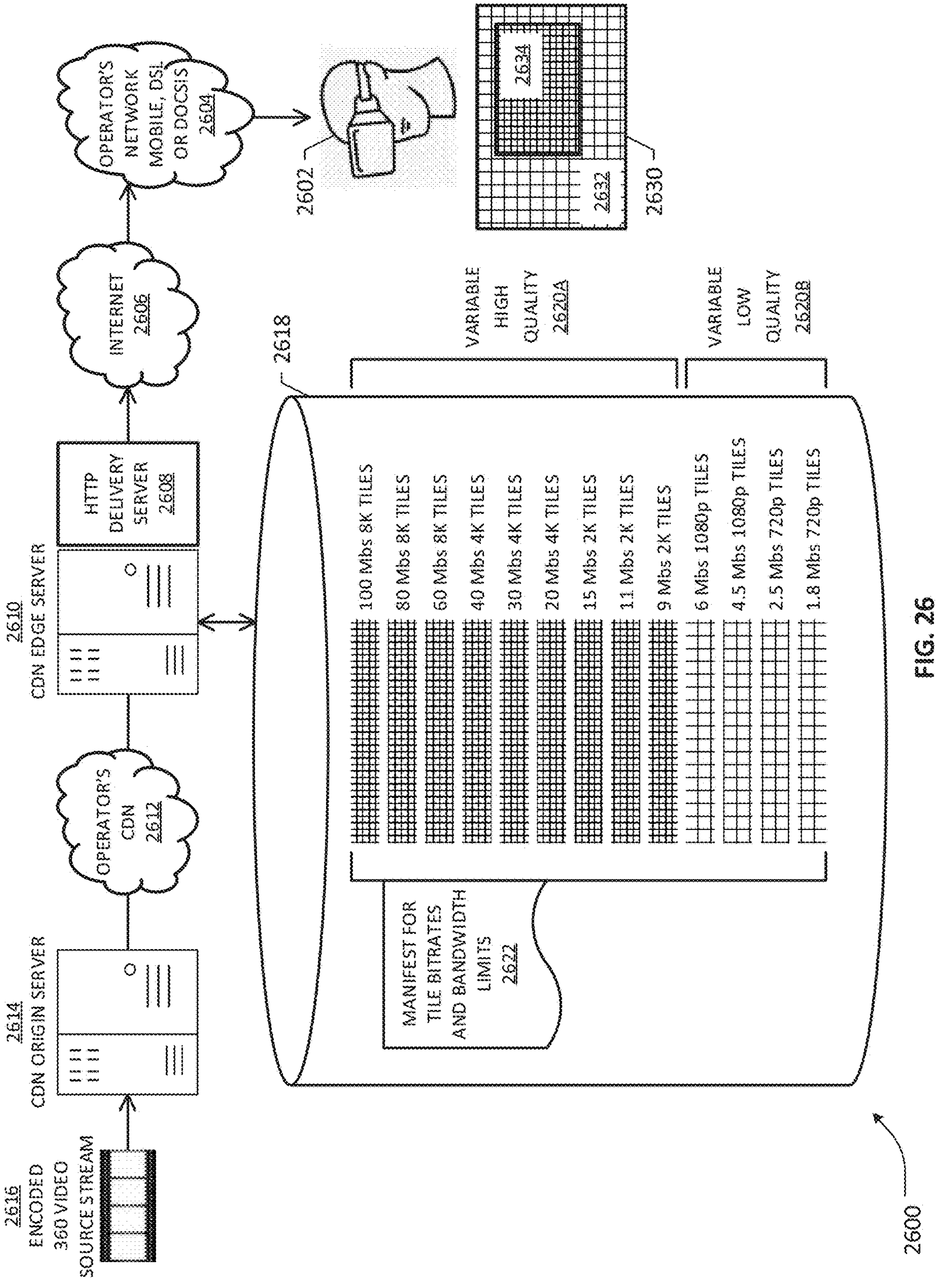
FIG. 26 depicts an example network environment wherein a client-based video quality optimization scheme may be implemented with respect to a 360° immersive video session while pausing according to an embodiment of the present invention.

FIG. 26 depicts an example network environment 2600 wherein a client-based video quality optimization scheme may be implemented with respect to an ongoing 360° immersive video session while in pausing mode according to one or more embodiments of the present invention. Similar to the embodiments set forth hereinabove, an encoded 360° immersive video stream 2616 may be provided to a CDN origin server 2614 coupled to a CDN 2612. A CDN edge server 2610 coupled to CDN 2612 may be associated with an HTTP delivery server 2608 for effectuating OTT video streaming via the Internet 2606 and applicable access network portion(s) 2604 with respect to one or more 360° immersive video users, exemplified by user 2602 operating a suitable client device. A video storage database 2618 associated with the edge server 2610 is operative to store tiled video content assets, each of which may be provided as a set of tiled streams encoded at different bitrates, which may be grouped into a high quality representation set 2620A and a low quality representation set 2620B. Similar to ABR video delivery implementations, a manifest defining the tiles, locations, bitrates and other relevant metadata information may be provided for each content asset, as exemplified by manifest 2622. Depending on the network/bandwidth conditions, low quality tiles are retrieved from the CDN edge for areas outside the FoV or viewport of the user's display device (i.e., out-of-view regions), whereas high quality tiles are retrieved for the in-view area of a video frame. Accordingly, based on bandwidth conditions, the user's client device may be configured to vary the HQ and/or LQ tile selections in combination with where the user's viewport is with respect to a video frame, preferably such that the client device's video tile buffer is not starved/depleted during a streaming session. By way of illustration, an in-device frame 2630 is exemplified by a viewport-optimized HQ tile collection portion 2634 surrounded by an out-of-view region 2632 having a plurality of LQ tiles.

Skilled artisans will recognize that in one example arrangement, "LQ" tiles may be selected/retrieved from any of the bitrate representations categorized into LQ group 2620B based on the manifest information and/or bandwidth conditions. Likewise, "HQ" tiles may also be selected/retrieved from the bitrate representations categorized into HQ group 2620A based on the manifest information and/or bandwidth conditions.

Figure 28A:
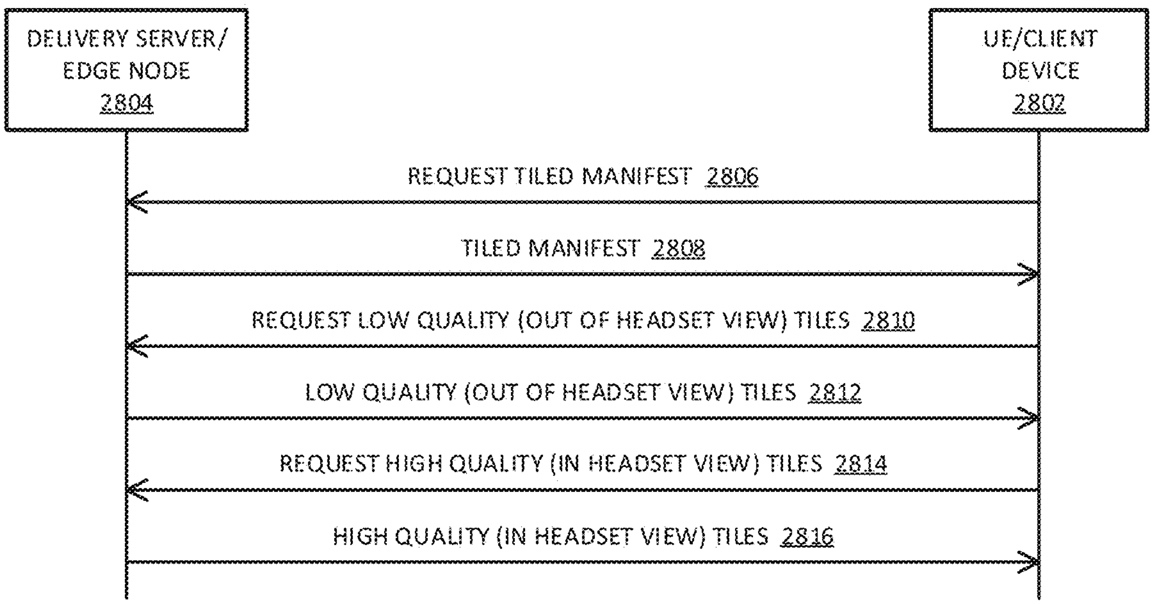
FIGS. 28A and 28B depict message flow diagrams relative to message flows between a 360° video delivery server and the example UE/client device for startup/play of a video session and during a pause mode of the video session.
Figure 28B:
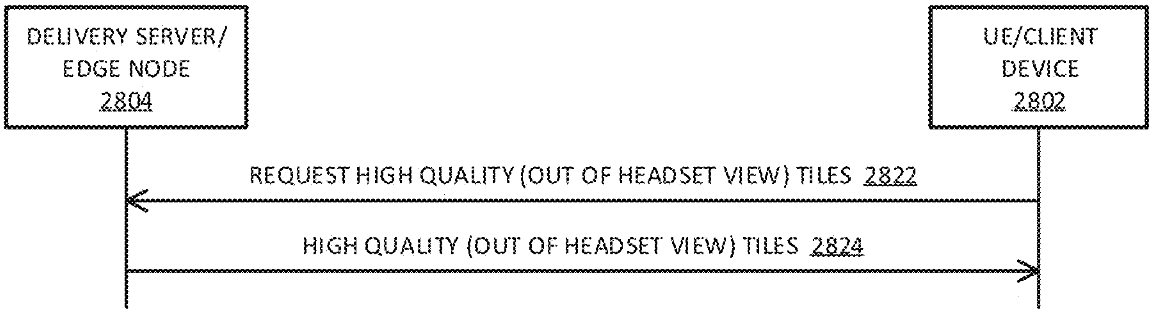

FIGS. 28A and 28B depict message flow diagrams relative to message flows between a network node or 360° video delivery server 2804 and UE/client device 2802 for startup/play of a video session and during a pause mode of the video session in an example OTT network environment such as the environment 2600 set forth above according to an embodiment. In particular, message flow diagram 2800A illustrates messages relative to session startup and play. Message 2806 relates to a request by UE device 2802 for obtaining a tiled manifest (i.e., a manifest defining media content tiles) with respect to a 360° video asset. A response message from node/server 2804 is representative of a tiled manifest provided to UE device 2802. Based on the manifest information, a request 2810 is provided to the network/server for retrieving LQ tiles, which may be downloaded via a media delivery path 2812. Likewise, a request 2814 for HQ tiles is provided by UE device 2802, responsive to which suitable HQ tiles 2816 are downloaded by UE device 2802 via a media delivery path.

In accordance with the teachings of the present disclosure, when a pause request is generated from UE device 2802, an example embodiment may be configured such that HQ tiles having the same or better quality as used for the in-view tiles are pulled from the node/delivery server 2804 for the out-of-view region of the paused frame also, thereby advantageously resulting in a uniform HQ viewing across the paused video frame (i.e., regardless of where the user's viewport is directed). Accordingly, upon selecting a pause control function (e.g., by activating a suitable user control button, key, etc. of the user's device player), an embodiment may involve generating a request 2822 for HQ tiles for the out-of-view regions of the paused frame (based on the available bandwidth determination by the UE device), as illustrated in message flow diagram 2800B shown in FIG. 28B. Responsive thereto, appropriate HQ tiles 2824 are provided to UE device 2802, which may be muxed with the in-view HQ tiles for decode and display as described elsewhere in the present patent application. In still further variations, the device tile buffer may be managed dynamically and intelligently during the pause phase, either independently or in combination with a separate tile storage system (referred to herein as a "pause buffer") such that additional advantages may be realized as will be set forth below.

Figure 27:
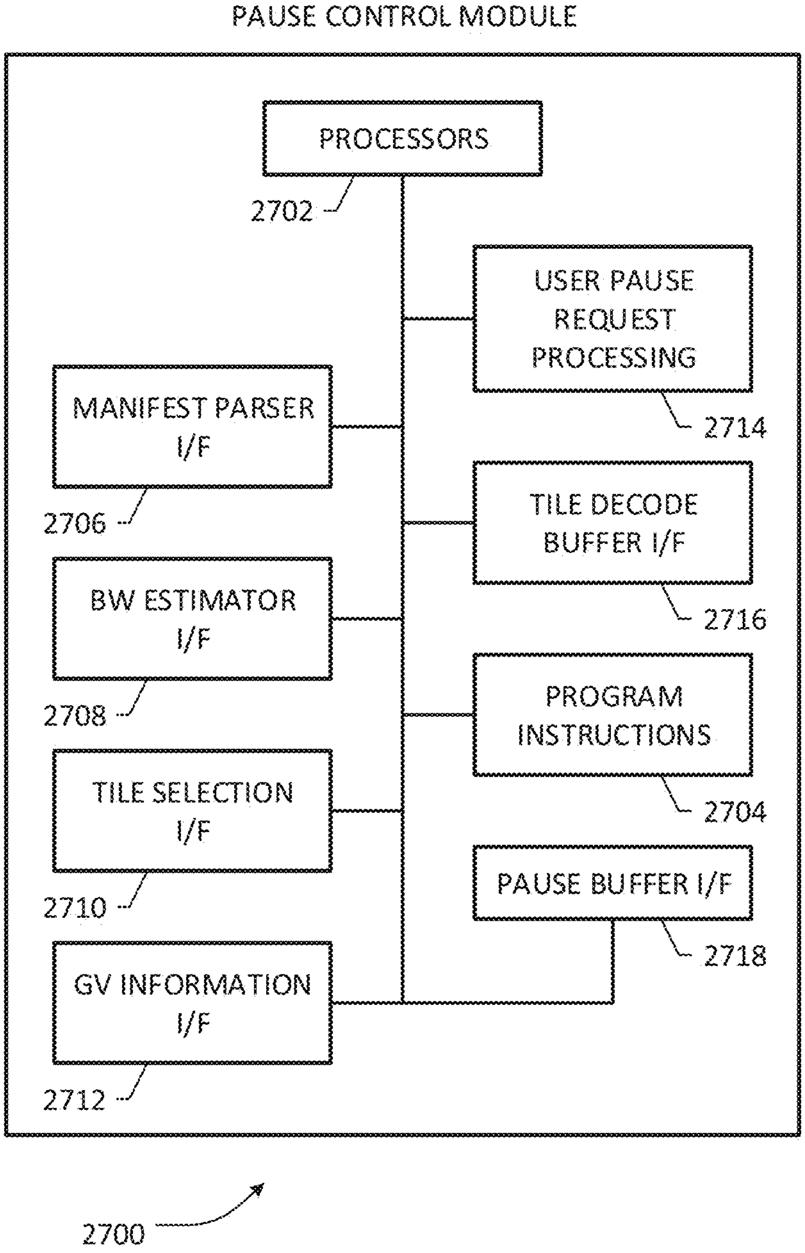
FIG. 27 depicts an example pause control module or subsystem according to an embodiment of the present invention, which may be associated with a UE or client device configured to operate in the network environment shown in FIG. 26.

FIG. 27 depicts an example embodiment of an apparatus configured as a pause module or component 2700 that may be provided as part of a 360° immersive video UE client device, adapted to effectuate video quality optimization while a 360° immersive video session is paused according to an embodiment of the present invention. In one arrangement, pause module 2700 may be integrated or otherwise associated with a client video optimization module such as module 2306, and may be interfaced with a player (e.g., player 2308) and GV/motion tracking module (e.g., gaze/motion tracking module 2312) of a connected client device and/or unconnected VR device, e.g., UE device 2302 described hereinabove in reference to FIG. 23. In such an arrangement, pause module 2700 may include one or more interfaces to modules, blocks and/or components such as manifest parsers, player controls, bandwidth estimation, tile selection, GV/motion tracking, dynamically allocated video tile buffer(s), pause buffer(s), etc., as exemplified I/Fs 2706, 2708, 2710, 2712, 2714, 2716, 2718. At least part of the pause module functions may be effectuated by way of executing program instructions 2704 operative with one or more dedicated processing units or shared with the UE device, as exemplified by processor(s) 2702. Thus, an embodiment of the pause module 2700 may be also provided as part of a UE device such as device 2500 described hereinabove. Accordingly, at least portions of the detailed description relating to FIG. 23 and/or FIG. 25 are applicable for providing an OTT device environment, mutatis mutandis, within which the pause control module 2700 may be implemented in an example embodiment of the present invention.

Taking the arrangements of UE device 2302 and pause module 2700 together, overall functionality of a combination arrangement may be set forth as follows. As noted previously, the tile optimization module is configured to parse a custom 360-degree video manifest for tile selection based on bandwidth and user's gaze/motion vector data, translate the gaze vector information into an area to map a HQ/LQ tile download, and depending on the estimated bandwidth, pull appropriate HQ tiles that will fit into the estimated bandwidth while avoiding buffering situations. The tiles may be stored in a tile buffer, which are read by a tile combiner to generate the complete frames from a set of LQ and HQ tiles for each frame. In one arrangement, the audio tracks may be handled separately, e.g., similar to processing separate ABR audio adaptation sets. A player multiplexer may be configured to combine the video and audio information for facilitating playback by the UE/VR device.

The pause module 2700 may be configured to control buffering and tile/segment retrieval when pause control is activated by the user. In another embodiment, a pause control signal may be generated pursuant to network operator control. Responsive to receiving a pause request, the pause module 2700 is operative to determine the highest quality of tiles of the frame currently viewed (i.e., the frame to be paused), which correspond to the tiles retrieved for the viewport defined by the user's GV information. Responsive to a control signal from the pause module 2700, the video tile buffer may be flushed of the already downloaded LQ tiles for the out-of-view area. Further, HQ tiles corresponding to that area are retrieved from the network with a quality level at least equal to the quality of already downloaded and buffered HQ tiles for the in-view area. A replacement frame comprising all HQ tiles (i.e., regardless of the viewport) that corresponds to the paused frame is then provided to the player for decoding and display. In one arrangement, depending on how video tile buffer and/or a backup pause buffering system are implemented, the video tile buffer may be allowed to grow dynamically with all HQ tiles for subsequent frames. On resuming playback, the video tile buffer may be drained of the HQ tiles and may eventually be filled with both HQ and LQ tiles (i.e., mixed quality tiles) based on the GV information and bandwidth determination.

Figure 29A:
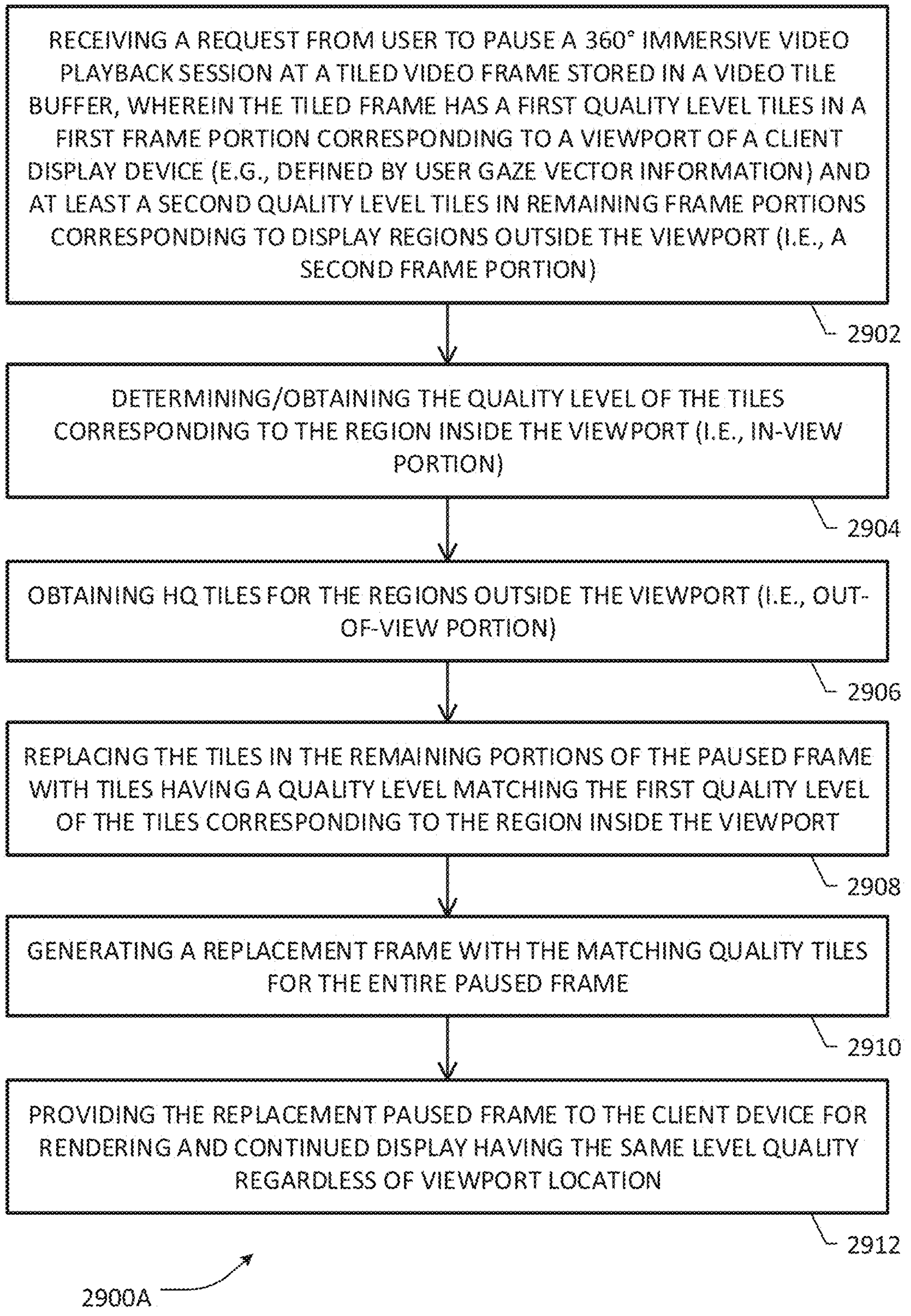
FIGS. 29A and 29B depict flowcharts illustrative of various blocks, steps and/or acts that may be (re)combined according to one or more embodiments of the present invention relative to a client-based video quality optimization scheme while a 360° immersive video session is in pause mode.
Figure 29B:
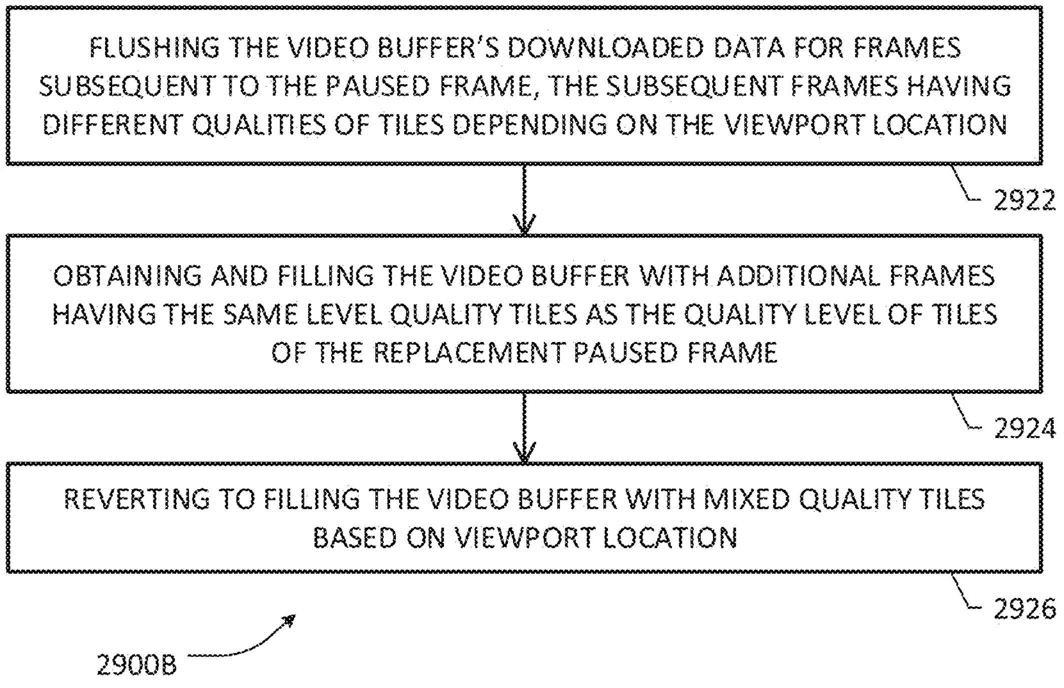

FIGS. 29A and 29B depict flowcharts illustrative of various blocks, steps and/or acts that may be (re)combined according to one or more embodiments of the present invention relative to a client-based video quality optimization scheme while a 360° immersive video session is in pause mode. Process 2900A of FIG. 29A may be effectuated responsive to receiving a request from user to pause a 360-degree immersive video playback session as set forth at block 2902. The pause request may be generated when a particular video frame is being displayed, whose tile data stored in a video buffer comprises a first quality level tiles in a first frame portion corresponding to a viewport of a client display device (e.g., defined by user gaze vector information) and at least a second quality level tiles in remaining frame portions corresponding to display regions outside the viewport (e.g., a second frame portion). As noted previously, the first quality tiles may comprise HQ (or, high resolution) tiles and the second quality tiles may comprise LQ (or, low resolution) tiles. At block 2904, the quality level of the tiles corresponding to the region inside the viewport may be determined and/or otherwise obtained. At block 2906, HQ tiles corresponding to the second frame portion (e.g., out-of-view region) may be retrieved from a video delivery server. At block 2908, tiles in the out-of-view portions of the paused frame are replaced with tiles having a quality level matching the first quality level of the tiles (i.e., HQ tiles) corresponding to the region inside the viewport. At block 2910, a replacement frame with the matching quality tiles for the entire paused frame may be generated based on stitching the tiles for both in-view and out-of-view regions. The complete HQ replacement frame is then provided instead of the paused frame to the client player device for rendering and continued display having same level quality regardless of viewport location (block 2912).

Process 2900B of FIG. 29B sets forth some of the additional aspects relating to pause control and quality optimization. At block 2922, the video tile buffer's already downloaded data for frames subsequent to the paused frame (with the subsequent frames having different qualities of tiles depending on latest viewport information available) may be flushed. As noted previously, the video tile buffer may be allowed to (re)grow by filling all HQ tiles for the subsequent frames that are retrieved during the pause (block 2924). Upon resumption of the video session, the HQ subsequent frames may be played back, thereby providing a better video experience over an extended period of time. As the HQ video continues to get played out, the tile buffer may drain to a low state (e.g., near starvation), whereupon mixed quality tiles may be retrieved and filled (block 2926). Skilled artisans will recognize that depending on how the video tile buffer is implemented and managed, and whether a backup pause buffer is provided, a number of variations may be realized with respect to how long an HQ playback experience may be extended after resumption from pause mode.

For example, in one variant of pause buffering, an embodiment of the pause module 2700 may be configured to buffer the largest possible portion of the video at a specified quality Q during pause time. Since the tile decoder buffer may not be large enough, the overflow can be buffered in a separate pause buffer system as noted previously (e.g., one or more pause buffers, each "cascading" into a next buffer depending on the overflow). If the pause time is large enough, the pause module 2700 may be configured to buffer a significant portion of the video, e.g., a plurality of GOPs, or even the entire video asset. When the video is resumed, the client device player may be configured to first play the video frames downloaded in the pause buffer(s) until the buffer is almost exhausted (e.g., depending on a (pre) configured floor or threshold value). Thereafter, as the buffer threshold is approached, the player may be controlled to switch to the regular tile decode buffer for playout, with the device commencing tiled streaming based on ABR-awareness and GV-dependent viewport information. In a related variation, the pause module 2700 may be configured to monitor the bandwidth and available bitrates, and determine that during the pause time the bitrate has increased and perform appropriate actions accordingly with respect to the already downloaded tiles during pause. For instance, the pause buffer may be flushed and a new download/refill process may be commenced to obtain even higher quality tiles. Alternatively or additionally, the system may be configured to maintain the pause buffer of quality Q (in case the bitrate/bandwidth may be reduced later at some point in the future to quality Q) and start buffering the video in a higher quality in a new pause buffer. Skilled artisans will recognize that such a "tiered" buffering system enables downloading of a minimum HQ tiles, which quality may be increased as the conditions may permit, resulting in being able to serve the video at quality which equals or much improved (but not worse) compared to the scenario where there is no buffering while video is paused.

In a still further variant of pause buffering, an embodiment of the pause module 2700 may be configured such that appropriate control signaling may be generated to buffer only a small number of subsequent frames at quality Q until the tile decode buffer is full. To achieve a balance between quality improvement and low latency, the number of frames can be configured either dynamically or in a fixed manner. In a still further variation, a preconfigured number of GOPs may be downloaded for pause buffering. Additional details relative to these and other variations will be set forth further below.

Figure 30A:
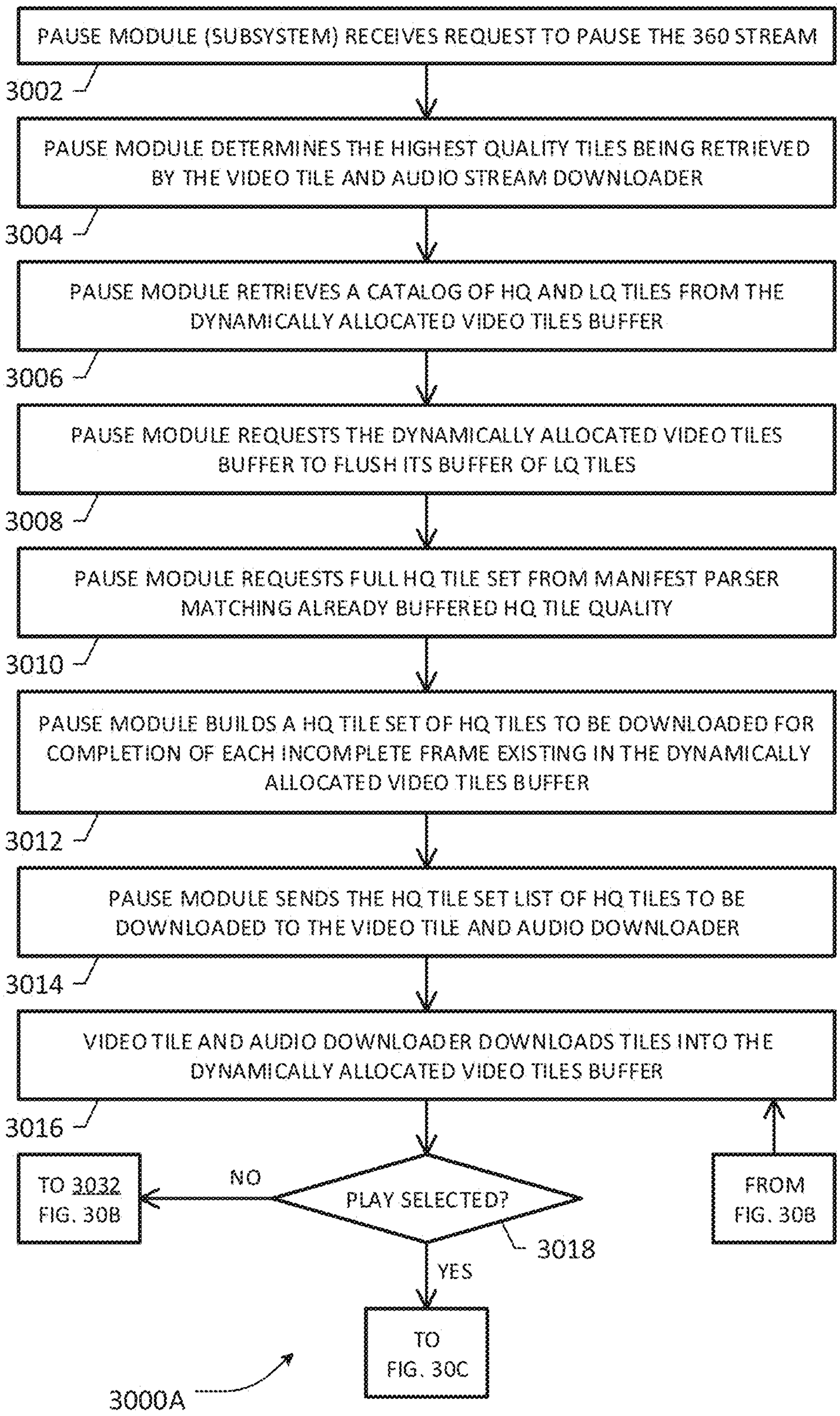
FIGS. 30A-30C depict flowcharts illustrative of further blocks, steps and/or acts that may be (re)combined according to one or more embodiments of the present invention relative to a client-based video quality optimization scheme while a 360° immersive video session is in pause mode.
Figure 30B:
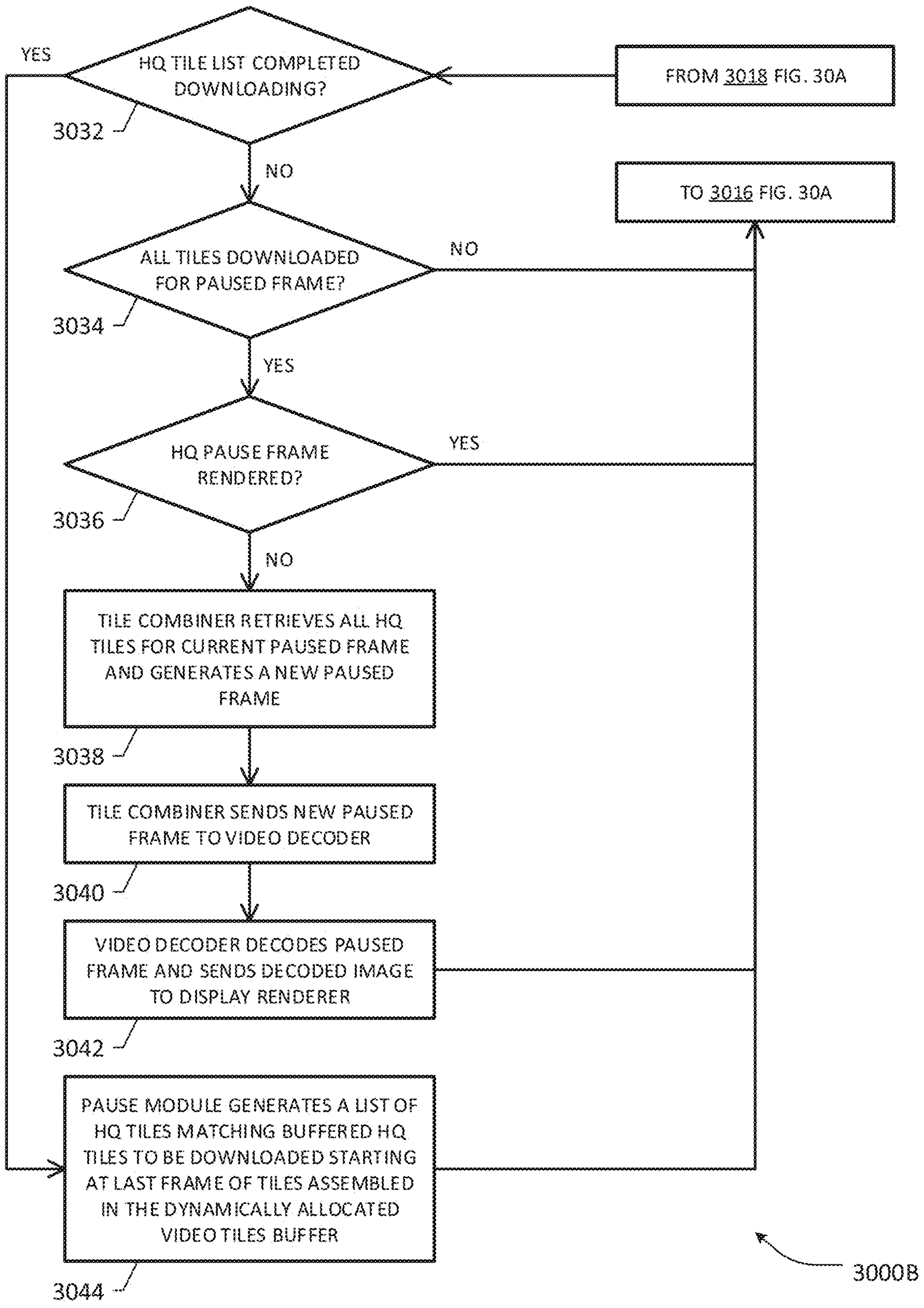
Figure 30C:
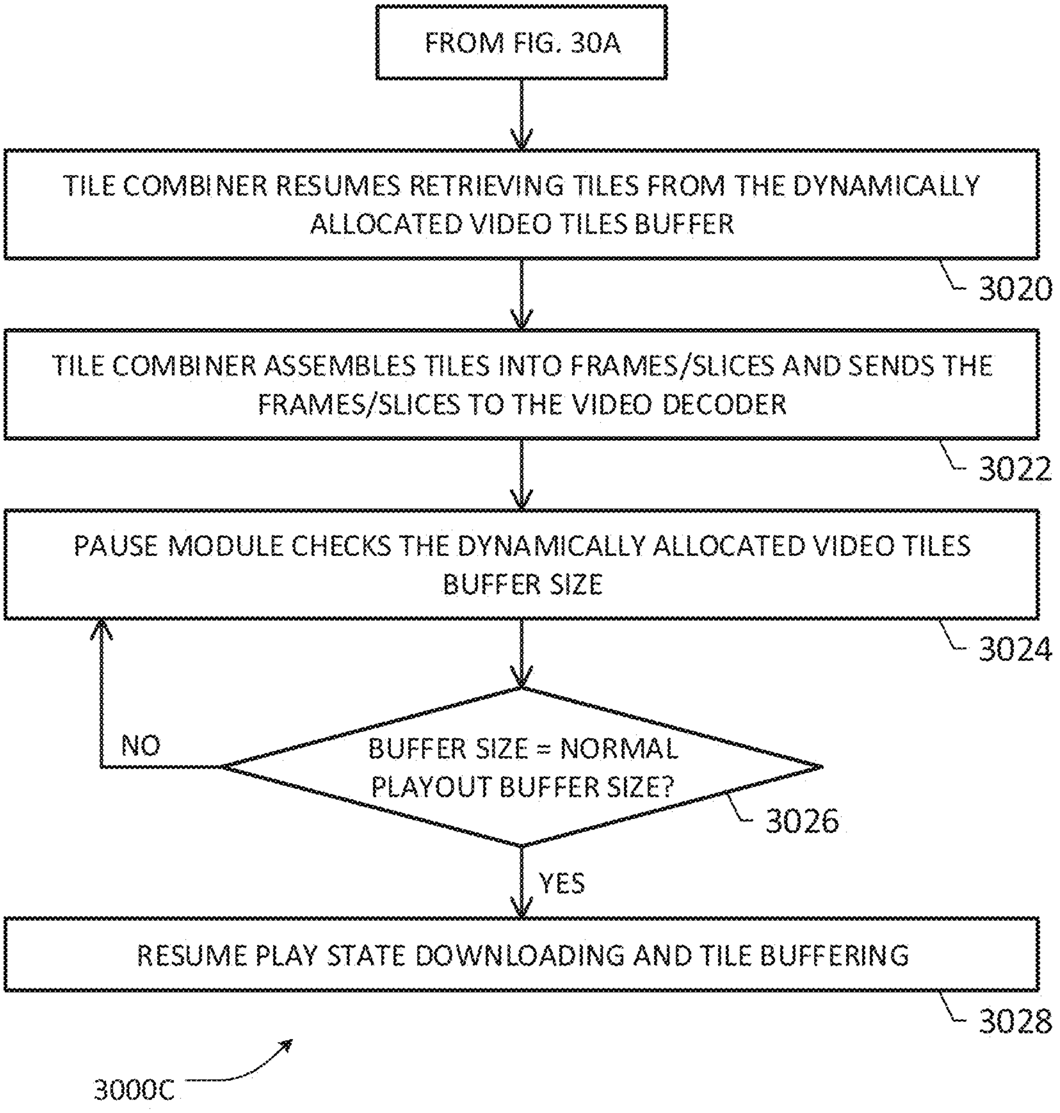

FIGS. 30A-30C depict flowcharts illustrative of blocks, steps and/or acts that may be (re)combined—with or without additional flowcharts of the present disclosure—relative to a client-based video quality optimization scheme under pause control. Process portions 3000A, 3000B and 3000C generally set forth a pause phase, a buffer refill phase and a playback resume phase, respectively, wherein process 3000A may be initiated or triggered responsive to a user selection to pause a currently playing 360-degree video session (block 3002). Responsive thereto, a pause module or subsystem determines the highest quality tiles currently being played (block 3004), e.g., tiles comprising the headset FoV. Thereafter, the pause module retrieves a catalog of currently buffered HQ and LQ tiles from a dynamically allocated video tiles buffer (block 3006). Once this catalog is retrieved, the pause module requests the buffer to flush all LQ tiles (block 3008). A request is also generated to a manifest parser to determine the corresponding HQ tiles for the missing/flushed LQ tiles, wherein the requested HQ tiles have at least the matching quality of the already buffered viewport tiles (block 3010). The pause module builds a list of HQ tiles to be downloaded and sends it to a tile downloader (e.g., stream downloader 2330 of the video optimization subsystem 2306 shown in FIG. 23) for completing the frames as set forth at blocks 3012 and 3014. Responsive thereto, appropriate HQ tiles are retrieved from the video delivery server and continue to be downloaded into the video tiles buffer (block 3016).

If resume play is selected (block 3018), process flow portion 3000C involves a tile combiner (e.g., combiner 2334 shown in FIG. 23) resuming retrieval of tiles from the dynamically allocated video tiles buffer (block 3020). Responsive thereto, full video frames/slices are generated from the tile set and transmitted a video decoder (e.g., decoder 2314 shown in FIG. 23), as set forth at block 3022. A check or verification is made with respect to the video tiles buffer to determine if it is time to begin normal headset download of tiles. If the buffer has drained to its normal playout size, normal downloading and buffering involving mixed quality tiles (e.g., based on headset/FoV optimization for HQ and LQ tiles) may be resumed while in the normal play state. These acts are illustrated at blocks 3024, 3026 and 3028 of process flow portion 3000C.

On the other hand, if the resume playout has not been initiated (block 3018), process flow portion 3000B commences by determining as to whether the HQ tile list for one or more frames has completed downloading (block 3032). If it has not, an additional check/verification is made to determine if the tiles for the paused frame have been downloaded to display the full HQ frame across the entire 360-degree panoramic space (block 3034). If the HQ tiles exist for the paused frame and the frame has not been rendered, the tile combiner retrieves the HQ tiles for the paused frame, assembles the tiles into a video slice/frame and sends the newly assembled frame as a replacement to the video decoder, as set forth at blocks 3036, 3038 and 3040. Responsive thereto, the video decoder decodes the replacement pause frame in HQ and sends it to the renderer, which results in the HQ frame being viewed in the headset. If all the HQ tiles for the paused frame have not been downloaded or the paused frame has not already been rendered, the downloading of HQ tiles may continue to fill the dynamically allocated video tiles buffer for replenishing the flushed LQ tiles, as indicated by "NO" branches taken from blocks 3034 and 3036 back to block 3016. If the HQ list has completed downloading for the currently paused frame, the pause module generates a list of all HQ tiles matching the same HQ already in the buffer for the frames following the last complete frame for future consumption upon resuming playback. As noted previously, the video tiles buffer may continue to grow with all HQ tiles until the user resumes playout. Further, similar to the loopback paths from blocks 3034 and 3036, respective flow paths may be taken from blocks 3042 and 3044 to block 3016 (in FIG. 30A) to continue retrieving all HQ tiles, depending on the bandwidth conditions as well as responsive to whether any backup/overflow pause buffers are provided.

Figure 31A:
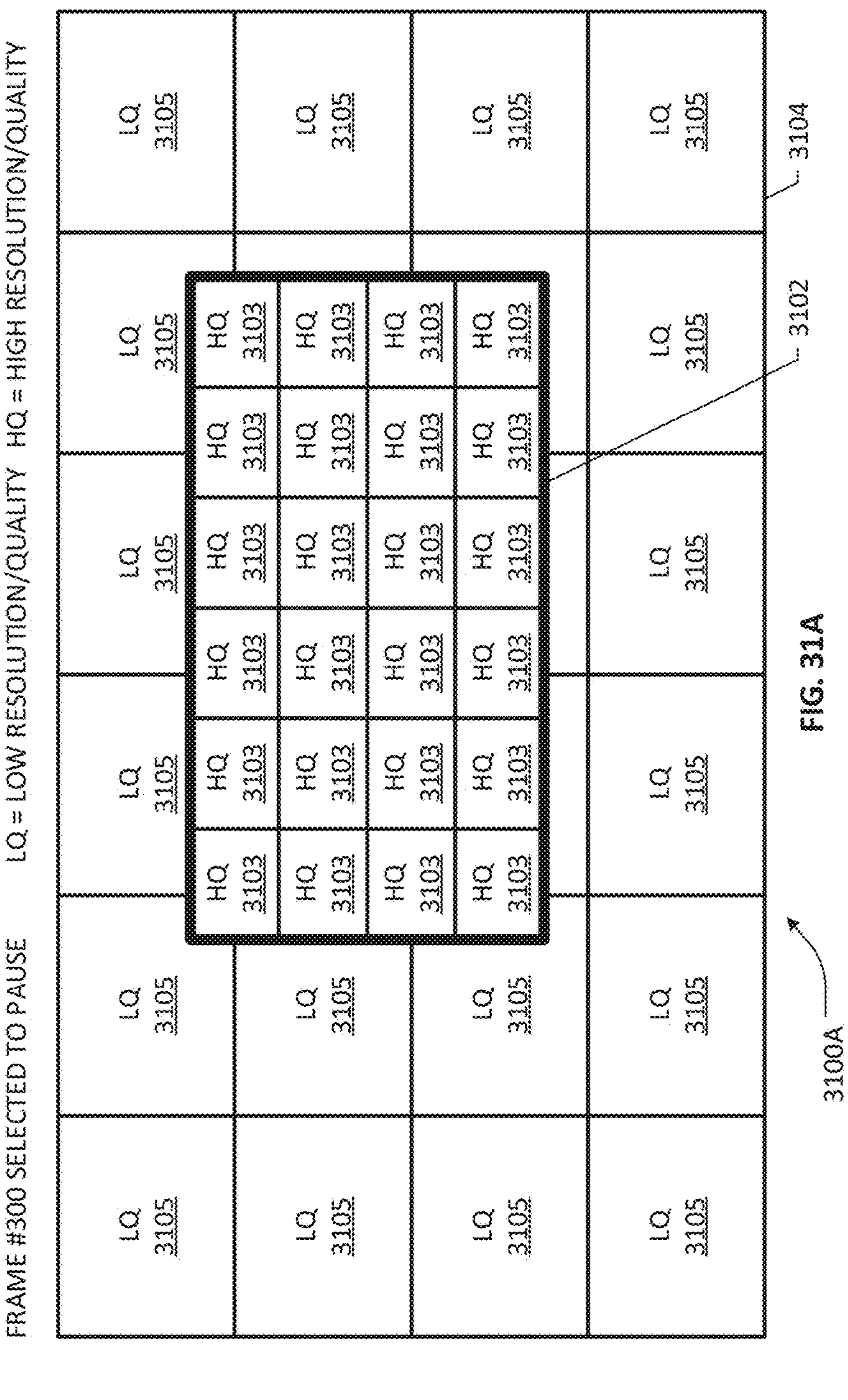
FIGS. 31A and 31B depict a paused video frame having mixed quality video tiles and status of a client video decode buffer when the video frame is paused in an example embodiment of the present invention.
Figure 31B:
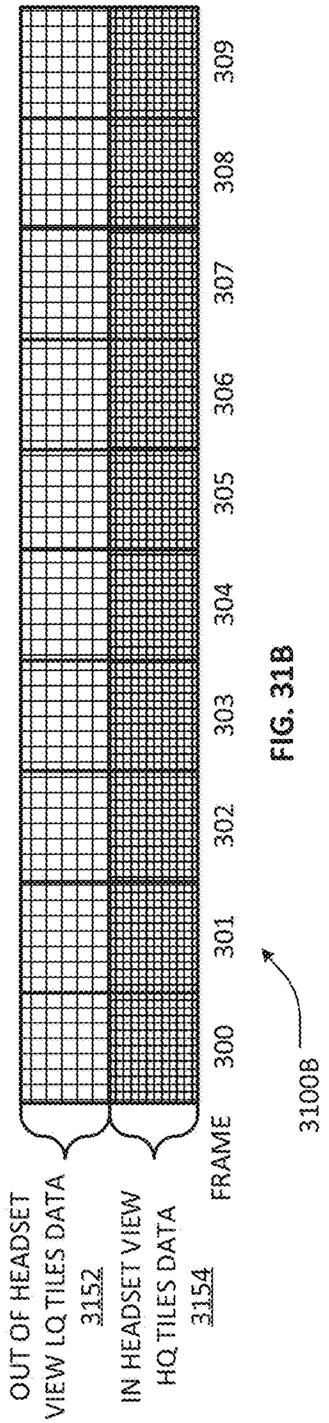

FIGS. 31A and 31B depict a paused video frame having mixed quality video tiles and status of the client device's video tile decode buffer when the video frame is paused in an example embodiment of the present invention. By way of illustration, example video tile decode buffer 3100B is shown with 10 frames, frame #300 to frame #309, each frame data comprising an out-of-view LQ/low resolution data portion 3152 and an in-view HQ/high resolution data portion 3154. In-buffer frame 300 is representative of a frame selected to be paused, whose tile layout is exemplified in tile array 3100A wherein a viewport portion or first portion 3102 comprises a plurality of HQ tiles 3103. A plurality of LQ tiles 3105 form the remaining portions (or, cumulatively, a second portion 3104) surrounding the viewport portion 3102.

Figure 32A:
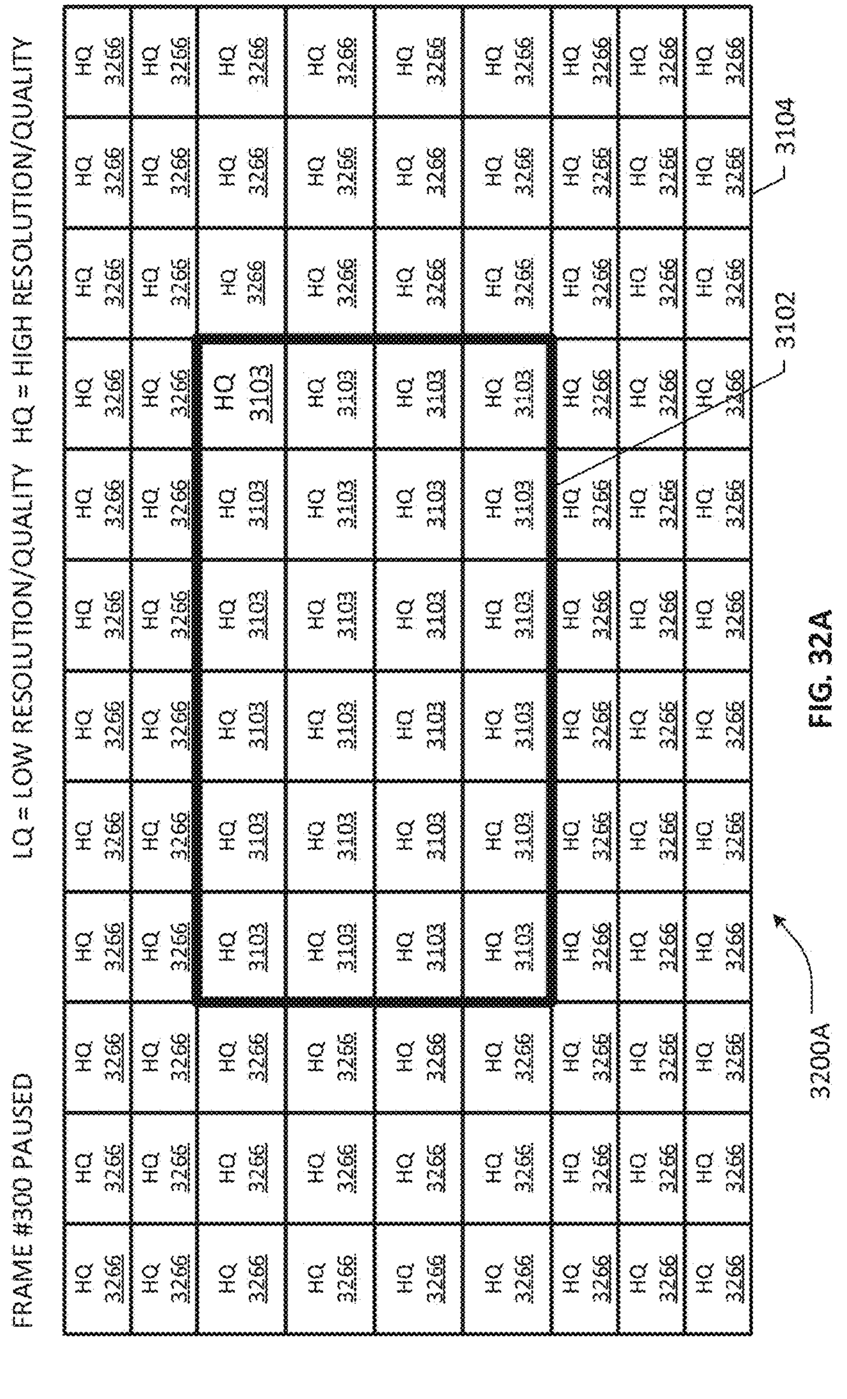
FIGS. 32A and 32B depict a replacement pause video frame configured to comprise uniform high quality video tiles throughout the tile array for full 360-degree panoramic field and buffer flush status of the client device's video decode buffer after the video frame is paused.
Figure 32B:
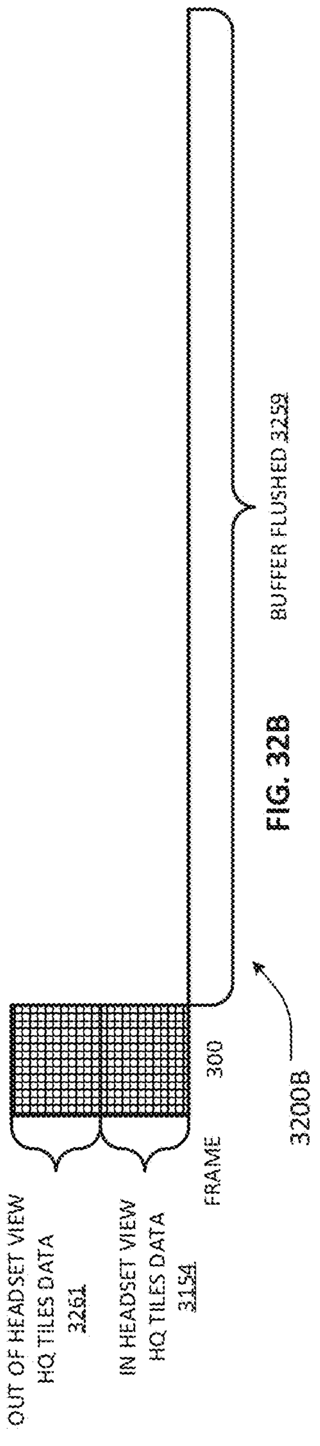

FIGS. 32A and 32B depict a replacement pause video frame configured to comprise uniform high quality video tiles throughout the tile array for full 360-degree panoramic field and buffer flush status of the client device's video decode buffer after the video frame is paused. By way of illustration, reference numeral 3200B refers to a current status of buffer 3100B, wherein tile data of frames #301 to #309 subsequent to the paused frame #300 has been flushed (exemplified by buffer flush portion 3259) and a replacement frame #300 comprising HQ tile data for both in-view and out-of-view portions (exemplified by HQ data portion 3154 and HQ data portion 3261, respectively). A tile array 3200A corresponding to the in-buffer replacement paused frame #300 is accordingly exemplified by the same in-view HQ tile portion 3102 surrounded now by a HQ out-of-view portion 3104 comprising a plurality of out-of-view HQ tiles 3266.

Figure 33A:
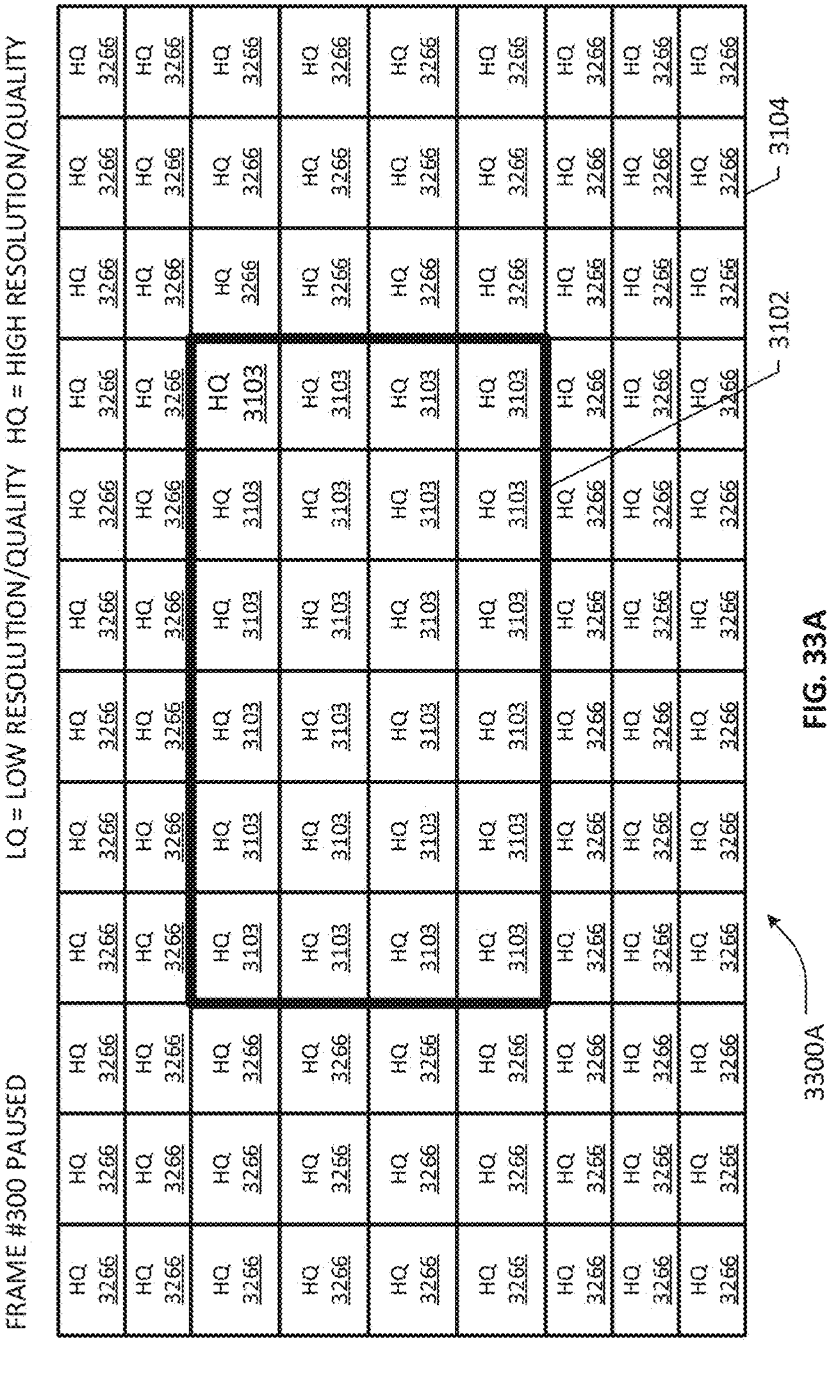
FIGS. 33A and 33B depict the replacement pause video frame and buffer fill status of the client device's video decode buffer containing high quality tile data while the video session is in pause mode.
Figure 33B:
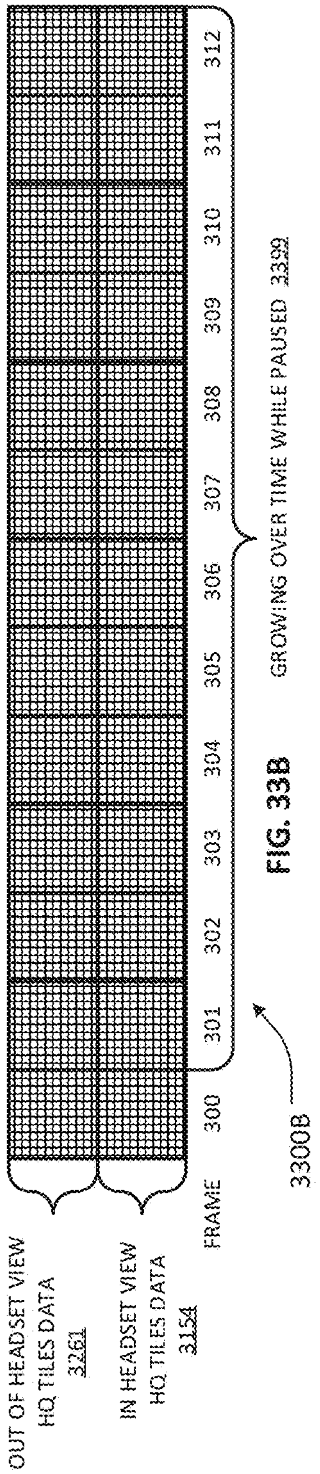

FIG. 33A depicts the replacement pause video frame 3300A (having the same tile array 3200A shown in FIG. 32A) that continues to be displayed in lieu of the original paused frame #300. Buffer fill status 3300B of the client device's video tile decode buffer is shown in FIG. 33B, which is illustrative of and responsive to HQ tile retrieval and replenishment of the buffer while the video session is in pause mode. A plurality of subsequent frames (frame #301 to frame #312), each comprising HQ tiles for both in-view and out-of-view portions, are illustrated, wherein the video tile decode buffer is allowed to grow dynamically (to include new frames #310 and #312 in addition to the replaced frames #301 to #309 previously downloaded), as exemplified by a growing buffer refill portion 3399.

Figure 34A:
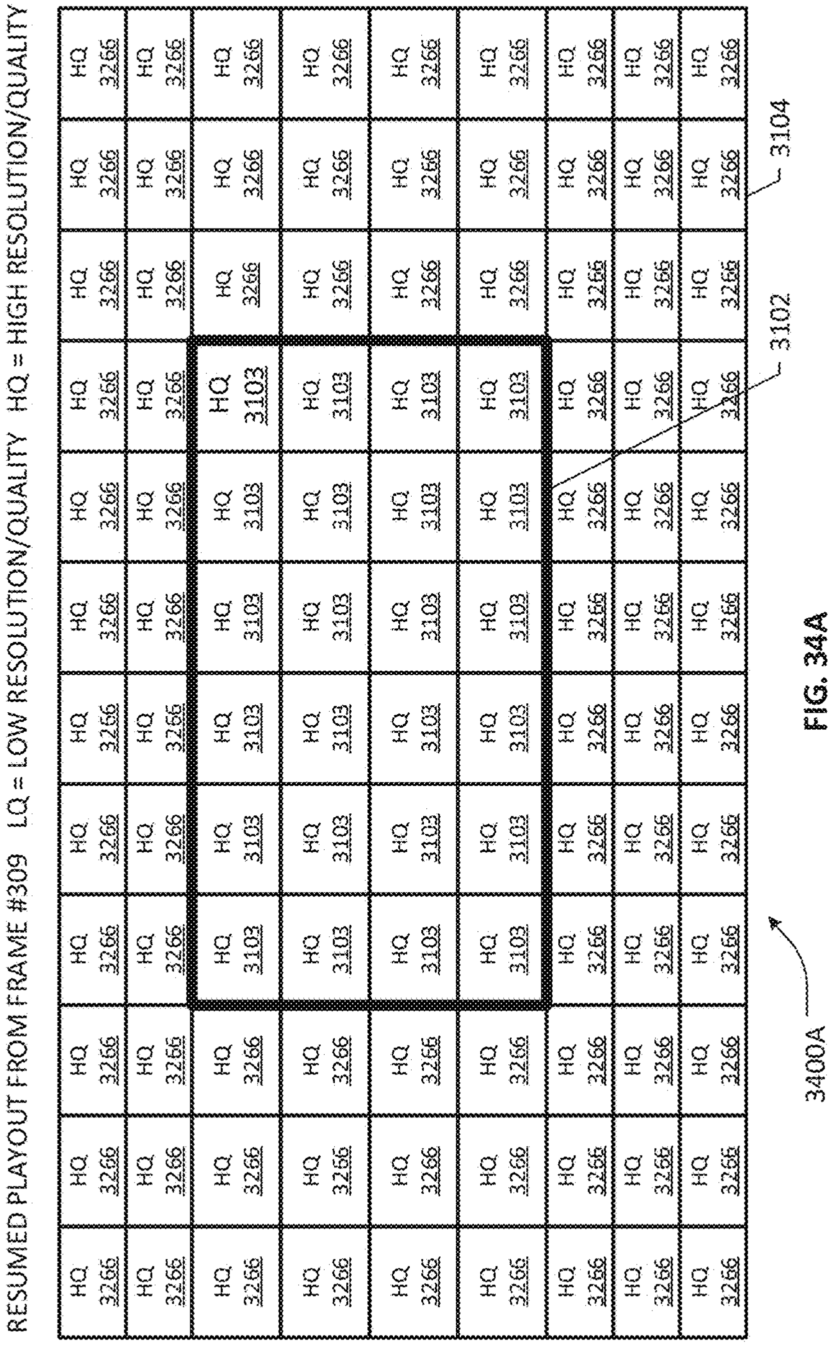
FIGS. 34A-34C depict a resumed video frame having uniform high quality video tiles, buffer fill status of the client device's video decode buffer containing both high quality and low quality tiles, and a normal post-resume frame downloaded with mixed quality tiles depending on gaze vector information after resuming the video session.
Figure 34B:
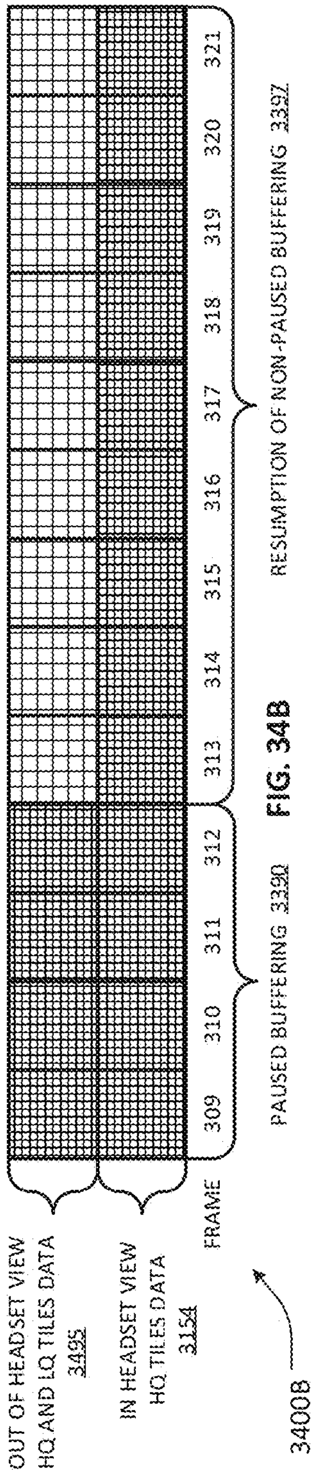
Figure 34C:
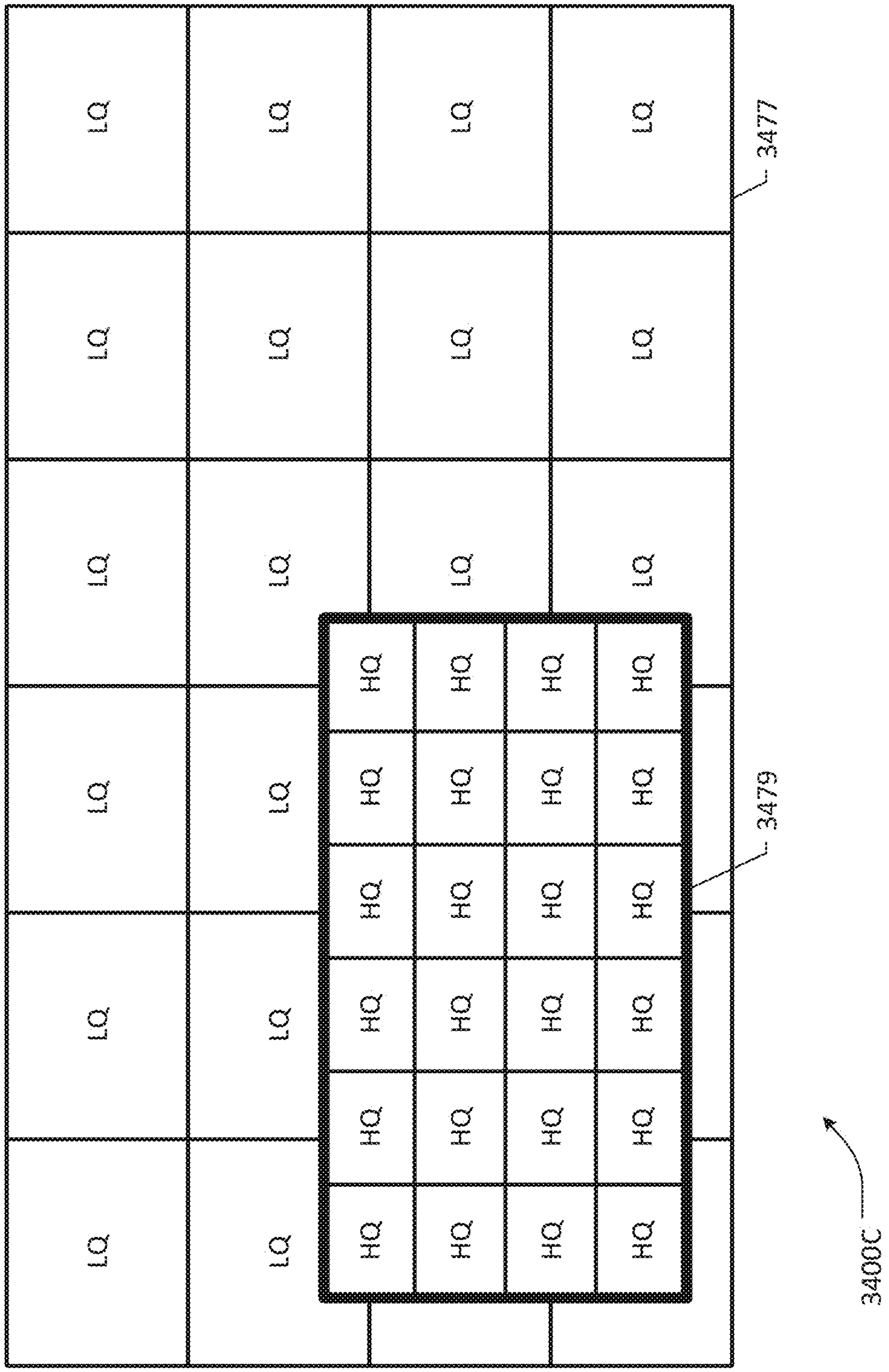

FIGS. 34A and 34B depict a resumed video frame having uniform high quality video tiles throughout the tile array for full 360-degree panoramic field and buffer fill status of the client device's video decode buffer having both HQ and LQ tiles depending on gaze vector information after resuming the video session and consumption of buffered HQ tile data. Upon resumption of the video session, the playback commences from in-buffer frame #301 (comprising all HQ tile data) until the already-buffered HQ frames (i.e., "pre-buffered" HQ frames or "pause-buffered" HQ frames) get played out. By way of example, in-buffer frame #309 comprising all HQ tile data is representative of a post-resume frame, wherein corresponding tile array 3400A is illustrated with HQ tiles throughout the array. As the video tile decode buffer filled with pause-buffered HQ tile data starts to drain, mixed quality tiles (i.e., HQ and LQ tiles) are retrieved and filled in the buffer, as exemplified by buffer fill status 3400B. By way of illustration, pause-buffered portion 3490 comprising frame #309 to frame #312 is shown with all HQ tile data portions. On the other hand, normal GV-based buffering portion 3397 comprising frame #313 to frame #321 is shown with in-view HQ tile data portions as well as out-of-view LQ tile data portions. FIG. 34C depicts a representative GV-based frame or tile array 3400C after all the pre-buffered HQ frames (i.e., frames buffered while in pause) has been played out, wherein a GV-based viewport portion 3479 comprises HQ tiles and a non-viewport portion 3477 comprises LQ tiles similar to the tile array configuration corresponding to normal 360-degree video streaming mode.

One skilled in the art will recognize that GV data obtained when the GV-based buffer refilling commences may be different than the GV data obtained at the time when the video session was paused. Until valid GV/tracking data is obtained from the client device, a default GV position may be configured for retrieving appropriate HQ and LQ tiles based on the bandwidth conditions.

Figure 35:
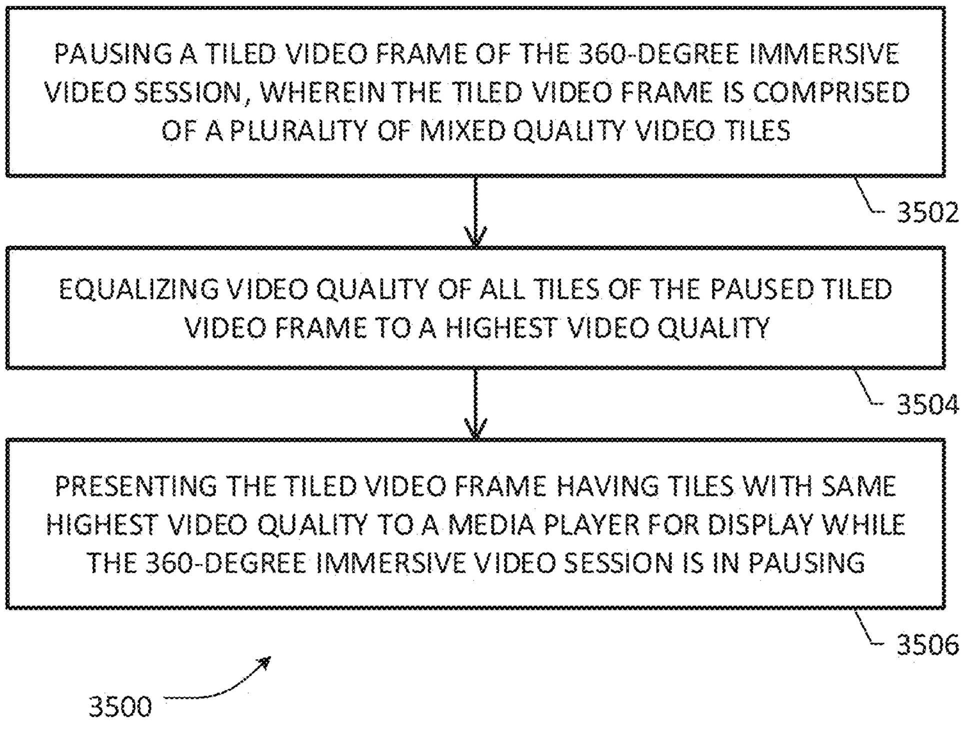
FIG. 35 is a flowchart of a high level client-based video quality optimization scheme that may be combined or recombined with one or more flowcharts of the present patent disclosure for purposes of an example embodiment of the present invention.

FIG. 35 is a flowchart of a high level client-based video quality optimization scheme that may be combined with one or more flowcharts of the present patent disclosure for purposes of an example embodiment of the present invention. Example process 3500 commences responsive to pausing a tiled video frame of the 360-degree immersive video session, wherein the tiled video frame is comprised of a plurality of mixed quality video tiles (block 3502). At block 3504, video quality of all tiles of the tiled video frame is equalized to a highest video quality. At block 3506, the tiled video frame having tiles with same highest video quality is presented to a media player for display while the 360-degree immersive video session is in pause mode.

FIGS. 36-39 are additional flowcharts depicting further details with respect to buffering frames during pause time using the decoding buffer and/or extra pause buffers, wherein some of the processes may also include suitable logic for resuming playout and consuming the buffered frames. Some of these flowcharts may be combined with one or more other flowcharts described elsewhere in the present patent application. In general, let Q be the quality of the highest quality tile in the viewport when paused. During pause time, frames may be downloaded where all tiles have the same quality Q (i.e., quality equalization). Thereafter, the frames may be stored in a video tile decoding buffer until it gets full. Then, if a separate pause buffer is enabled, the frames may continue to be downloaded where all tiles have quality Q, which may be stored in the pause buffer until the end of the current GOP/segment containing the paused frame. In one embodiment, when the end of the GOP/segment is reached, a determination may be made if progressive download mode is enabled. If so, downloading of frames may continue with all tiles having quality Q, which may be stored in the pause buffer until the user resumes the playout. If bandwidth significantly changes during pause time, a dynamic updating process configured to improve the quality Q of the tiles may be executed according to some of the embodiments relating to bitrate selection and bandwidth annealing as set forth hereinabove. Upon determining that quality can be improved, the pause buffer may be flushed as noted above and/or additional/multiple pause buffers may be instantiated. The new frames with higher quality tiles may be downloaded and stored accordingly. In addition, if during pause time it is observed that the bandwidth is utilized by other applications, a determination or evaluation may be made that the user might have paused the video session in order to use the network for other applications. In such a scenario, the buffering of frames may also be terminated during pause time. Still further, when the user generates a request to resume playout, an embodiment may be configured such that the frames in the pause buffer(s) are consumed for presentation to the HMD. During the time when the pre-buffered frames are being consumed, an embodiment may continue to download and buffer more frames at the tail end of the buffers. An intelligent buffer consumption scheme may therefore be configured such that pause buffers are processed first, followed by the tile decode buffer data, which can determine when regular mixed quality streaming may be commenced according to the several embodiments set forth in previous sections. As previously noted, different arrangements may be achieved depending on how various buffer "race" conditions are managed/configured in a particular implementation.

Figure 36:
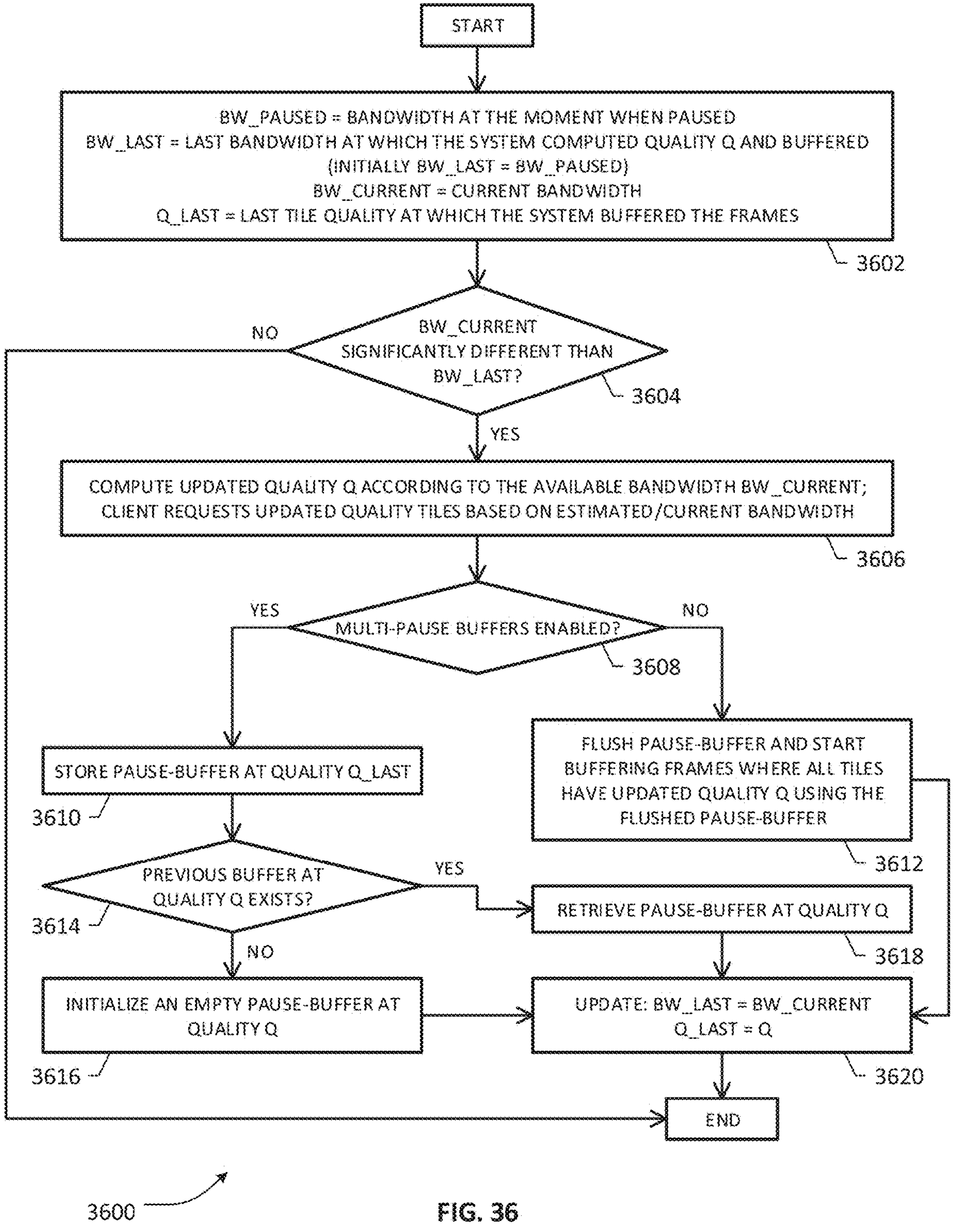
FIGS. 36-39 depict additional flowcharts illustrating further details with respect to buffering frames during pause time according to one or more embodiments of the present invention.

Turning to FIG. 36, depicted therein is a process 3600 for updating the quality Q of the tiles in the buffered frames as well as flushing/updating a pause buffer in case of bandwidth changes. At block 3602, various bandwidth and quality related parameters may be initialized. At block 3604, a determination may be whether a current bandwidth is different than a bandwidth at which a select quality (Q) has been chosen for buffering at the time of pausing. If there is no change, the process flow may be terminated in one embodiment. Otherwise, upon determining that the bandwidth has changed, the client device estimates/computes available current bandwidth and generates a request for updated quality tiles based on the available bandwidth (block 3606). At block 3608, a determination may be made if multiple pause buffers are provided. If a single pause buffer is provided, it may be flushed and be refilled with tiles having a new quality (block 3612). In the case of multiple pause buffers, each may be configured for storing tiles of a particular quality in an example arrangement. Accordingly, buffer qualities may be evaluated such that a new empty pause buffer may be initialized for storing a new tile having a quality not previously stored. These processes are set forth at blocks 3610, 3614, 3616 and 3618. Thereafter, buffer/bandwidth parameters may be suitably updated or reinitialized (block 3620) for subsequent quality update iterations (as and when needed).

Figure 37:
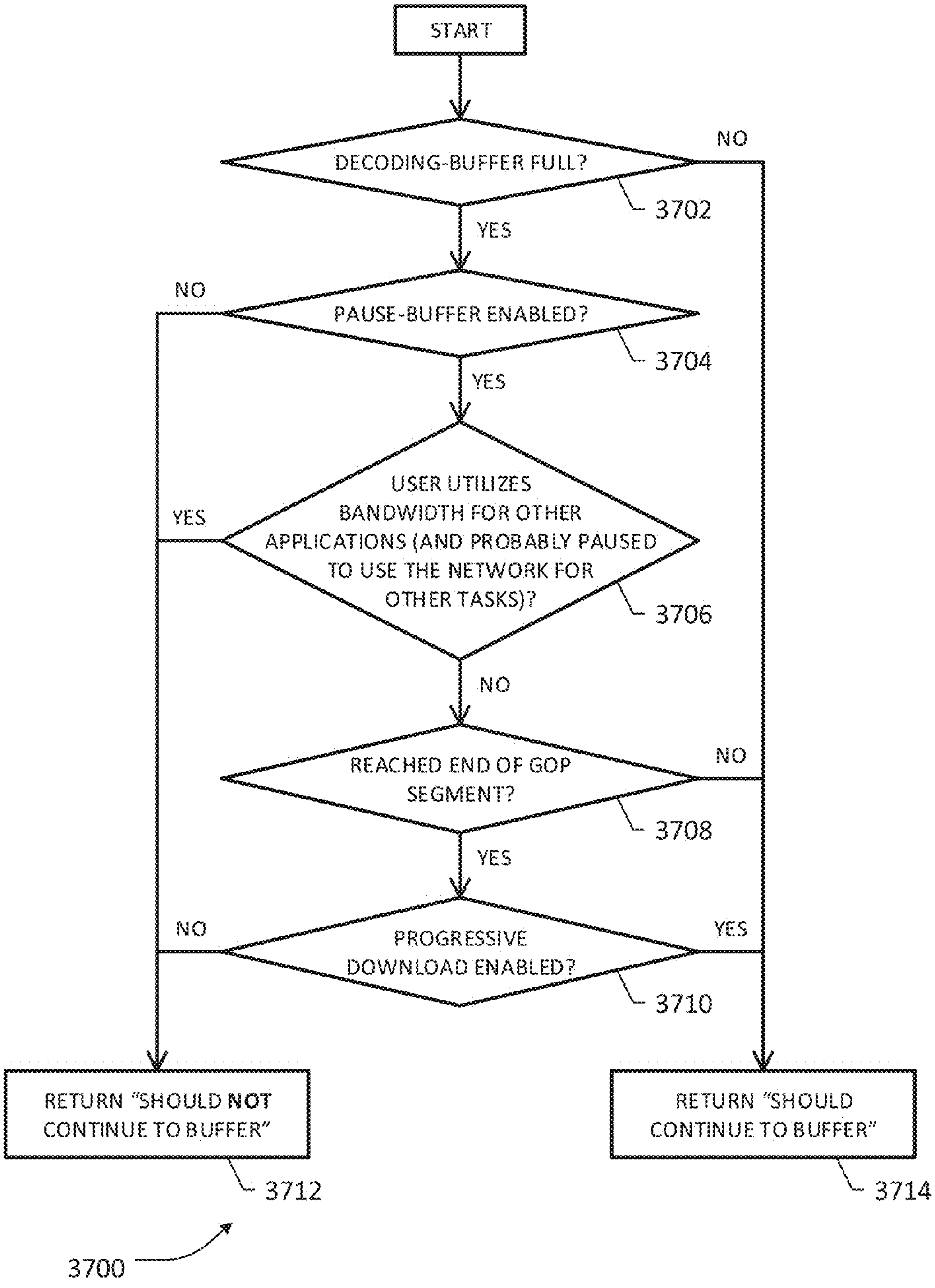

FIG. 37 depicts a flowchart of a process 3700 for determining, during pause time, whether or not buffering should continue, depending on a current status/condition of either decode and/or pause buffer(s). At block 3702, a determination is made if the decode buffer is full. If the decode buffer is not full, example process 3700 may return an indication or message that buffering should continue (block 3714). On the other hand, if the decode buffer is determined to be full, a further determination is made as to whether a pause buffer is enabled (block 3704). If no pause buffer is enabled, example process 3700 may return an indication or message that buffering should not continue (block 3712). Otherwise, a still further determination may be made as to whether the bandwidth is being shared/utilized for other user applications and/or whether the user paused the 360-degree video session to use the network bandwidth for such other tasks or applications (block 3706). If the answer is "YES", example process 3700 may again return an indication/message as set forth in block 3712. On the other hand, if the answer is "NO", a determination may be made whether the video session has reached the end of the current GOP/segment (block 3708). If not, example process 3700 may reach the decision to continue to buffer (block 3714). Otherwise, a still further determination may be made at block 3710 to verify if progressive download is enabled. If so, example process 3700 may again reach the decision to continue to download and buffer tiles of a (higher) quality Q (block 3714). Otherwise, example process 3700 may return an indication/message that buffering should not continue (block 3712).

Figure 38:
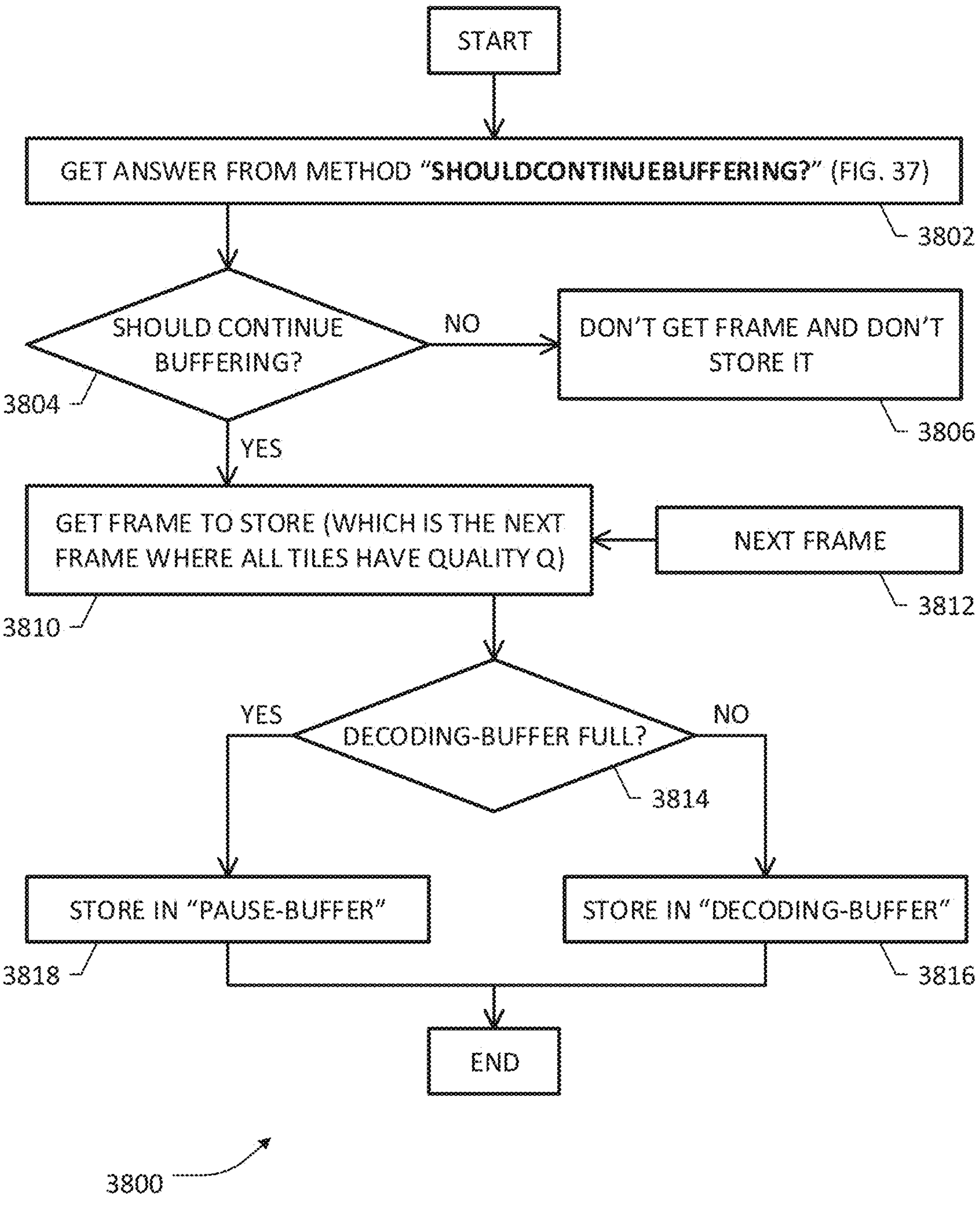

FIG. 38 depicts a flowchart of a process 3800 for storing a next downloaded frame where all tiles have a quality Q at an appropriate buffer (e.g., video tile decode buffer or pause buffer). At block 3802, a result from process 3700 of FIG. 37 may be obtained as set forth above, which facilitates the initiation of further processing with respect to tile storage. If the result from process 3700 is an indication to not continue buffering, no frame will be downloaded (block 3806). Otherwise, a next frame 3812 is obtained for storing, where all tiles have the same quality Q. If the video tile decode buffer is full (block 3814), the downloaded frame is stored in the pause buffer (block 3818). Otherwise, the downloaded frame is stored in the video tile decode buffer (block 3816).

Figure 39:
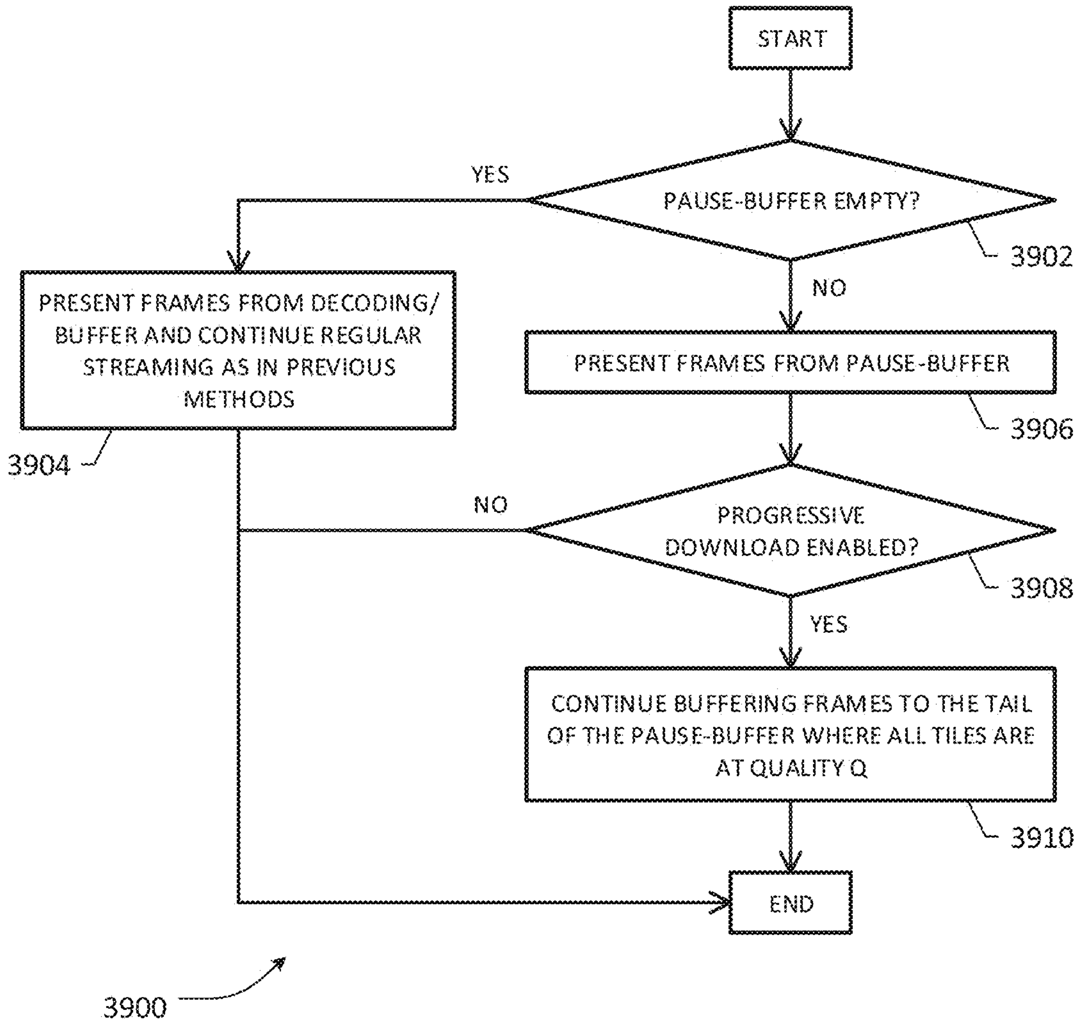

FIG. 39 depicts a flowchart of a process 3900 for consuming the buffered frames upon resuming playback. At block 3902, a determination may be made whether a pause buffer is empty. If so, frames from a video tile decode buffer may be presented/consumed for rendering and display (block 3904). Also, example process 3900 may continue to download frames as set forth in an OTT implementation described elsewhere in the present application. If the pause buffer is not empty (block 3902), stored frames from the pause buffer may be presented/consumed (block 3906). If progressive download is enabled (block 3908), frames may continue to be downloaded and buffered at the tail end of the pause 7 buffer (block 3910). Otherwise, example process flow 3900 may be terminated.

Based on the foregoing, it will be appreciated that embodiments herein advantageously provide a pause control optimization scheme for facilitating a high quality picture across the entire 360-degree field of vision in a paused video frame, which can enable the user to enjoy a better video experience when looking around the paused frame rather than having to tolerate a poor visual presentation due to the LQ tiling in out-of-view areas. Another advantage is that pause time can be used to download future frames in certain embodiments. As may be noted, the pause time may be either short or long, and an embodiment of the present invention may be configured to leverage the pause time for downloading of the subsequent frames following a paused frame, either short segments or an entire video asset. Further, a higher QoE may be effectuated for the playback upon resumption since the downloaded subsequent frames comprise tiles having at least the same quality as the quality of the highest resolution tiles when paused. Depending on the bandwidth conditions while pausing, even higher quality frames may be downloaded during pause time in certain example embodiments for achieving an enhanced viewing experience in a proactive, anticipatory manner.

One skilled in the art will further recognize that various apparatuses and systems with respect to the foregoing embodiments, as well as the underlying network infrastructures set forth above may be architected in a virtualized environment according to a network function virtualization (NFV) architecture in additional or alternative embodiments of the present patent disclosure. For instance, various physical resources, databases, services, applications and functions executing within an example streaming network of the present application, including source media processing infrastructure, media containerization, PE/BIE tile encoding and packaging, etc., set forth hereinabove may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of hardware/software associated with PE/BIE tile encoding and packaging, bandwidth annealing and tile selection, tile muxing and containerization, bandwidth management, and the like may be implemented in a service-oriented architecture, e.g., Software as a Service (SaaS), Platform as a Service (PaaS), infrastructure as a Service (IaaS) etc., with multiple entities providing different features of an example embodiment of the present invention, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., “cloud of clouds”), and the like.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as “circuitry,” “a module” or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean “one and only one” unless explicitly so stated, but rather “one or more.” All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

The invention claimed is:

1. A non-transitory machine-readable storage medium having program instructions thereon, which are configured to perform following acts when executed by a processor of a client device engaged in an immersive video session:

pausing a tiled video frame of the immersive video session, wherein the tiled video frame is comprised of a plurality of mixed quality video tiles;

equalizing video quality of all tiles of the paused tiled video frame, wherein the video quality of the tiles of the paused tiled video frame has a same value;

presenting the paused tiled video frame having tiles with the same video quality to a media player associated with the client device for display while the immersive video session is in pausing;

responsive to determining that a video decode buffer of the client device includes one or more video frames subsequent to the paused tiled video frame of the immersive video session, flushing the one or more subsequent video frames from the video decode buffer; and filling the video decode buffer with one or more subsequent replacement video frames, wherein each subsequent replacement video frame includes a complete array of video tiles having a video quality at least equal to the equalized video quality of the tiles of the paused tiled video frame.

2. The non-transitory machine-readable storage medium as recited in claim 1, wherein the equalized video quality of tiles of the paused tiled video frame corresponds to a video quality of the tiles within a viewport of a display device associated with the client device, the viewport defined by gaze vector information of a user operating the client device.

3. The non-transitory machine-readable storage medium as recited in claim 1, further comprising a code portion operative to continue downloading of the subsequent replacement video frames into the video decode buffer until the video decode buffer is full.

4. The non-transitory machine-readable storage medium as recited in claim 3, further comprising a code portion configured to fill one or more pause buffers with additional subsequent replacement video frames downloaded while the video decode buffer is full and the immersive video session is in pausing.

5. The non-transitory machine-readable storage medium as recited in claim 1, further comprising a code portion, operative responsive to receiving a playback resume request from the user, for commencing playback of the immersive video session from a subsequent replacement video frame immediately following the paused tiled video frame, the subsequent replacement video frame having video tiles with a uniform quality regardless of the gaze vector information obtained when the playback resume request is received.

6. A customer premises equipment (CPE) system configured to provide immersive video experience to a user, the CPE system comprising:

a video display device; and a client device including:

a processor;

a media player operative to play a video program comprising a plurality of tiled video frames;

a video decode buffer for storing one or more tiled video frames of the video program downloaded in an ongoing immersive video session; and a pause control module comprising executable program instructions for performing following acts when executed by the processor of the client device:

responsive to a user input, pausing the ongoing immersive video session at a tiled video frame of the video program, wherein the tiled video frame is comprised of a plurality of mixed quality video tiles;

equalizing video quality of all tiles of the paused tiled video frame, wherein the video quality of the tiles of the paused tiled video frame has a same value;

presenting the paused tiled video frame having tiles with the same video quality to the media player for displaying the paused tiled video frame using the video display device while the immersive video session is in pausing;

responsive to determining that the video decode buffer of the client device includes one or more video frames subsequent to the paused tiled video frame of the immersive video session, flushing the one or more subsequent video frames from the video decode buffer; and filling the video decode buffer with one or more subsequent replacement video frames, wherein each subsequent replacement video frame includes a complete array of video tiles having a video quality at least equal to the equalized video quality of the tiles of the paused tiled video frame.

7. The CPE system as recited in claim 6, wherein the equalized video quality of tiles of the paused tiled video frame corresponds to a video quality of the tiles within a viewport of the video display device defined by gaze vector information of the user.

8. The CPE system as recited in claim 6, wherein the program instructions for filling the video decode buffer after the immersive video session is paused further include instructions operative to continue downloading of the subsequent replacement video frames into the video decode buffer until the video decode buffer is full.

9. The CPE system as recited in claim 8, further comprising one or more pause buffers for storing additional subsequent replacement video frames downloaded while the video decode buffer is full and the immersive video session is in pausing.

10. The CPE system as recited in claim 6, wherein the pause control module further comprises program instructions, operative responsive to receiving a playback resume request from the user, for commencing playback of the immersive video session from a subsequent replacement video frame immediately following the paused tiled video frame, the subsequent replacement video frame having video tiles with a uniform quality regardless of the gaze vector information obtained when the playback resume request is received.

11. A method of optimizing video quality at a client device engaged in an immersive video session, the method comprising:

pausing a tiled video frame of the immersive video session, wherein the tiled video frame is comprised of a plurality of mixed quality video tiles;

equalizing video quality of all tiles of the paused tiled video frame, wherein the video quality of the tiles of the paused tiled video frame has a same value;

presenting the paused tiled video frame having tiles with the same video quality to a media player associated with the client device for display while the immersive video session is in pausing;

responsive to determining that a video decode buffer of the client device includes one or more video frames subsequent to the paused tiled video frame of the immersive video session, flushing the one or more subsequent video frames from the video decode buffer; and filling the video decode buffer with one or more subsequent replacement video frames while the immersive video session is paused, wherein each subsequent replacement video frame includes a complete array of video tiles having a video quality at least equal to the equalized video quality of the tiles of the paused tiled video frame.

12. The method as recited in claim 11, wherein the equalized video quality of tiles of the paused tiled video frame corresponds to a video quality of the tiles within a viewport of a display device associated with the client device, the viewport defined by gaze vector information of a user operating the client device.

13. The method as recited in claim 11, further comprising continuing to download the subsequent replacement video frames into the video decode buffer until the video decode buffer is full.

14. The method as recited in claim 13, further comprising:

determining that the video decode buffer is full; and responsive to the determining that the video decode buffer is full, filling one or more pause buffers with additional subsequent replacement video frames downloaded while the video decode buffer is full and the immersive video session is in pausing.

15. The method as recited in claim 11, further comprising, responsive to receiving a playback resume request from the user, commencing playback of the immersive video session from a subsequent replacement video frame immediately following the paused tiled video frame, the subsequent replacement video frame having video tiles with a uniform quality regardless of the gaze vector information obtained when the playback resume request is received.

* * * * *